Oct. 18, 1955   B. McKIM ET AL   2,721,235
ELECTRICAL TRANSMISSION TESTING SYSTEM
Filed Oct. 4, 1951   53 Sheets-Sheet 20

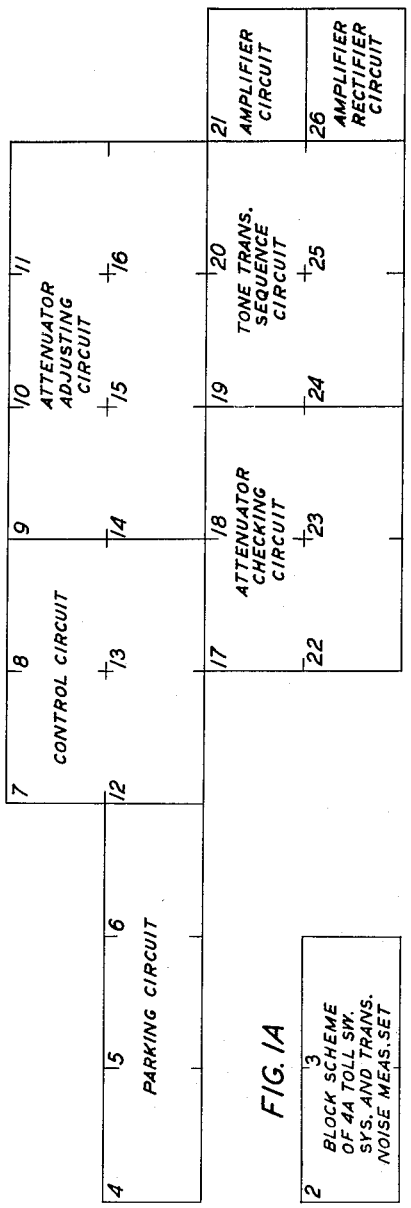

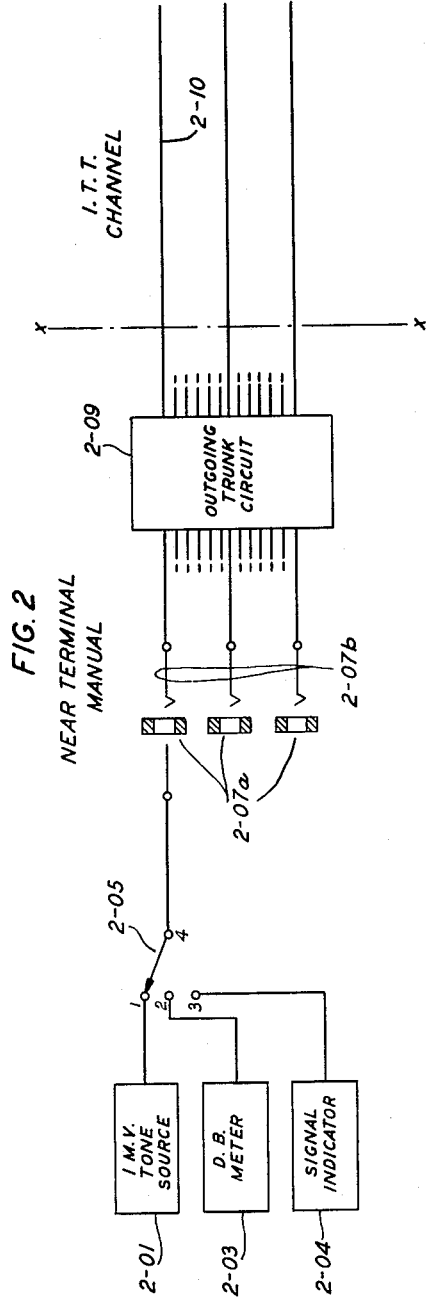
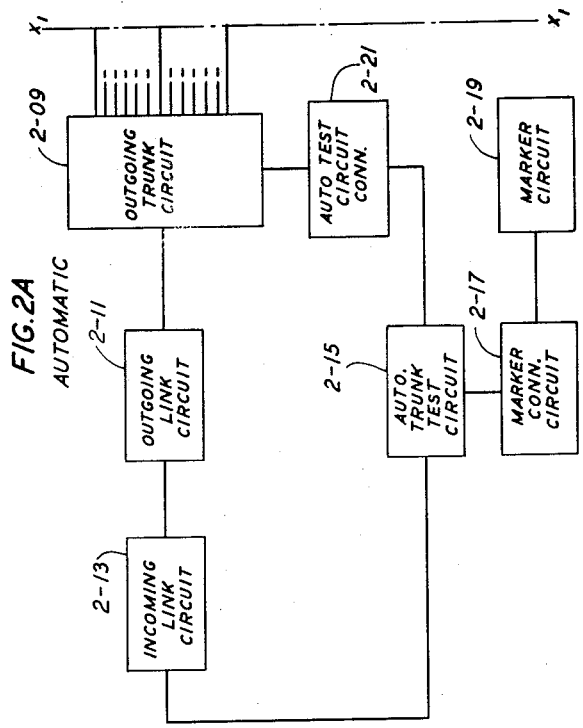

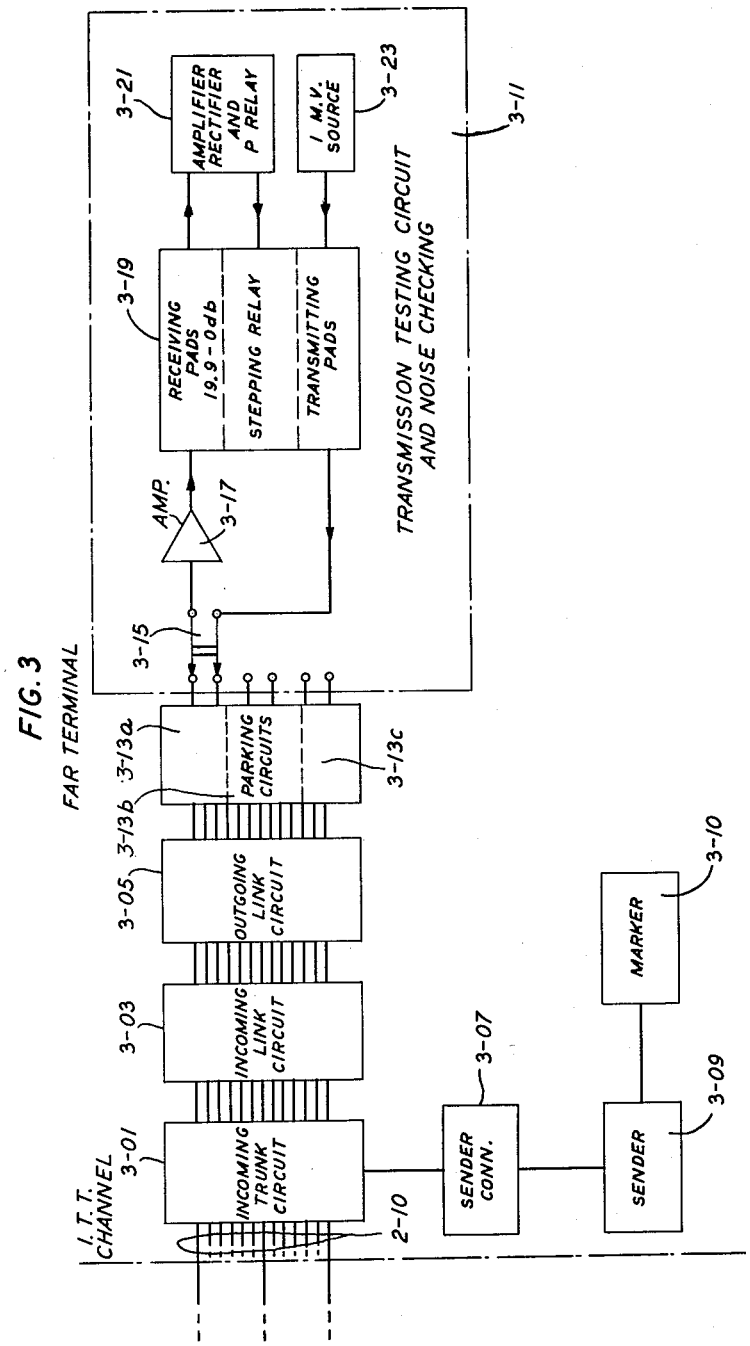

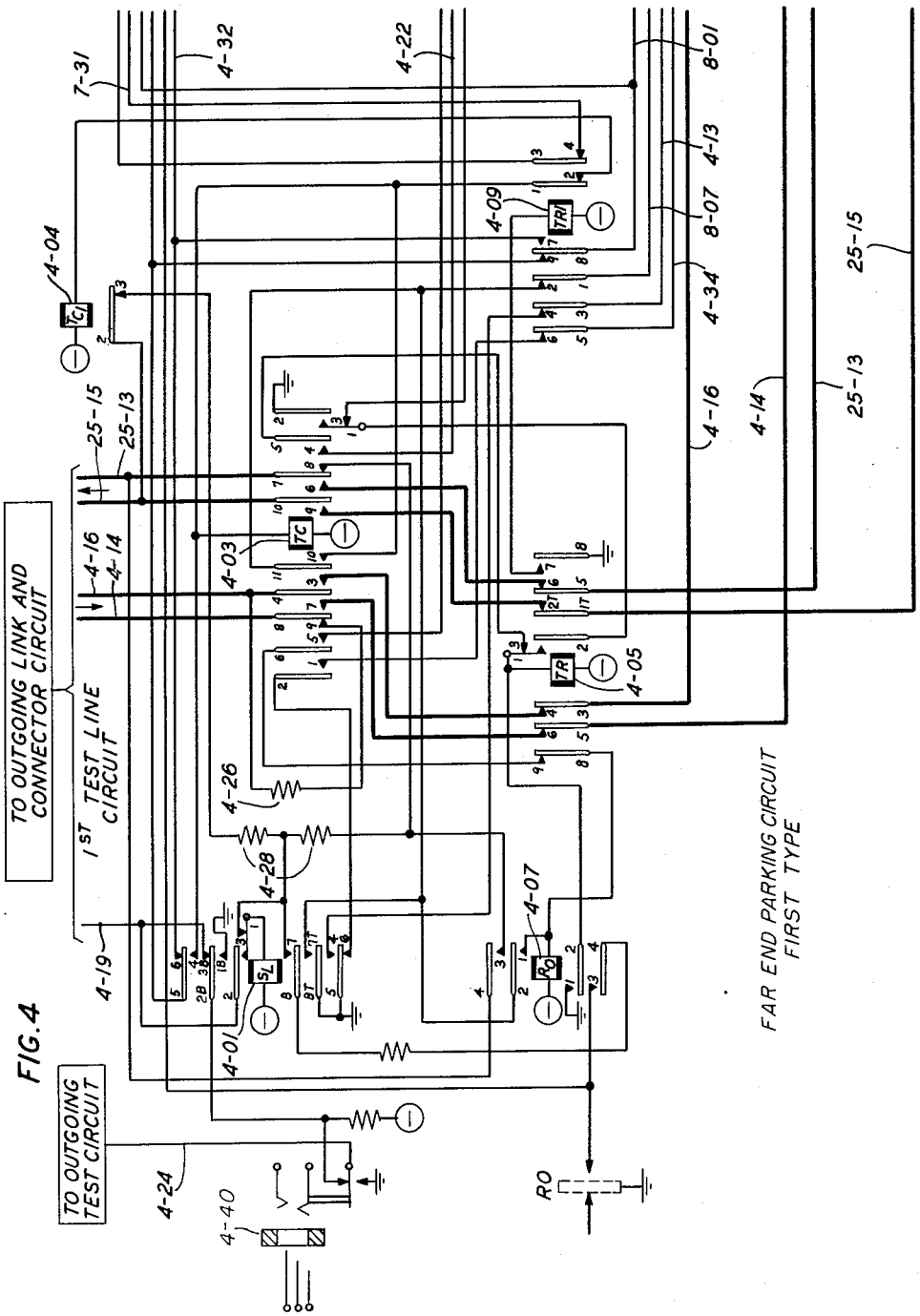

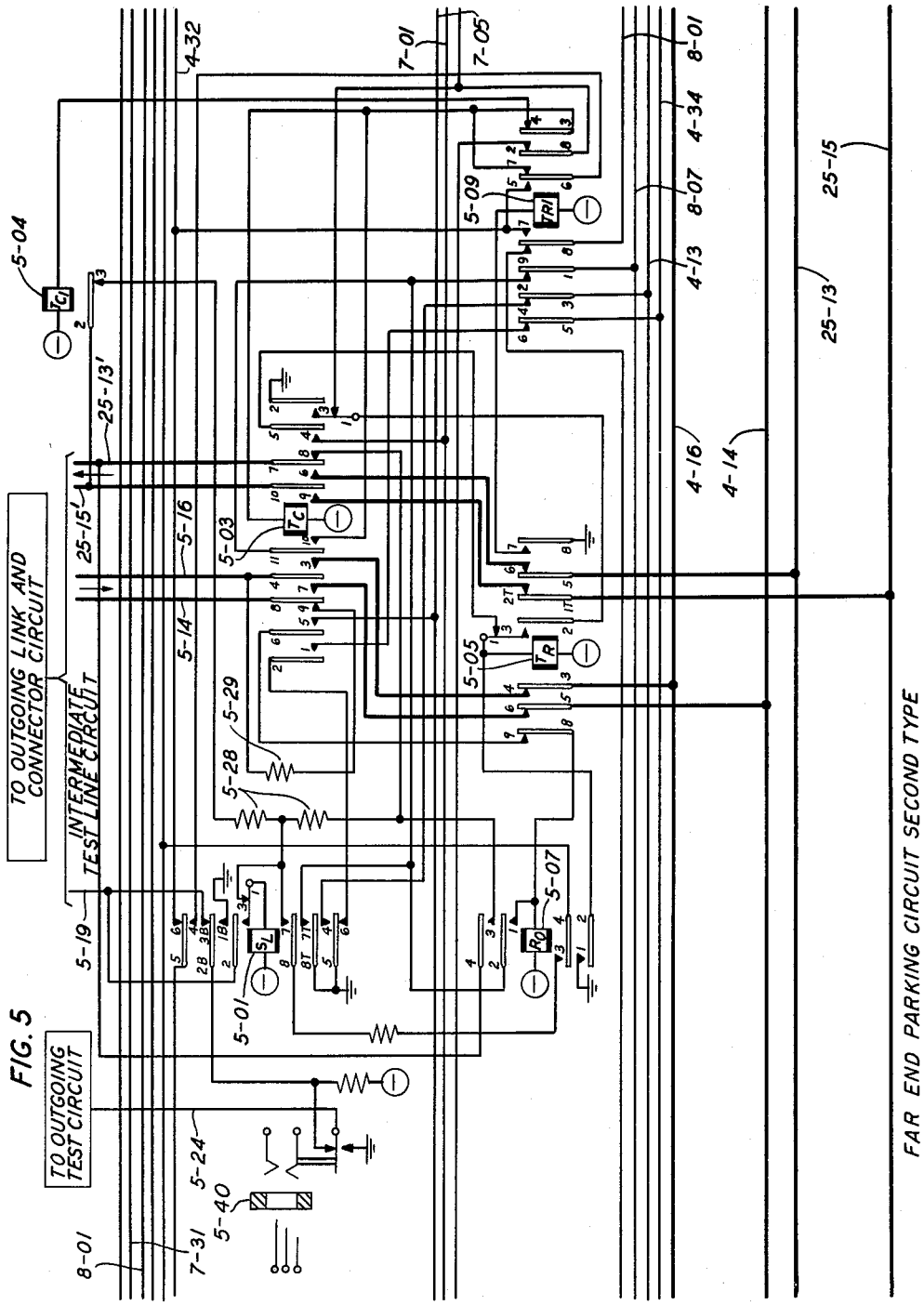

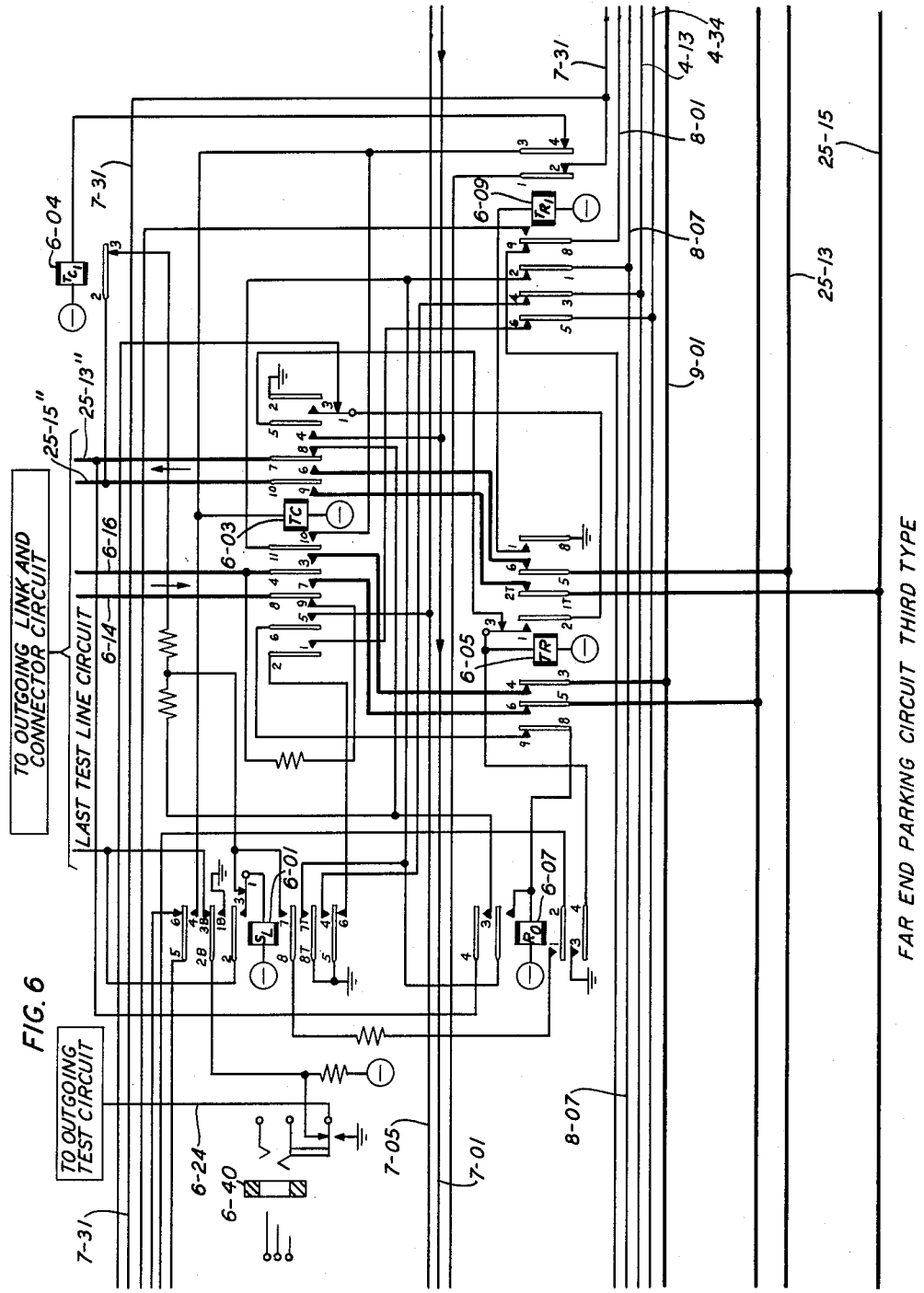

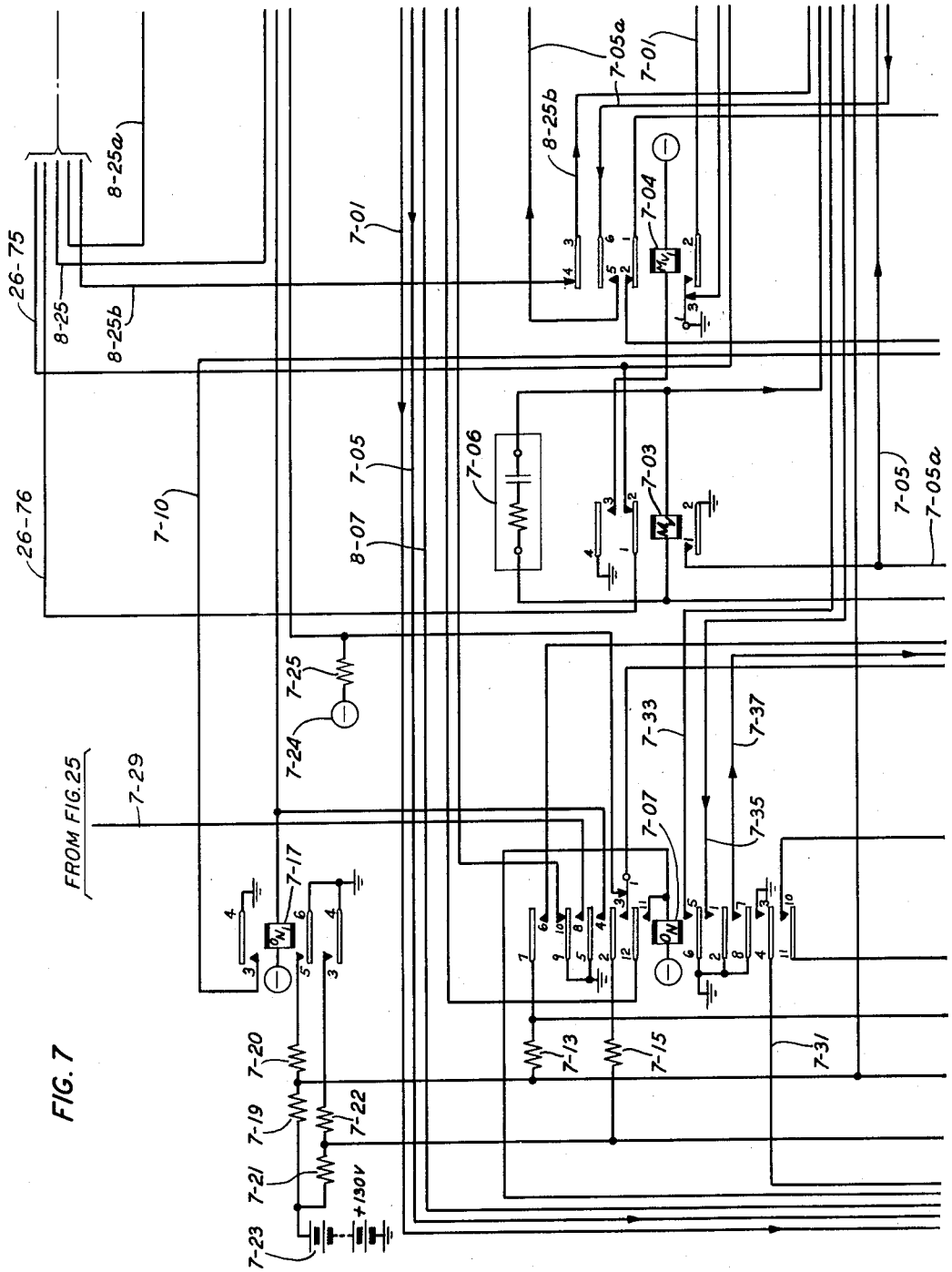

INVENTORS B. McKIM
T. H. NEELY
BY  N. S. Ewing
ATTORNEY

INVENTORS B. McKIM
T. H. NEELY
BY N. A. Ewing
ATTORNEY

Oct. 18, 1955  B. McKIM ET AL  2,721,235
ELECTRICAL TRANSMISSION TESTING SYSTEM
Filed Oct. 4, 1951  53 Sheets-Sheet 25

FIG. 25

INVENTORS B. McKIM
T. H. NEELY
BY
N. D. Ewing
ATTORNEY

FIG. 28

Oct. 18, 1955    B. McKIM ET AL    2,721,235
ELECTRICAL TRANSMISSION TESTING SYSTEM
Filed Oct. 4, 1951    53 Sheets-Sheet 31

FIG. 31

INVENTORS B. McKIM
T. H. NEELY
BY  N. S. Ewing
ATTORNEY

Oct. 18, 1955   B. McKIM ET AL   2,721,235
ELECTRICAL TRANSMISSION TESTING SYSTEM
Filed Oct. 4, 1951   53 Sheets-Sheet 32

SEIZURE

1000 ~ TONE
NOT RECEIVED FROM NEAR TERMINAL

INVENTORS  B. McKIM
               T. H. NEELY
BY
              N. D. Ewing
                        ATTORNEY Oct. 18, 1955   B. McKIM ET AL   2,721,235
ELECTRICAL TRANSMISSION TESTING SYSTEM
Filed Oct. 4, 1951   53 Sheets-Sheet 33

1000~ TONE
RECEIVED FROM NEAR TERMINAL 10 db RECEIVING PAD
TOO HIGH

INVENTORS B. McKIM
T. H. NEELY
BY
N. D. Ewing
ATTORNEY 10 db RECEIVING PAD TOO LOW

ATTENUATOR ADJUSTMENT

ATTENUATOR ADJUSTMENT
(CONTINUED)

ATTENUATOR COMPLETELY ADJUSTED
TRUNK LOSS REMAINS CONSTANT
OR DROPS DURING ADJUSTMENT OF
ATTENUATOR

Oct. 18, 1955  B. McKIM ET AL  2,721,235
ELECTRICAL TRANSMISSION TESTING SYSTEM
Filed Oct. 4, 1951  53 Sheets-Sheet 37

TERMINAL NET LOSS REMAINS STEADY OR DROPS DURING ATTENUATOR ADJUSTMENT 'BUT NOT ENOUGH TO CAUSE PAD CHECK FAILURE

ATTENUATOR CONTACT, PAD, AMPLIFIER AND AMPLIFIER-RECTIFIER CHECK - OK

INVENTORS B. McKIM
T. H. NEELY
BY
N. D. Ewing
ATTORNEY

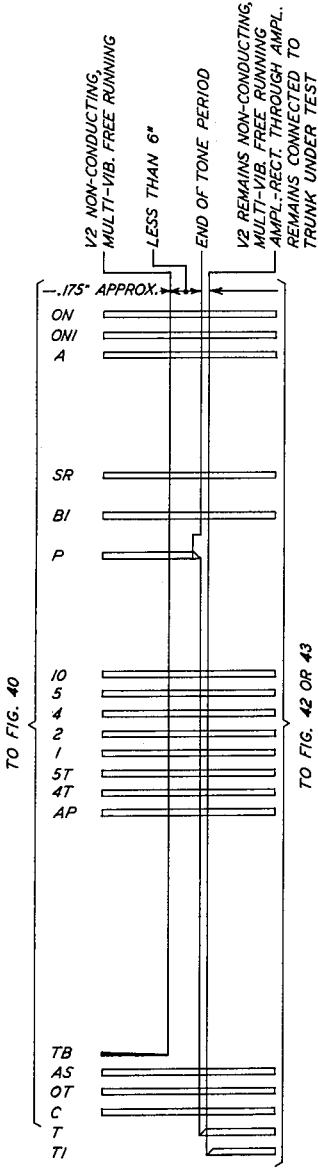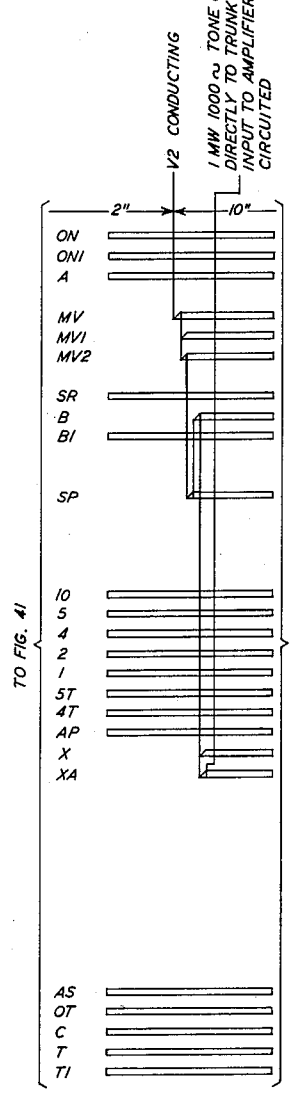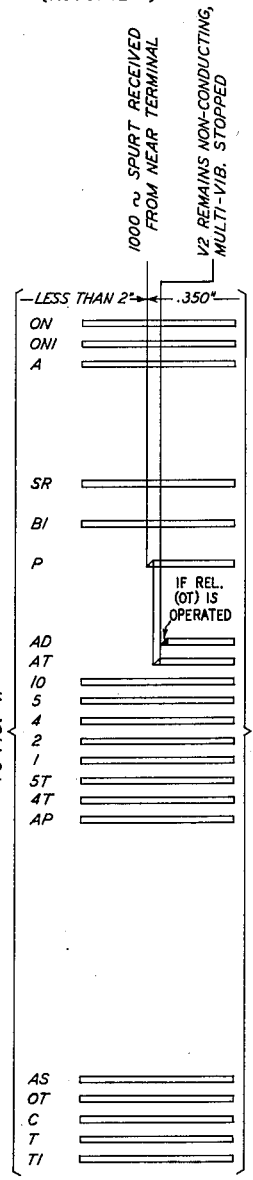

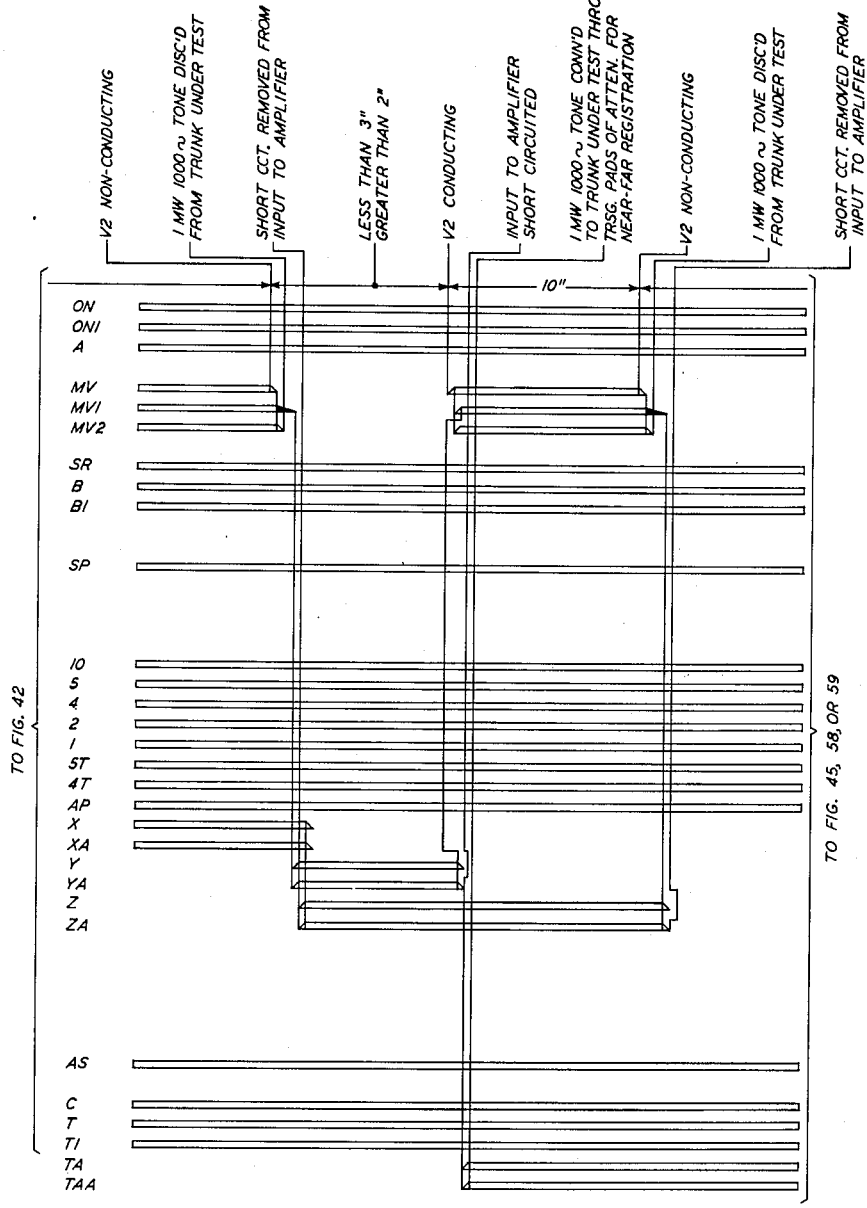

NOISE TEST AND DISC.

2ND TONE TRANSMISSION
(MANUAL TEST)
NEAR-FAR MEASUREMENT
10 db OR MORE

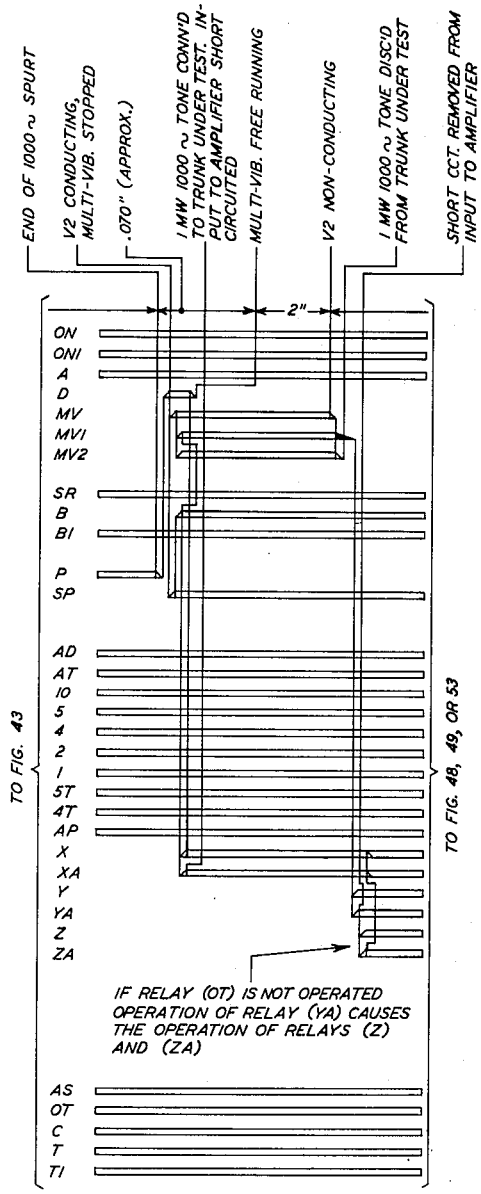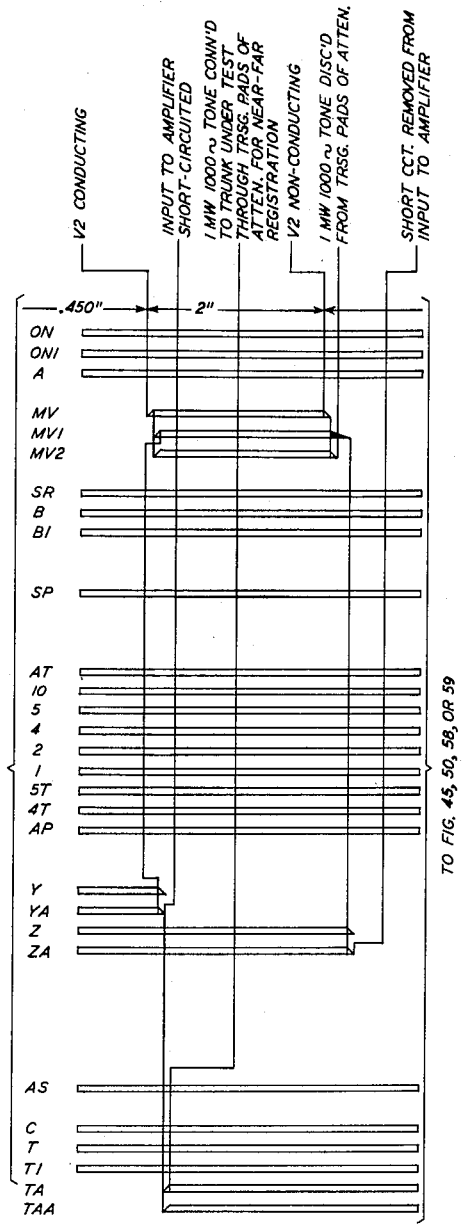

TRUNK UNDER TEST AUTO. TEST CIRCUIT
REQUESTS REPEAT AFTER
SECOND TONE TRANSMISSION

TRUNK UNDER TEST AUTO. TEST CIRCUIT
REQUESTS REPEAT

ATTENUATOR ADJUSTMENT
(TRUNK LOSS RISES DURING ADJUSTMENT)

ATTENUATOR ADJUSTMENT
(TRUNK LOSS RISES DURING ADJUSTMENT)
(CONTINUED)

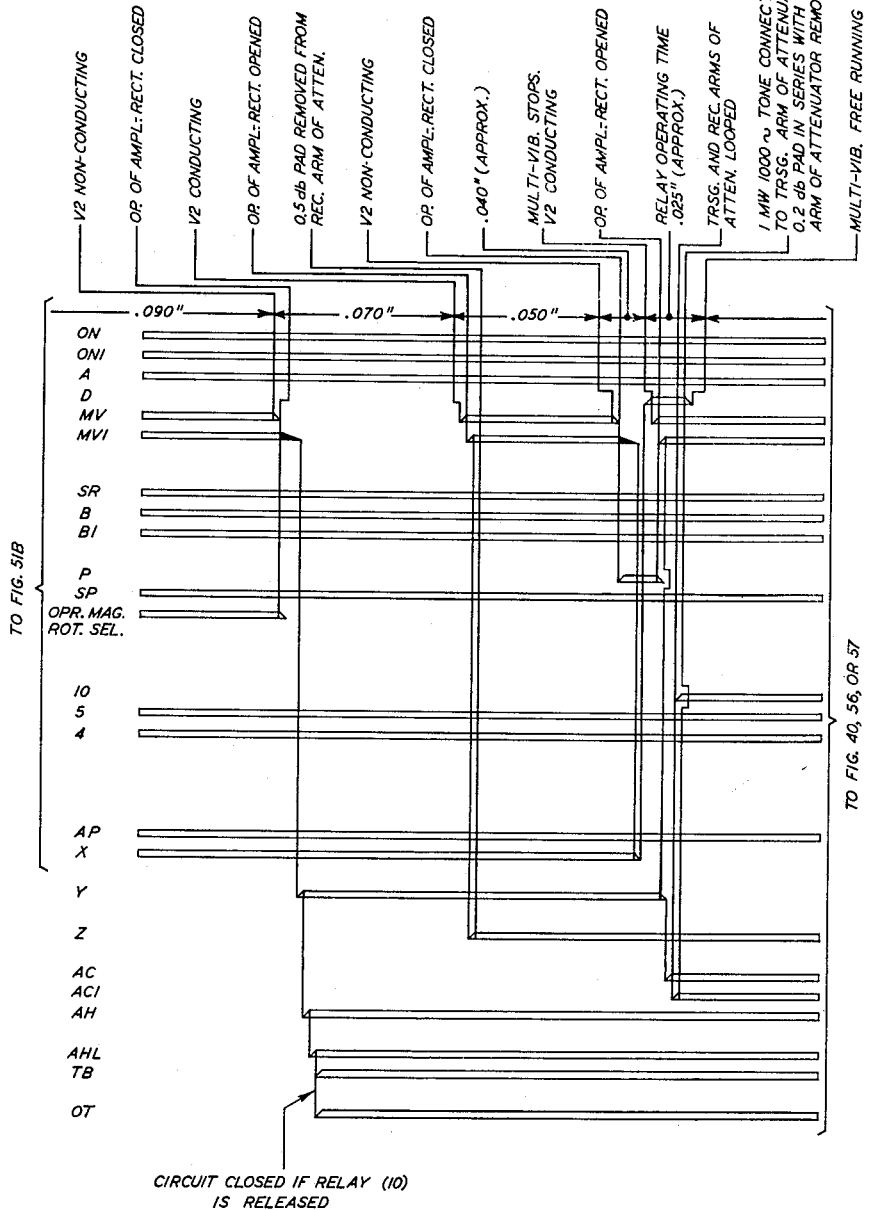

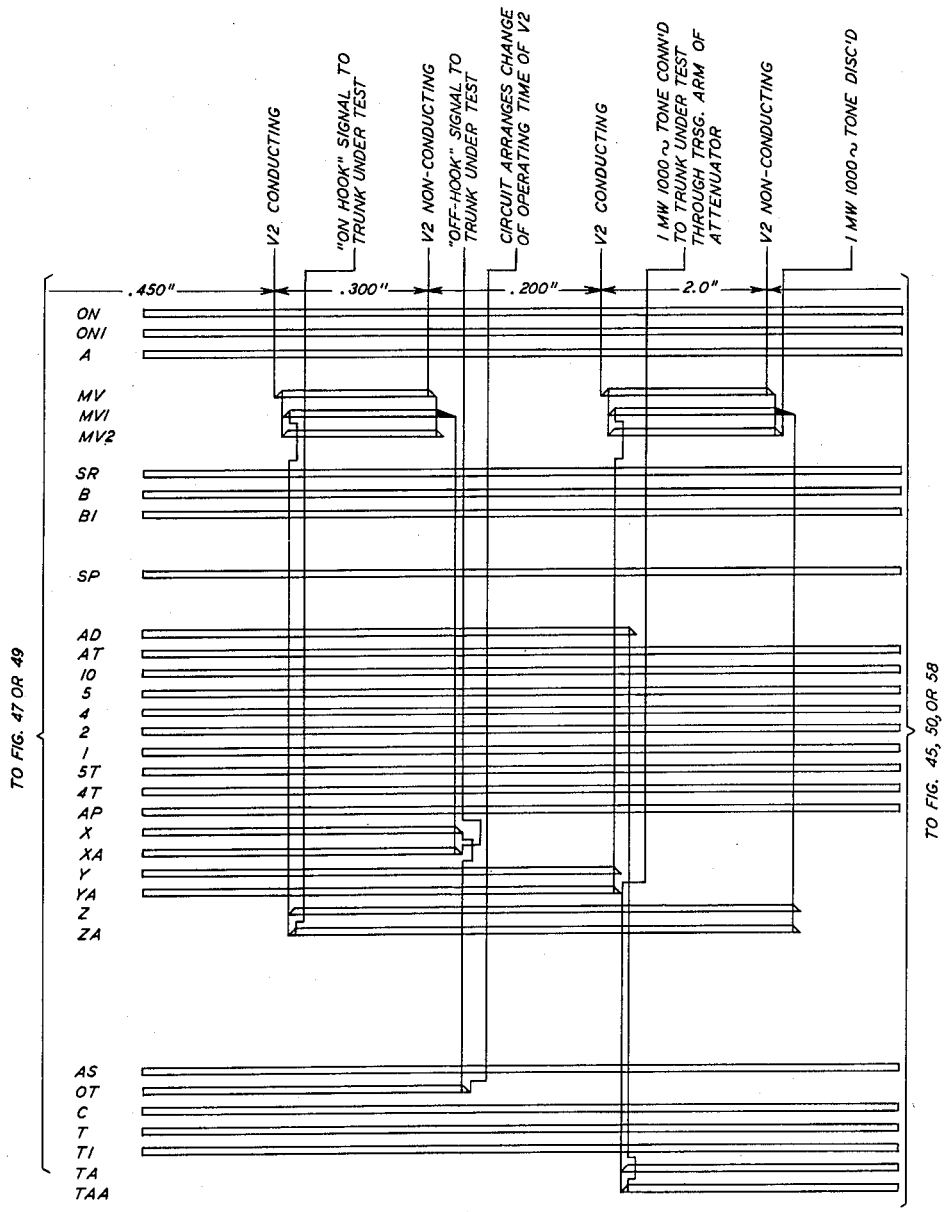

TERMINAL NET LOSS DROPPED ENOUGH DURING ATTENUATOR ADJUSTMENT TO CAUSE FAILURE OF PAD CHECK

TERMINAL NET LOSS RISES TO SUCH A VALUE THAT PAD CHECK FAILS. REQUEST FOR REPETITION OF NEAR TERMINAL TRANSMISSION

ATTENUATOR ADJUSTED DURING ATTENUATOR CONTACT AND PAD CHECK (P) REL. FAILS TO RELEASE WHEN 0.5 db PAD IS ADDED

ATTENUATOR ADJUSTED, ATTENUATOR AND PAD CHECK. (P) REL. FAILS TO OPERATE WHEN 1 MW APPLIED THROUGH TRSG. AND REC. SECTIONS OF ATTENUATOR AND THROUGH THE AMPLIFIER AND AMPLIFIER-RECTIFIER CIRCUITS

NOISE TEST AND DISCONNECTION
(NOISE LEVEL UNSATISFACTORY)

Oct. 18, 1955 — B. McKIM ET AL — 2,721,235
ELECTRICAL TRANSMISSION TESTING SYSTEM
Filed Oct. 4, 1951 — 53 Sheets-Sheet 53

CALL ABANDONED

INVENTORS B. McKIM
T. H. NEELY
BY
ATTORNEY

2,721,235

ELECTRICAL TRANSMISSION TESTING SYSTEM

Burton McKim, Morristown, and Thomas H. Neely, Radburn, N. J., assignors to Bell Telephone Laboratories, Incorporated, New York, N. Y., a corporation of New York Application October 4, 1951, Serial No. 249,742

24 Claims. (Cl. 179—175.3)

This invention relates in general to electric transmission systems, and more particularly, to the performance of bi-directional transmission tests on trunk lines interconnecting one or more pairs of terminals in such systems.

In order to maintain proper operating conditions on the many trunk lines which interconnect telephone switching stations, it is necessary to measure transmission loss and noise levels accurately, frequently, and with a minimum interruption of service. Moreover, since losses and noise levels in one direction of transmission are generally not the same as those in the other, measurements must be made in both directions. This is true because of the fact that between terminal switching stations, where the circuit appears as a two-wire transmission path, it may take the form, for example, of a four-wire system, carrier or non-carrier, with separate repeatered paths for each direction of transmission. In accordance with present practice, line attenuation and noise tests are made manually, in a manner requiring the cooperative effort of attendants at two terminal stations. This has many disadvantages, particularly when applied to an otherwise automatic system, due to the slowness of the procedure, the limited opportunities for making measurements and the increasing likelihood of error.

It is, therefore, a principal object of the present invention to provide greater facility in the measurement of losses and noise levels in both directions between a first and a second terminal station in an electrical transmission system; and more specifically, it is the object of the present invention to greatly improve the speed and accuracy of such measurements.

The aforesaid objects are carried out in accordance with the present invention in an automatic two-way testing system for measuring attenuation and noise levels on trunk lines interconnecting telephone switching stations.

In accordance with the present invention the two-way measurement of signal attenuation between two telephone switching stations, to be known hereinafter as the Near-Terminal and the Far-Terminal, the latter being provided with automatic switching equipment, is carried out in two substantially concurrent steps. The first step is to transmit from the Near-Terminal dial pulses, or other signals that are operative on the automatic switching equipment at the Far-Terminal to cause a tone of predetermined fixed strength to be applied at that terminal to the circuit under test. The strength of this tone as received at the Near-Terminal is measured, and the change in strength is taken as a measure of the transmission loss on the Far-Near Channel. The other step involves dialing at the Near-Terminal to effect connection of special tets equipment with the circuit at the Far-Terminal, transmission of a tone of predetermined fixed strength over the Near-Far Channel, return of a tone from the Far-Terminal, the strength thereof being automatically adjusted in predetermined relation to the strength of the tone received at the Far-Terminal, and measurement of the strength of the returned tone at the Near-Terminal.

The last-mentioned measurement gives a determination of the sum of the respective losses in the two directions of transmission (which may be called the "round trip-loss"), so that by subtraction of the measured far to near loss, the loss in the near to far direction can be determined. Inasmuch as the first mentioned step conforms with well-known practice, this specification will be devoted largely to a description of the second mentioned step, i. e., the measurement of "round trip" loss, and additionally to the comparison of the noise level on the Near-Far Channel with a certain standard noise level.

The aforesaid functions are carried out in a system of the type comprising, at the Near-Terminal, a first pulse transmission source connected for transmitting pulses of predetermined fixed strength from that terminal to the Far-Terminal; and at the Far-Terminal, a system of controls which operates in response to the received strength of the tone from the Near-Terminal to introduce a series of attenuator pads corresponding in value to the Near-Far line loss into the path of a tone of predetermined fixed strength which is transmitted in a reverse direction over the Far-Near Channel by a second pulse transmission source.

A particular feature of the invention is the control mechanism at the Far-Terminal, comprising a multivibrator connected through a system of relays to operate a stepping selector which controls the addition and subtraction of attenuator pads, and the sequence of checking tests and noise measurements. The period and character of multivibrator operation at different points in the operational cycle are changed as a result of variations of the bias on one or the other of its grids, brought about under its own control.

Other objects, features and advantages of the invention will be apparent from a study of the attached drawings and the detailed description thereof which follows.

In the drawings:

Figs. 1 thru 1C show arrangements of sheets for the illustrative schematics of the present invention.

Figs. 2, 2A, and 3 show in block schematic a preferred form of the system of the present invention, which in the present illustrative example is applied to the measurement of attenuation and noise transmission levels in channels interconnecting a pair of telephone switching stations.

Others of the figures show details of the circuit components of the Far-End Terminal, as follows:

Figs. 4, 5, and 6 show three typical Parking Circuits;

Figs. 7, 8, 12 and 13 show the Control Circuit including multivibrator;

Figs. 19, 20, 24 and 25 show the Tone Transmission Sequence Circuit;

Figs. 27 and 28 show a skeletonized schematic of the Multivibrator Circuit;

Figs. 29 through 31 show a skeletonized schematic of Transmission Test Circuit; and Figs. 32 through 59 are charts indicating the sequence of relay operations at each of the steps in the operational cycle of the system of the present invention.

Figure 8:
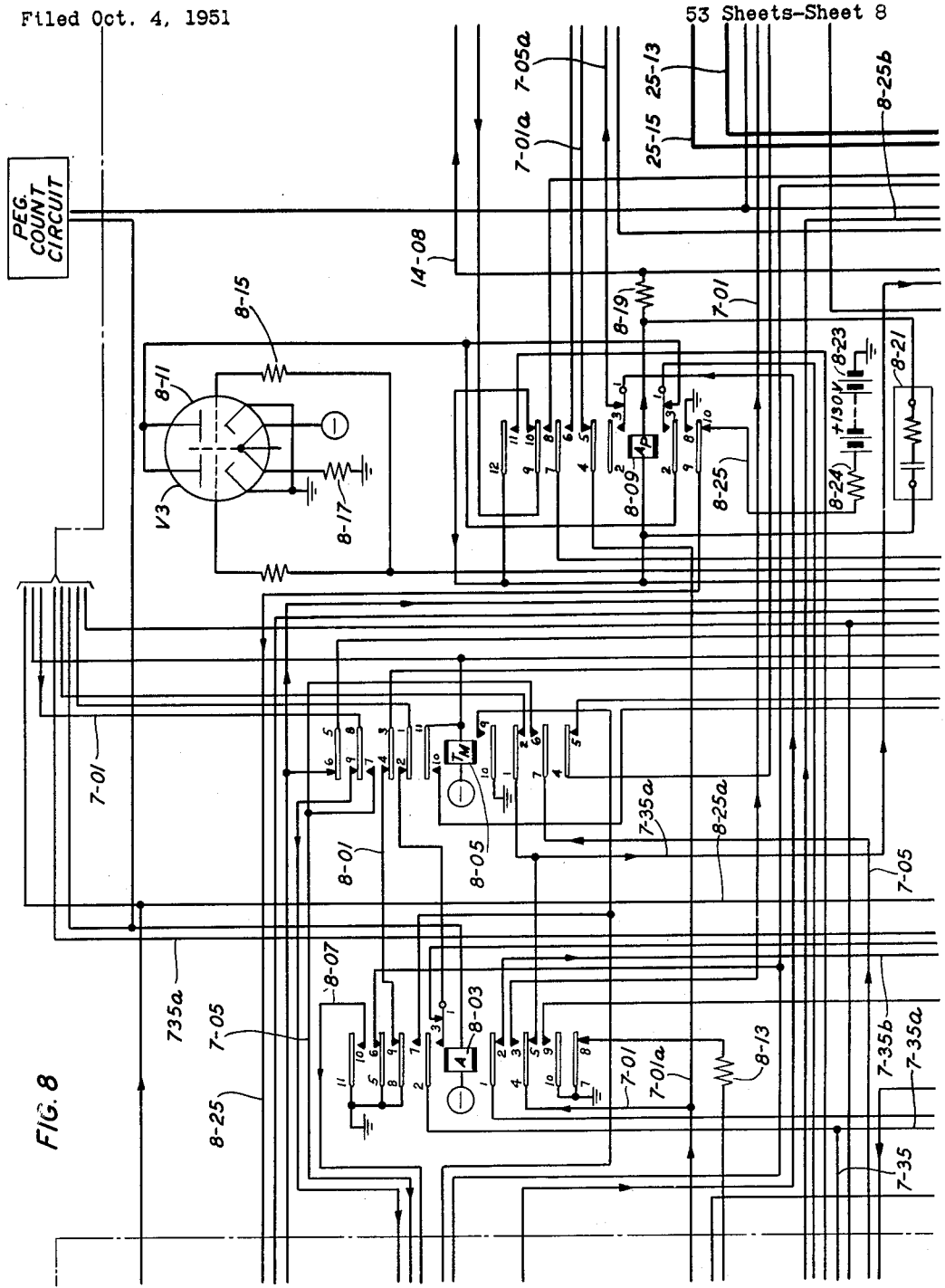
Figure 9:
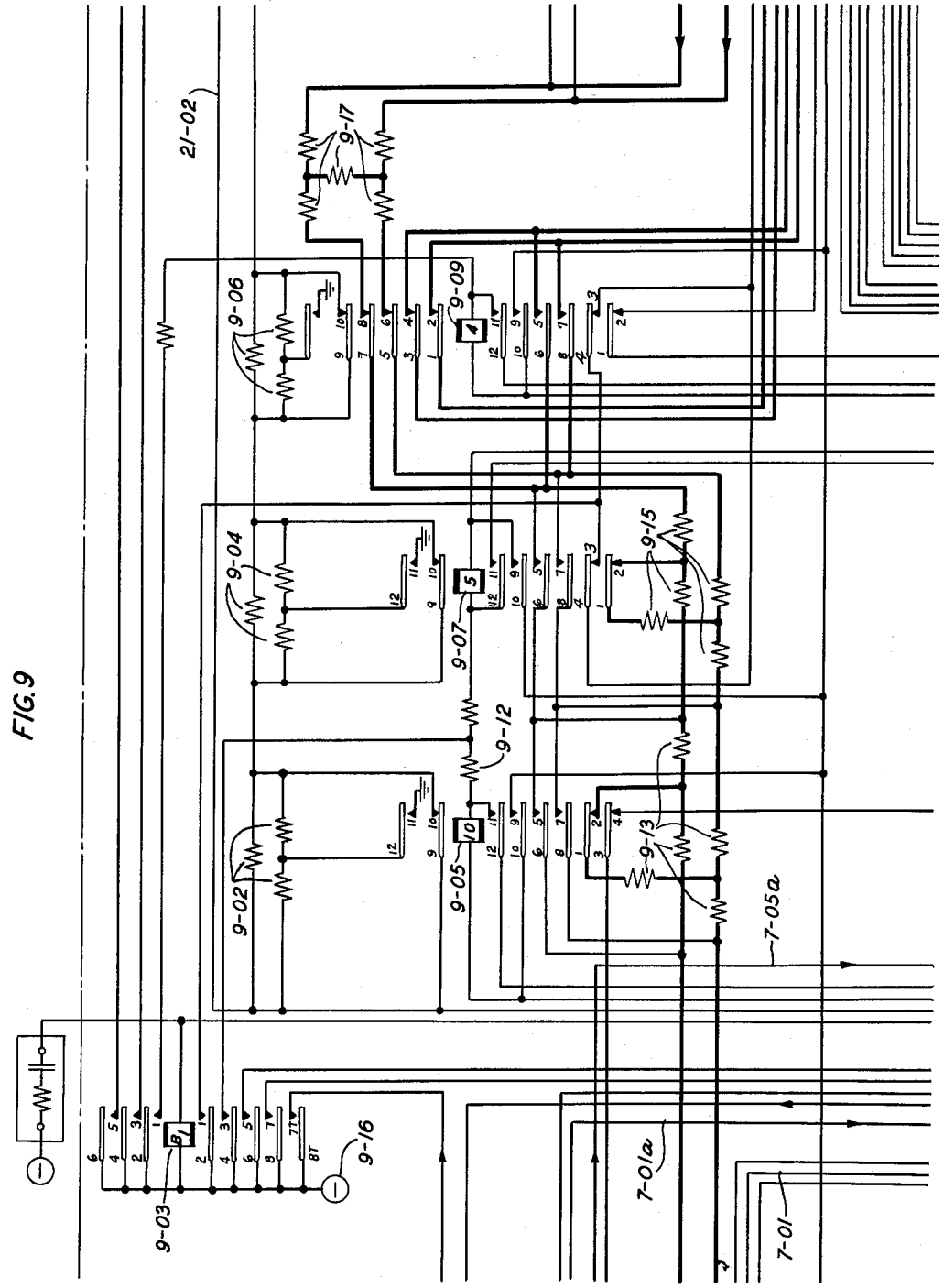
Figs. 9, 10, 11, 14, 15 and 16 show the attenuator adjusting and noise checking circuits, and the Call Abandoned Circuit.
Figure 10:
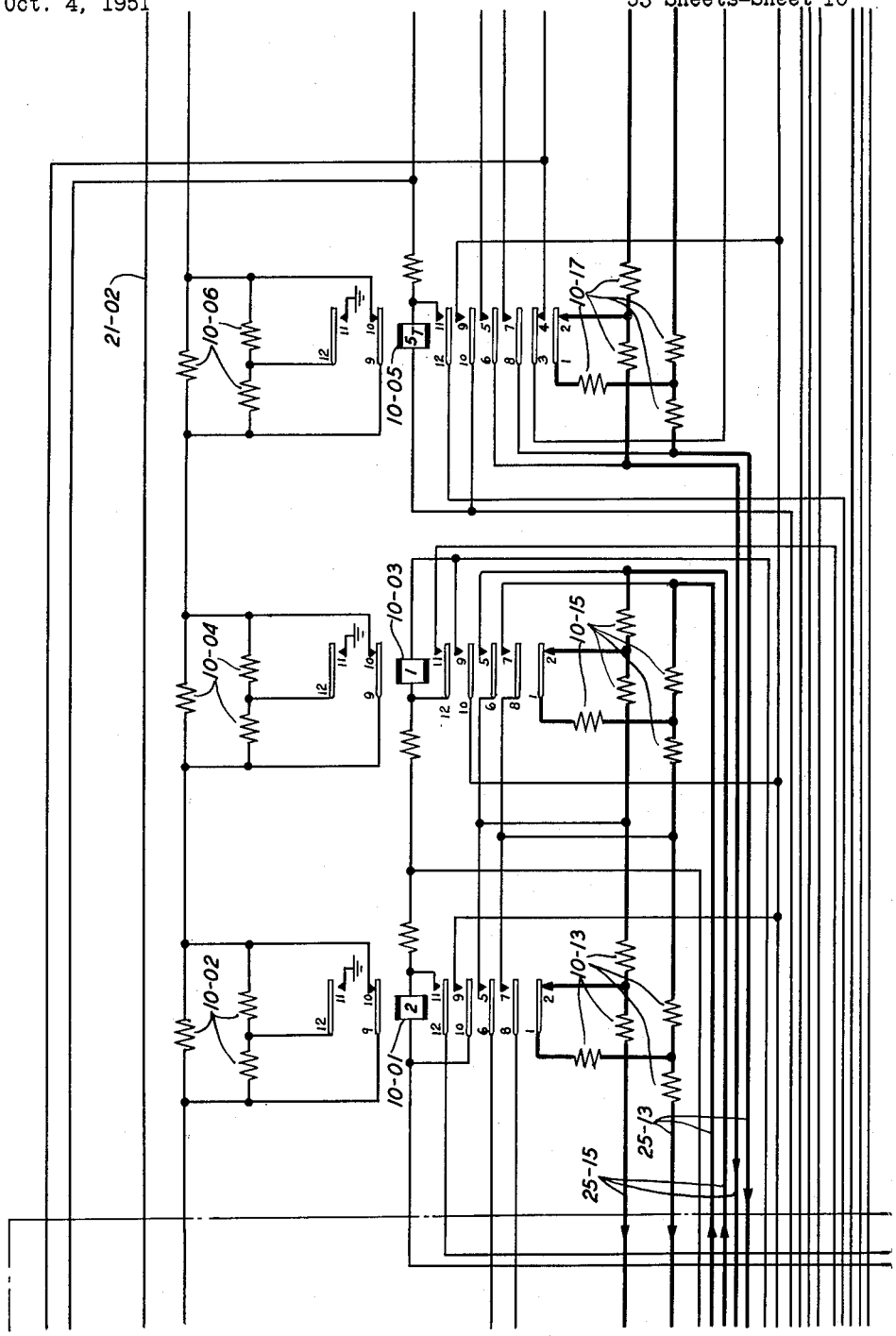
Figure 11:
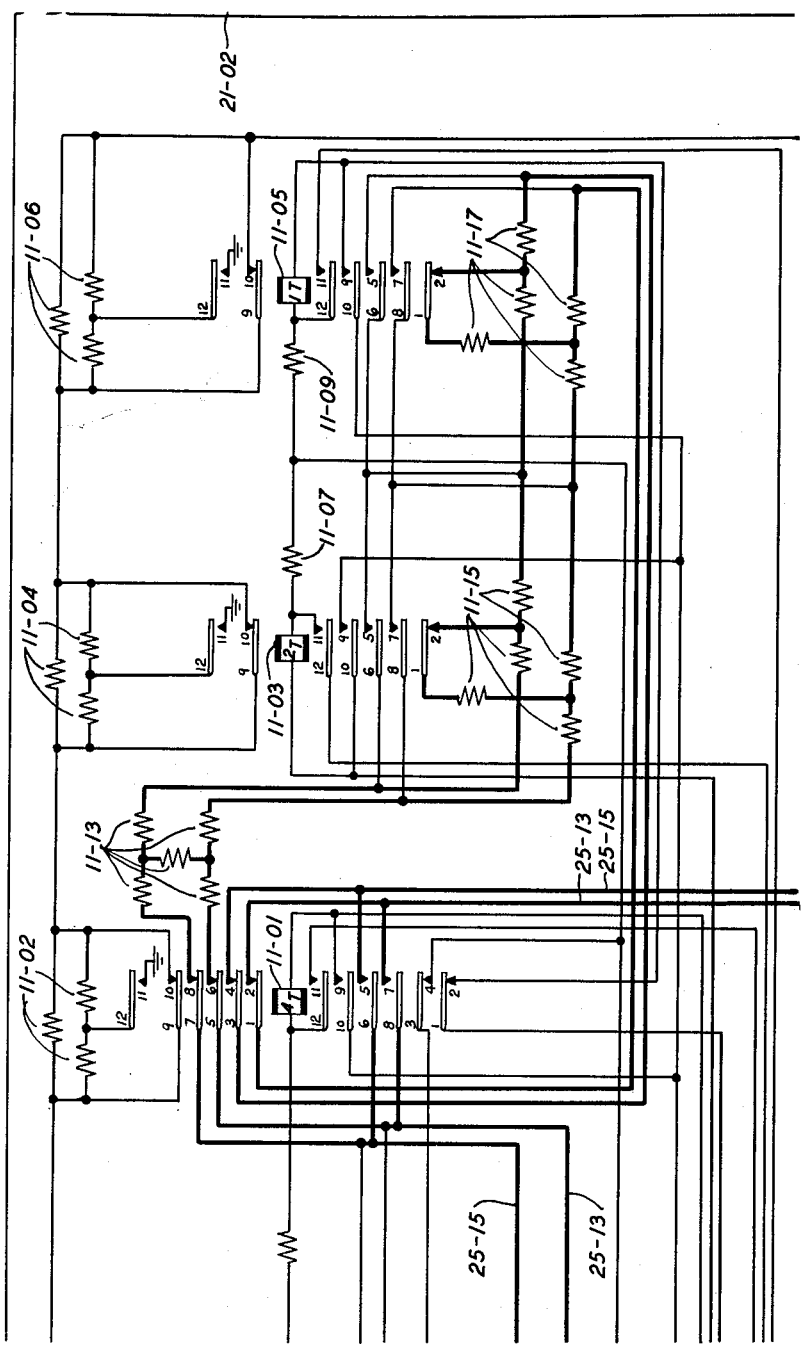
Figure 12:
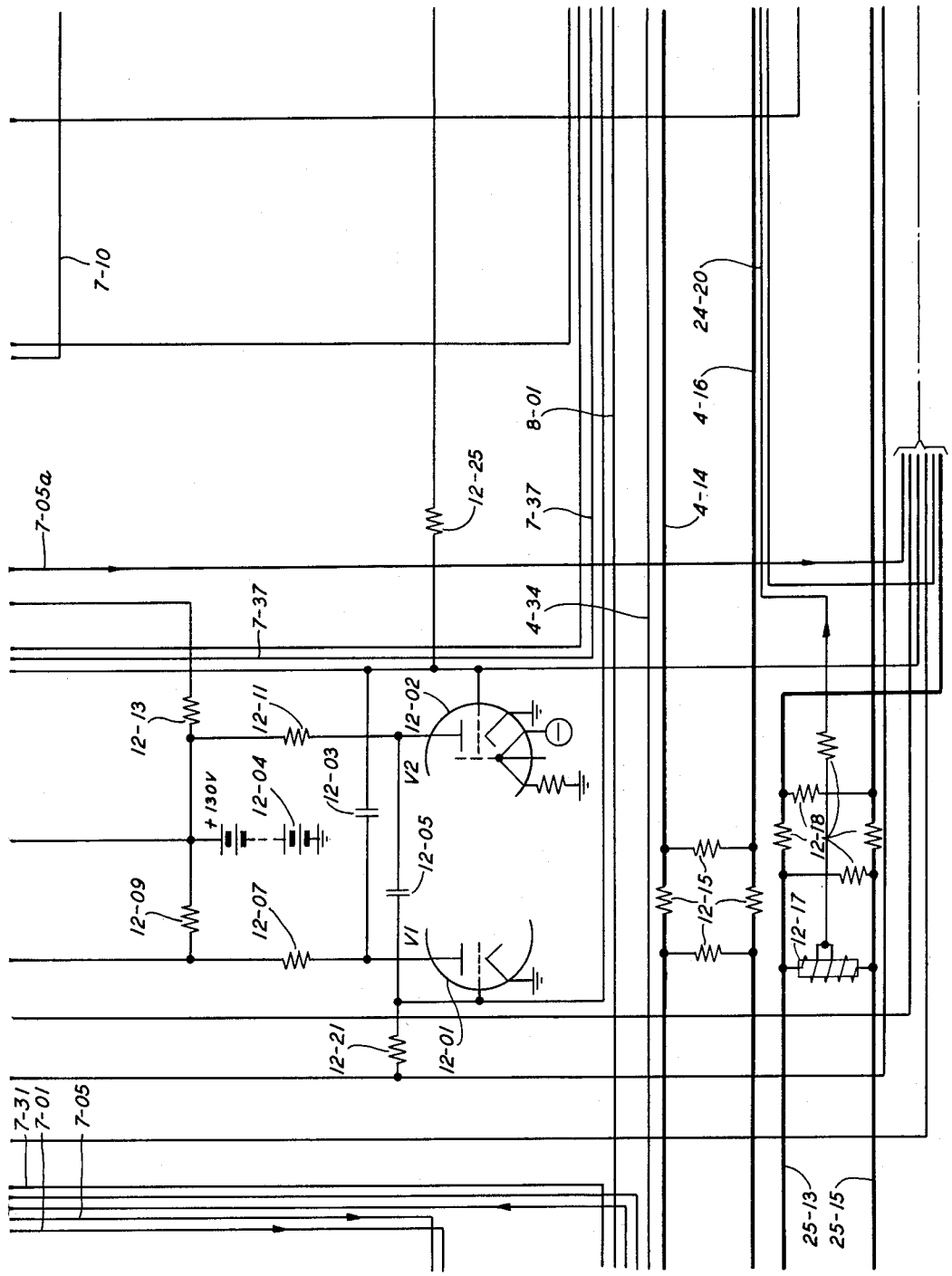
Figure 13:
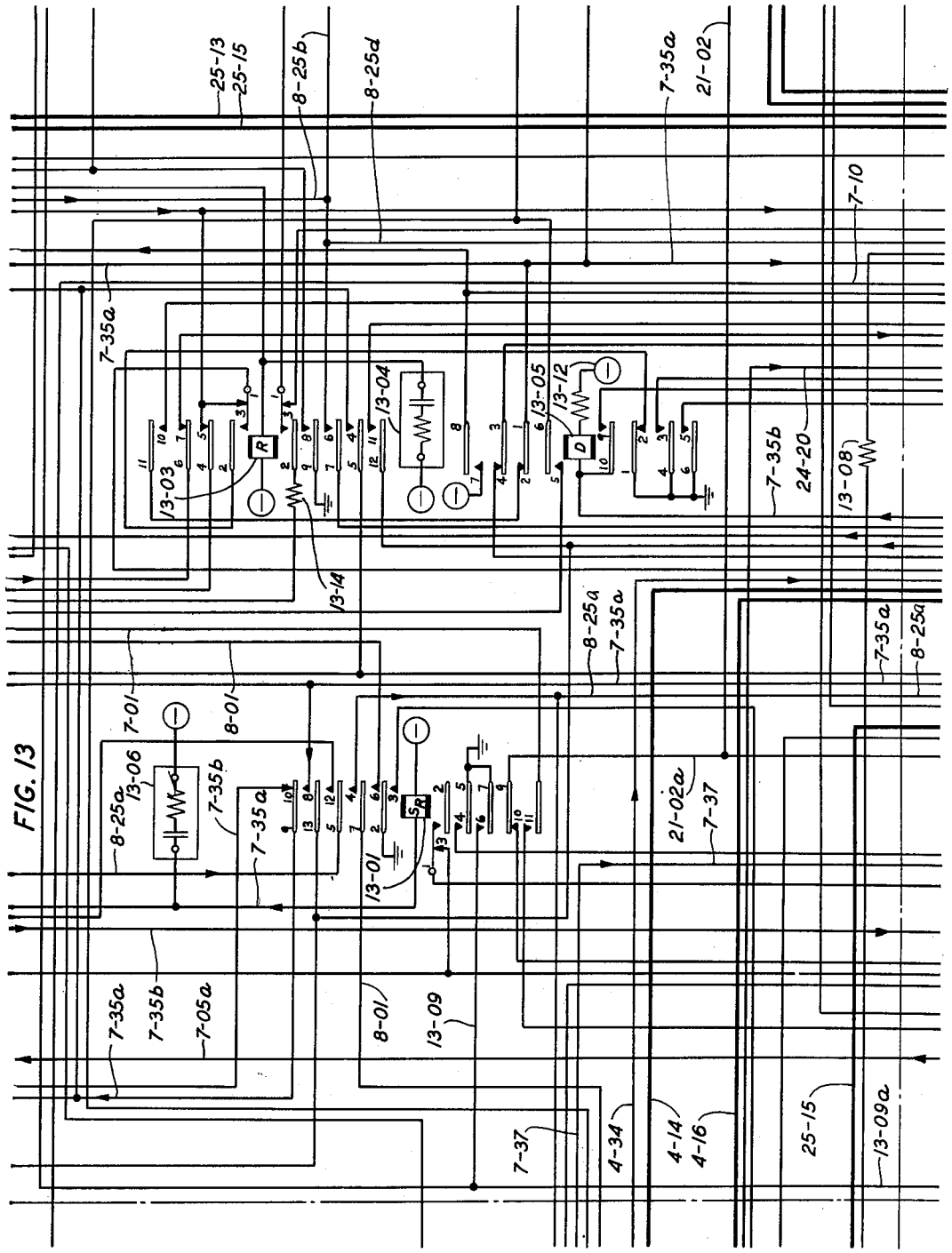
Figure 14:
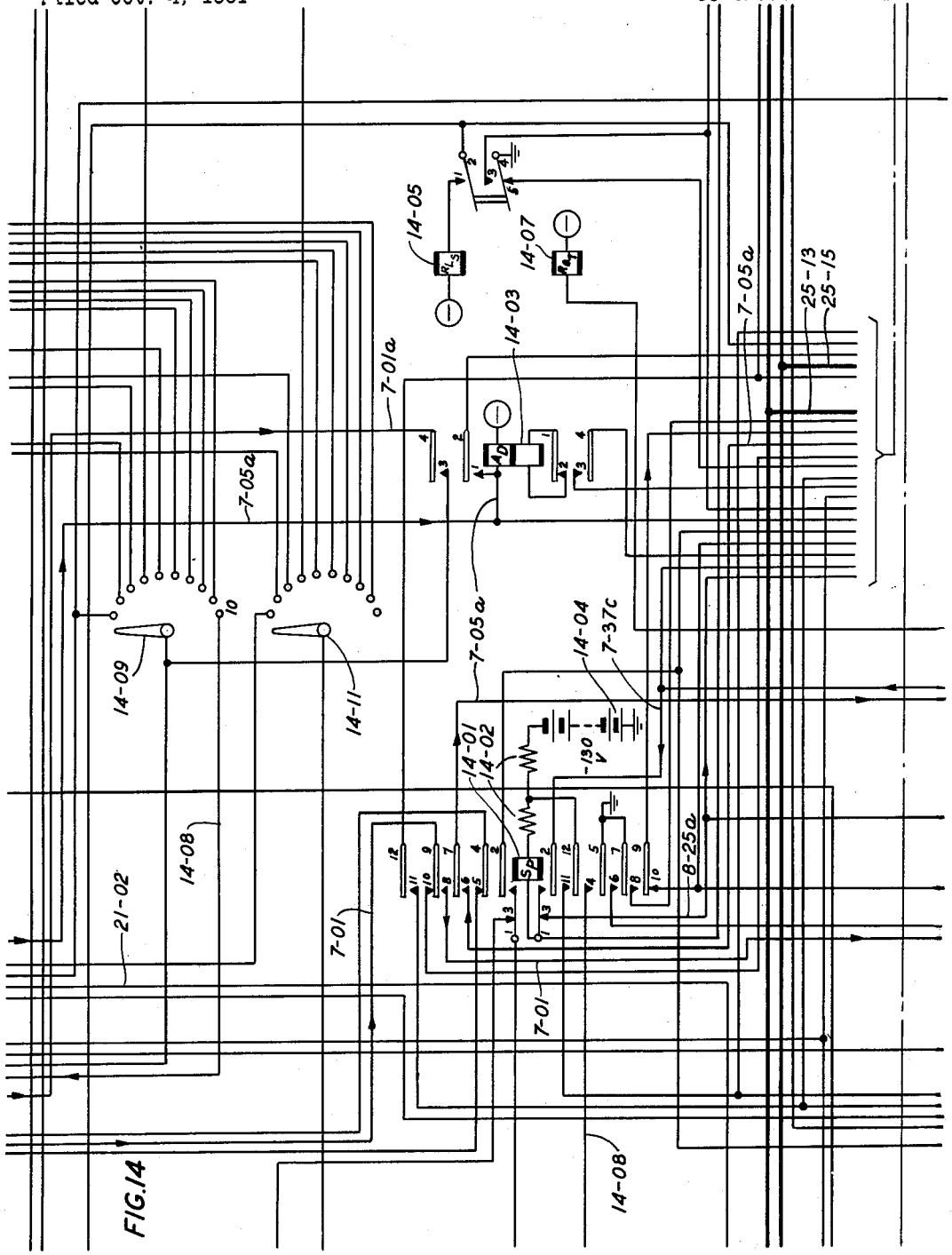
Figure 15:
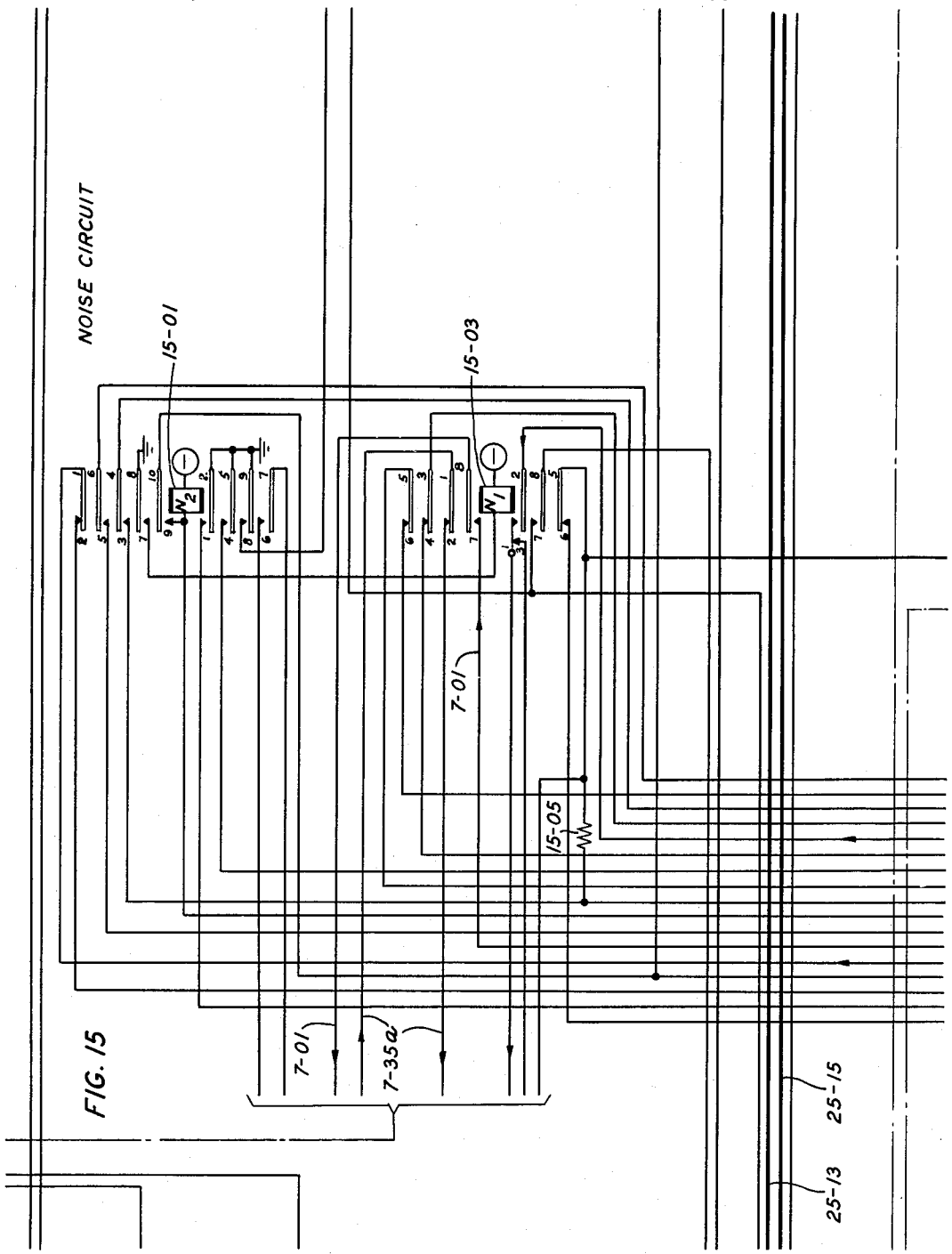
Figure 16:
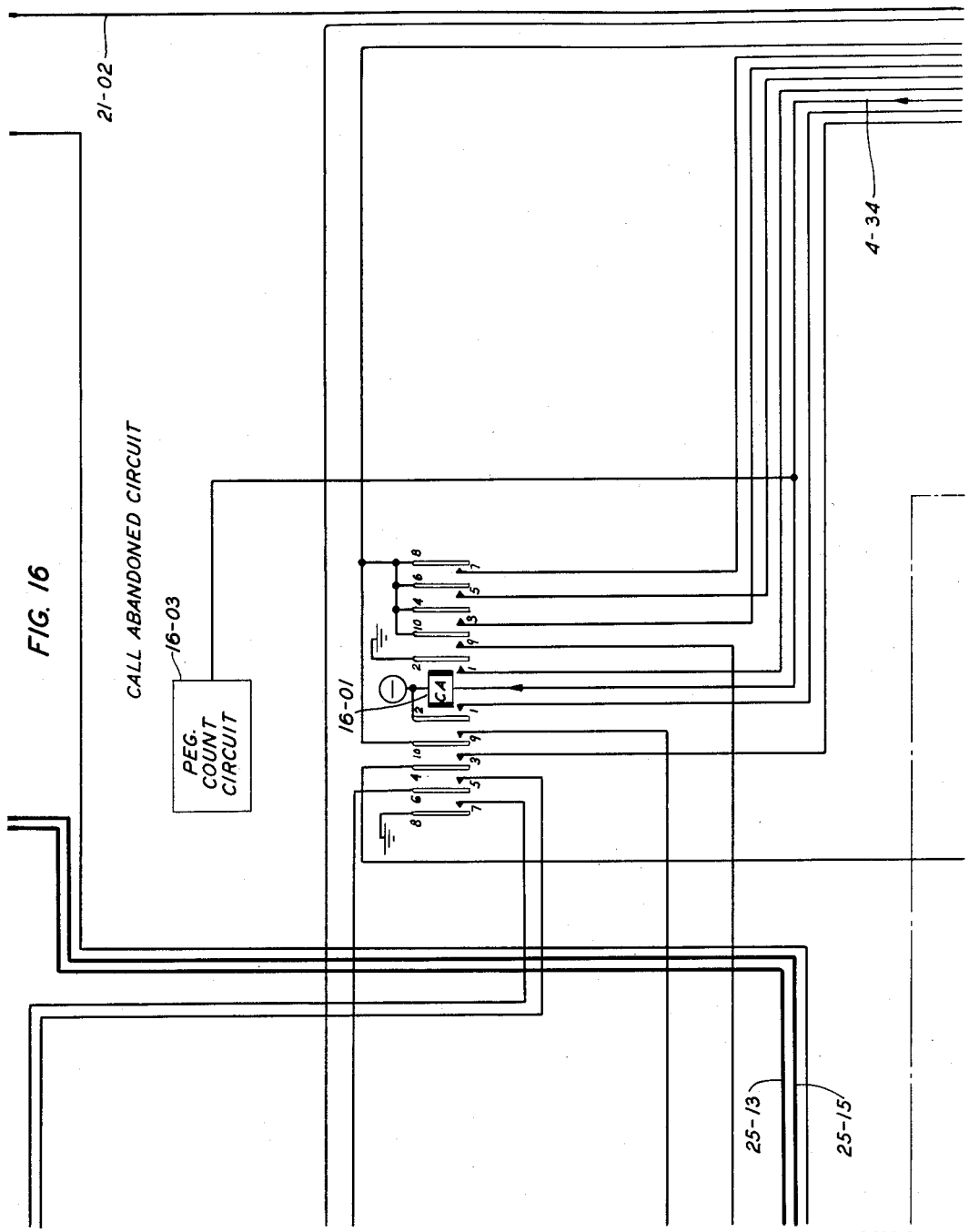
Figure 17:
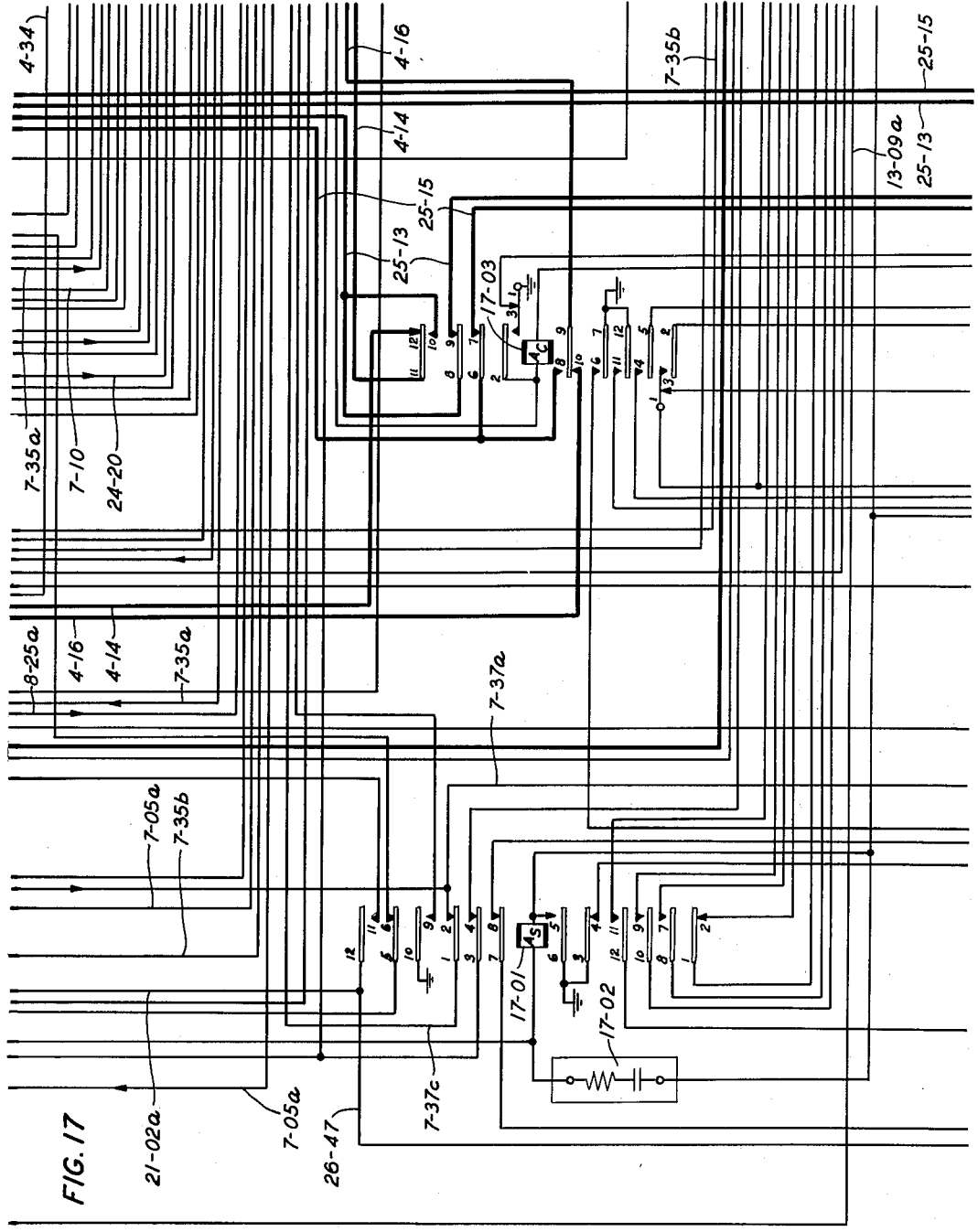
Figs. 17, 18, 22 and 23 show the Attenuator Checking Circuit.
Figure 18:
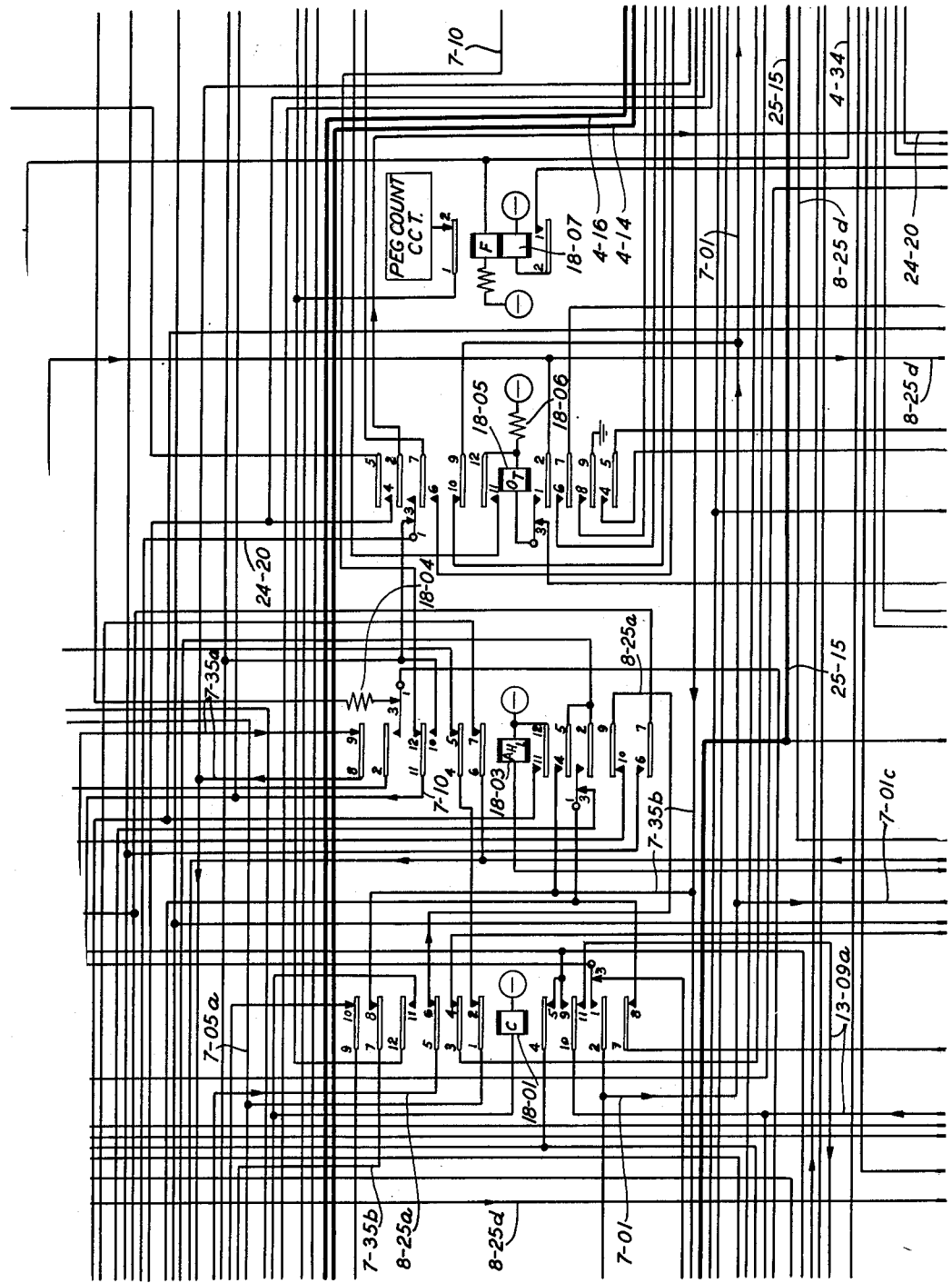
Figure 19:
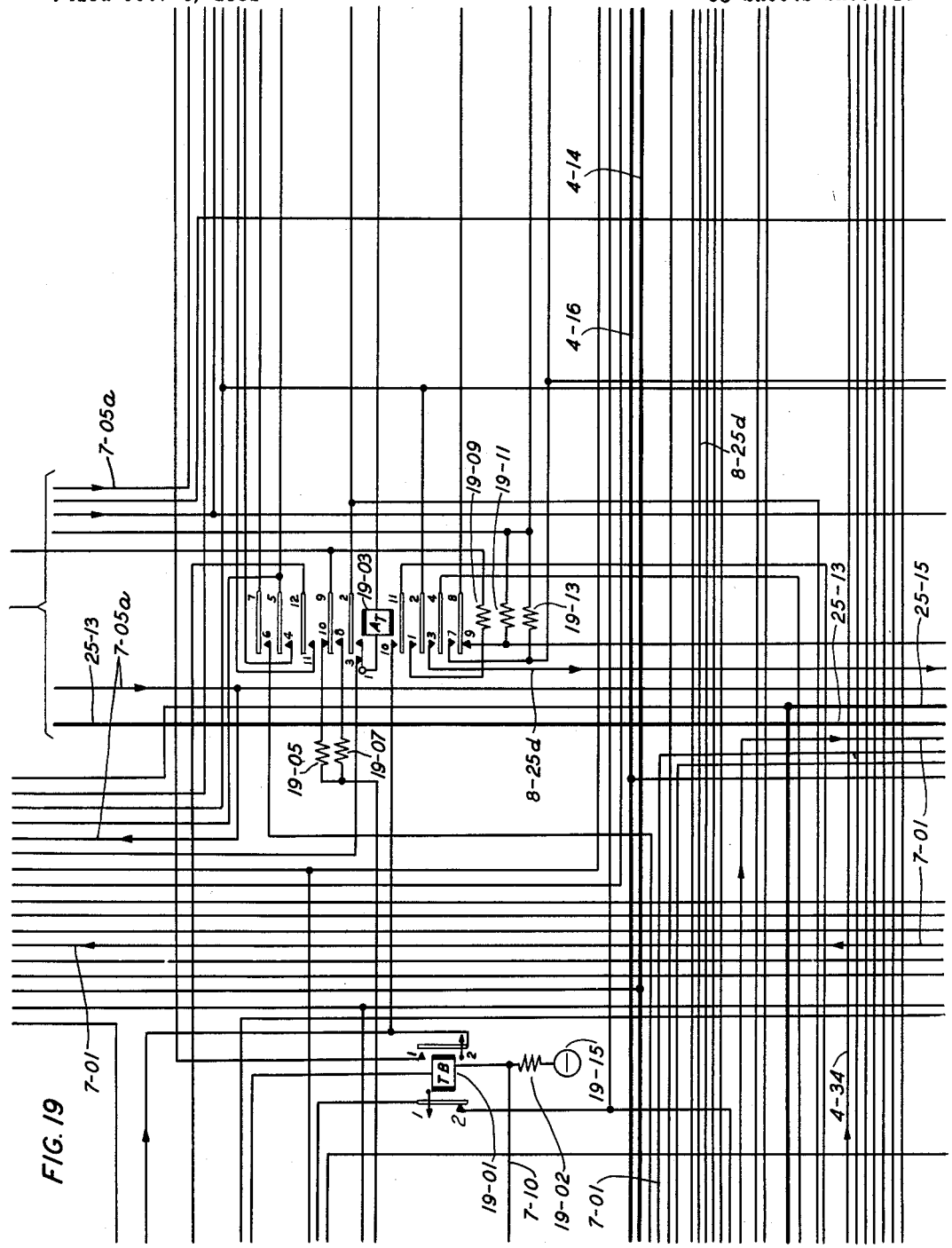
Figure 20:
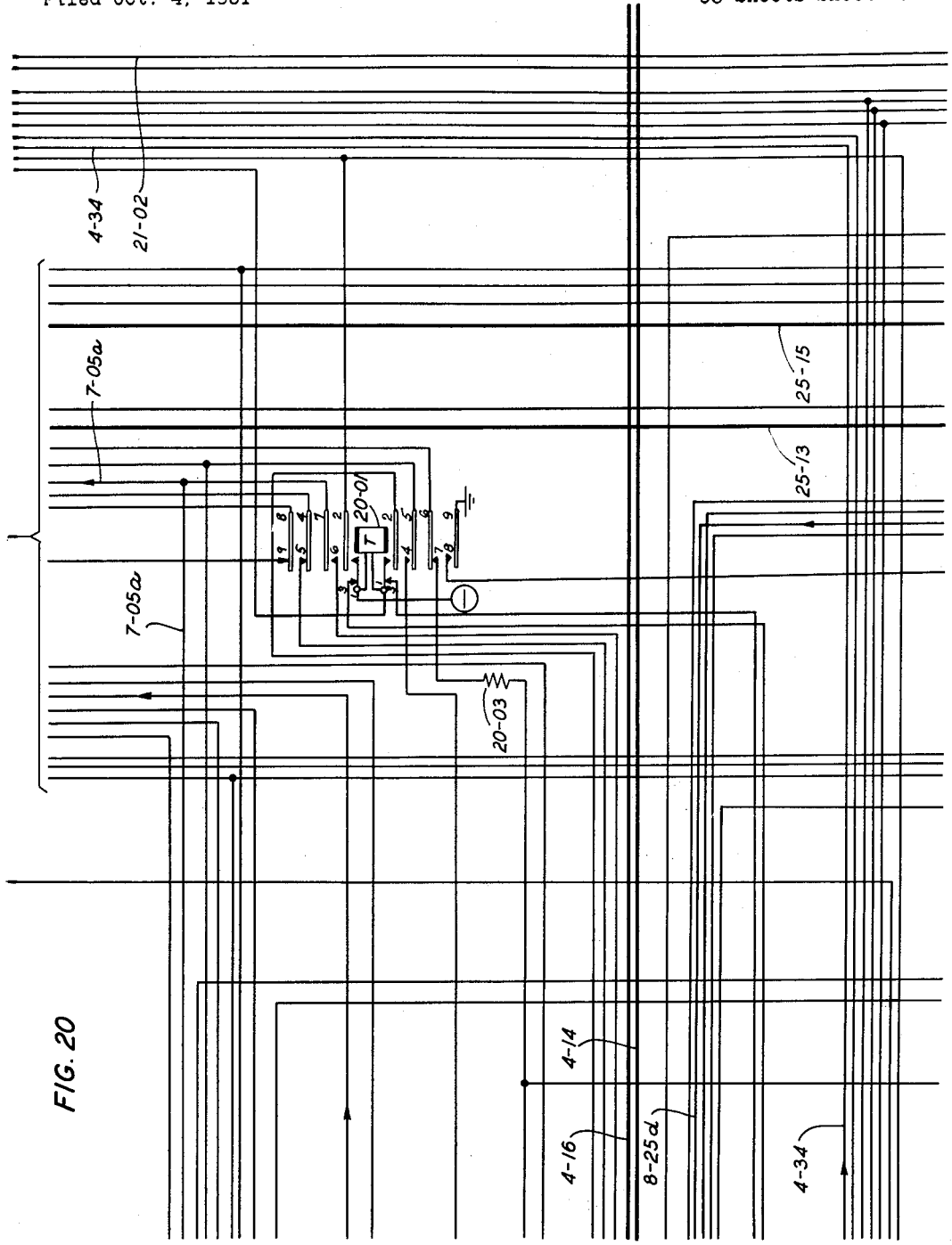

There is indicated in Figs. 2, 2A, and 3 of the drawings a typical telephone test circuit of the type contemplated by the present invention. The trunk lines 2–10 serve to interconnect a pair of switching stations respectively represented by a first central office or Near-Terminal in Figs. 2, 2A and another central office, designated the Far- Terminal shown in Fig. 3. The interconnecting trunk lines 2–10 extending between the two terminal sections may take various forms including carrier and non-carrier circuits, some comprising four wire circuits providing separate transmissions in the two directions, and others comprising two wire circuits in which the principal transmission path differences in the two directions occur in passing through the repeaters.

A few of the manifold purposes of the disclosed testing circuit, which represents a preferred embodiment of the present invention, may be represented as follows:

To measure the transmission loss between the Near-Terminal and the Far-Terminal in a telephone trunk line of one of the types indicated which interconnect a pair of telephone switching stations;

To provide for connection of a test tone of predetermined fixed strength to the aforesaid trunk line for measuring the transmission loss from the Far-Terminal to the Near-Terminal of the trunk, and to transmit the Near-Far loss measurement to the Near-Terminal of the trunk line.

The disclosed circuit is further designed to observe noise conditions on the Near-Far transmission channel, and to inform the test operator, or automatic test circuit at the Near-Terminal by means of suitable signals that the noise conditions on the channel are above or below some arbitrary standard.

Moreover, it is contemplated that the circuit of the present invention will also perform the following functions:

When not engaged in a test, it arranges to receive a signal from one of the associated test lines indicating that a connected trunk line is waiting to be tested, and to return a "seizure" signal which causes the test line in question to connect itself to the testing circuit, and to transmit a "ready" signal to the Near-Terminal of the connected trunk line indicating that it is prepared to proceed with the test.

An important feature of the invention is that by means of a self-adjusting, relay controlled, attenuator located at the Far-Terminal, the testing circuit is arranged in response to a tone of predetermined fixed strength, such as, for example, one milliwatt, a thousand cycles frequency, transmitted from the Near-Terminal, to measure and record the Near-Far transmission loss of the connected trunk line to be tested.

Moreover, there is provided a timing period of, for example, six seconds, at seizure of the Transmission Measuring and Noise Checking Circuit by the Parking Circuit which, if completed before the Far-Terminal circuit receives the test tone from the Near-Terminal, results in a disconnect signal to the connected Parking Circuit, and in a trouble signal to the Near-Terminal of the connected trunk line under test.

The transmission testing circuit at the Far-Terminal is further arranged, in accordance with another feature of the invention, to check the completed attenuator adjustment at the Far-Terminal against the received test tone level to determine whether the transmission loss of the Near-Far trunk channel has changed radically during attenuator adjustment. If the adjusted attenuator is more than a given fixed amount, say 0.5 decibel, above or below the actual transmission loss at the time of this check, the testing circuit releases the attenuator relays, and signals the Near-Terminal of the connected test trunk line for repetition of the test tone transmission.

Following the attenuator adjustment and check, the transmission testing circuit is further arranged to test the receiving and transmitting channels of the Far-Terminal attenuator for faulty relay contacts and/or faulty transmission pad resistors, and if the test indicates failure, to release attenuator relays and signal the Near-Terminal of the connected test trunk line for repetition of the test tone transmission.

After satisfactory adjustment, check and test of attenuator has been made, the said transmission testing circuit initiates a timing period of, for example, six seconds which, if completed before test tone from the Near-Terminal is removed, results in the disconnection of the connected transmission testing circuit, and in the transmission of a trouble signal to the Near-Terminal of the trunk line under test.

Further, the testing circuit is arranged to determine whether transmission tests are being made at the Near-Terminal of the connected test trunk line by a test operator, or by an automatic testing circuit.

In addition, the testing circuit is designed to connect a tone of predetermined fixed strength, say, one milliwatt, frequency, a thousand cycles per second, directly to Far-Near Channel for a time period of, for example, two seconds, if the Near-Terminal of test trunk line is connected to an automatic test circuit, or alternatively ten seconds, if the Near-Terminal is connected for manual operation. This is for the purpose of measuring the transmission loss of the Far-Near Channel.

Moreover, provision has been made for repetition of the one milliwatt test tone transmission when required by the Near-Terminal testing equipment.

In accordance with another feature of the invention, the testing circuit at the Far-Terminal is arranged to connect a test tone of predetermined fixed strength, say one milliwatt, frequency, a thousand cycles per second, through the transmitting pads of the attenuator to the Far-Near Channel of the connected test trunk line for a given time period, which, as in the previous operation may be, for example, two seconds if the Near-Terminal of the test trunk line is connected to the automatic test circuit, or ten seconds if the operation is manual, for the purpose of transmitting the Near-Far loss information to the Near-Terminal of the test trunk line.

Provision is made for repeating the operation described in the foregoing paragraph when required by the Near-Terminal testing equipment.

In accordance with another feature of the invention, after transmission tests are completed but before the test equipment is disconnected from the Near-Terminal of the trunk line under test, the testing circuit at the Far-Terminal is arranged to observe noise conditions on the Near-Far Channel for a period of, for example five seconds.

Following noise observation, the testing circuit is further designed to signal the transmission test line to disconnect itself and to send the Near-Terminal of the connected trunk line under test a disconnect signal if noise conditions are satisfactory, or otherwise a trouble signal.

In case of an abandoned call, the present illustrative circuit is arranged to signal the connected test line circuit to disconnect itself from the testing circuit and to return to normal.

Fig. 2 of the drawings shows in simplified block schematic a manually operated telephone switching terminal from which the tests originate, and which is labeled the Near-Terminal.

This includes a conventional type source 2–01 of one milliwatt, thousand cycle tone, the output terminal of which is connected to contact 1 of the three-way switch 2–05. Contact 1 engages the armature 4, which is connected to the jack 2–07a, the latter being adapted for the insertion of any one of the plugs 2–07b. Each of these plugs is connected to one of a plurality of outgoing trunk circuits 2–09, which may assume any of the forms conventionally used in telephone central stations.

The trunk line seized for test at the Near-Terminal which terminates in an incoming trunk circuit at the Far-Terminal is connected through one of the two-way transmission paths 2–10, of one of the types described in the foregoing paragraphs, to one of the Parking Circuits 3–13a, 3–13b, 3–13c located at the Far-Terminal. A decibel meter 2–03 of a conventional type is connected to the contact 2 of the switch 2–05, enabling the test operator to measure and make comparisons between a first tone received from the Far-Terminal which represents the far-near loss between the terminal and a second tone which represents the "round trip" loss between the terminals.

The signal indicator 2–04 connected to contact 3 of switch 2–05, may be a lamp, buzzer or similar device for apprising the test operator through coded indications of certain tests about to be made, or completed by the circuit at the Far-Terminal.

For the purposes of the present description, it will be assumed that the switching equipment at the Far-Terminal is automatic, of the type, for example, fully disclosed in Patent 2,382,893 to B. McKim et al., August 14, 1945. In such a system, as described in the aforementioned patent to McKim et al., the toll lines entering the crossbar toll switching system, terminate in incoming trunk lines from other offices such as, e. g., the lines 2–10 from the Near-Terminal. The incoming trunk lines are connected through a link circuit, 3–07 to a sender 3–09, or alternatively, a switchboard for completing the outward trunk connections. The sender 3–09, for example, is automatically selected and its registers set by pulsing or dial signals from a distant operator, and is automatically connected to marker 3–10, to which the code of the wanted toll line is transferred. The registers of the marker 3–10 function to operate a particular route relay for completing the trunk connection to the wanted office. The incoming trunk circuit 3–01, the link circuit 3–07, the sender 3–09, and the marker 3–10 may in general be assumed to be similar to the corresponding circuits 105, 106, 107 and 108 disclosed in Fig. 1 of McKim et al. supra.

In accordance with the present invention, the incoming trunk circuit under test from the Near-Terminal is connected through conventional incoming and outgoing link circuits 3–03 and 3–05 to the Transmission Test Circuit 3–11, structure and operation of which are described in detail hereinafter, through one of the circuits 3–13a, 3–13b, or 3–13c known as the Parking Circuits, also described in detail hereinafter. The Parking Circuits 3–13a, 3–13b, 3–13c provide a termination in the automatic switching system for transmission measuring and noise checking test calls originated by the test board operator, or alternatively by an automatic test circuit at the Near-Terminal. These circuits are arranged to connect the trunk circuits, signalling to be tested, to the Transmission Test circuit 3–11 on a cyclic, preferential basis, and to disconnect the test trunk line when so directed, transmitting a favorable or unfavorable signal to the test equipment at the Near-Terminal.

The trunk line under test connected by one of the Parking Circuits 3–13a, 3–13b, 3–13c to the testing circuit 3–11 is alternatively connected through a plurality of relay switches to either the receiving or transmitting branch of the Transmission Testing Circuit 3–11. The receiving branch includes an Amplifier 3–17, adapted to provide a fixed gain e. g., of 20 decibels, the amplifier output being fed to the Amplifier-Rectifier Circuit 3–21 through the Attenuator Control Mechanism 3–19, the latter comprising a system of multivibrator controlled attenuator pad relays which initially provide zero loss between the Amplifier 3–17 and Amplifier-Rectifier 3–21. This loss is automatically increased in correlation with the level of the received signal over the Near-Far Transmission Channel and may be as great as 19.9 decibels.

The transmitting branch of the Transmission Testing Circuit 3–11 includes a one milliwatt, thousand cycle tone source 3–23, which is connected through transmitting pads, also under control of the mechanism 3–19, to the relay switch 3–15, which in turn is connected to the outgoing Far-Near Channel of the trunk line under test through the Parking Circuit 3–13. The amount of loss remaining in the transmission path after the Attenuator Mechanism 3–19 is set corresponds to the loss of the Near-Far Channel of the trunk line under test.

As will be pointed out in detail hereinafter, the present invention centers about the multivibrator control circuit 3–19, including a stepping selector, and a plurality of relays arranged to operate successively to control the insertion and removal of attenuator pads, to test the accuracy of the settings, and to perform noise measurements, all at respectively different selector positions. These operations are carried out in successive steps of different time duration brought about by shifts in the bias on one or the other of the multivibrator grids through the operation of relays under multivibrator control.

In Fig. 2A of the drawings, there is shown in block schematic an automatic arrangement for the Near-Terminal, which may serve as an alternative to the manual equipment indicated in Fig. 2.

This includes the Outgoing Trunk Circuit 2–09 to one arm of which are connected conventional Incoming and Outgoing Link Circuits 2–11 and 2–13 leading to one branch of the Automatic Trunk Test Circuit 2–15, and to another arm of which is connected a Connector Circuit 2–21 leading to another branch of the Automatic Test Circuit 2–15. To the Automatic Trunk Test Circuit 2–15 are connected the Marker Connector 2–17 and Marker 2–19, which may be, for example, types such as disclosed in Patent 2,382,893 to McKim supra.

The equipment contained in the Automatic Trunk Testing Circuit 2–15 is in general of similar form to the Transmission Testing and Noise Checking Circuit 3–19 of Fig. 3, which will be described in detail hereinafter, in that the former utilizes a fixed gain amplifier followed by a relay-controlled Attenuator and Amplifier-Rectifier Circuit which cooperate to record both the "round-trip" and "far-near" line losses indicated by signals transmitted from the Far-Terminal, and certain other information as to the accuracy of the test, noise on the line, etc.

That portion of the specification which follows will be given over to a detailed description of the structure and operation of the circuit at the Far-Terminal, including Parking Circuits 3–13a, 3–13b, and 3–13c, and the Transmission Measuring and Noise Testing Circuit 3–11, the latter of which embodies any salient features of the present invention.

THE PARKING CIRCUITS

The intermediate connecting circuits 3–13a, 3–13b, and 2–13c, which will be known herein as the "Parking Circuits," are provided at the Far-Terminal as connections between the Transmission Measuring and Noise Checking Circuit 3–11 and the Outgoing Link Circuit 3–05 leading to the trunk lines to be tested, for the purpose of providing terminations for transmission measuring and noise checking test calls originated by a test board operator or automatic test circuit at the Near-Terminal. The aforesaid Parking Circuits are arranged for connection to the Transmission Measuring Circuit 3–11 at the Far-Terminal on a cyclic preferential basis, such as will be described hereinafter. They are also arranged to disconnect immediately from the Transmission Measuring Circuit 3–11, when so directed by that circuit, and to transmit a favorable or unfavorable signal as to the outcome of the transmission measurements and noise tests to the outgoing end of the trunk circuit 2–10 under test.

*General description of operation*

When the trunk line to be tested is seized at its distant end by a test board operator or by an automatic circuit for the purpose of making transmission measurements, the operation of the incoming or two-way trunk circuit 3–01 at the Far-Terminal causes a Sender 3–09 to be associated with the connection. A service coded signal is registered by the Sender 3–09, and a Marker 3–10 is called in to complete the connection through the Incoming and Outgoing Link Circuits 3–03 and 3–05 to one of a group of Transmission Test Lines or Parking Circuit (3–13). After the completion of this connection, the SL relay 4–01, 5–01 or 6–01 is energized in whichever of the terminating circuits is seized. This results in the sending of a "Call Waiting" signal, indicating to the Transmission Measuring Circuit 3–11 by connection of ground to the "Call Waiting" lead 4–13 that the trunk line is ready to be tested. The "Call Waiting" lead 4–13 originates in the terminating circuit indicated in Fig. 4 and passes through all of the terminating circuits as indicated in Figs. 5 and 6.

A seizure signal having a duration of 150 milliseconds is then given by connection of ground over the lead 8–01 originating in the Transmission Measuring Circuit 3–11 as an indication that this circuit is ready for service. Lead 8–01, which passes through each of the terminating circuits in Figs. 6, 5, and 4, applies ground to the energizing circuit of the TC relay in the terminating circuit of the preferred Test Line Circuit which has a test call waiting for service, causing this circuit to be connected to the Transmission Measuring Circuit 3–11.

The Transmission Measuring Circuit 3–11 thereupon passes a steady "off-hook" signal to the Near-Terminal of the connected trunk circuit as an indication to the distant test board operator or automatic test circuit to initiate a test.

When transmission measurements are completed, the Transmission Measuring and Noise Checking Circuit 3–11 automatically starts a noise check on the incoming transmission channel of the connected intertoll trunk line 2–10, unless the connection is released at the outgoing end of the connected trunk line. Following completion of the noise check, the Transmission Measuring Circuit 3–11 signals the connected Parking Circuit 3–13a, 3–13b, or 3–13c to disengage itself from circuit 3–11 and to pass a steady "on-hook" or reorder signal to the outgoing end of the test trunk line 3–10, depending upon whether the noise check was or was not satisfactory. In either case, TR and TR1 relays are operated in the preferred terminating circuit, guarding against a reconnection of that circuit to the Transmission Measuring Circuit until disconnection takes place at the originating end of the test trunk line 2–10. This operation accordingly alters the preferential chain circuit, thereby advancing the preference to the next transmission test line in the group, as will presently be described.

The gating and preference circuit through the TR1 relays 4–09, 5–09, 6–09, and the SL relays 4–01, 5–01 and 6–01 is so arranged that in case of a quick reseizure, the transmission test line just served will not be served again until all prior waiting test calls have been served by the Transmission Measuring Circuit 3–11.

*Gating and preference arrangement*

Circuitwise, any number of Test Line Circuits may be associated with a single toll Transmission Measuring and Noise Checking Circuit, such as described hereinafter. Fig. 4 represents a preferred arrangement for the first circuit in the group, and Fig. 6, for the last circuit in the group. Any number of intermediate circuits may be preferably arranged as shown in Fig. 5 of the drawings. Practically, there is a definite limit to the number of test lines which may be associated with a single Transmission Measuring Circuit. This limit is determined largely by the maximum length of time it is tolerable to delay access of this circuit to calls from an originating test board operator or automatic test circuit. Since the length of time for completing a transmission measurement and making a noise check varies from 13 to 40 seconds, depending upon whether the test is made on an automatic or manual basis, it is necesary to limit the number of transmission test lines associated with a single set of transmission measuring and noise checking equipment to approximately three. If we assume, during the busy hour, that all of the test lines are being picked by hunting markers, and that the transmission test lines essentially become "parking" circuits until the Transmission Measuring and Noise Checking Circuit 3–11 is available, a group of three transmission test lines may offer a delay of from 1 to 1½ minutes. Any additional transmission test lines will, of course, increase this busy hour delay.

The Seizure lead 8–01 from the Transmission Measuring and Noise Checking Circuit 3–11 is carried through the left-hand normally-closed contacts 8–9 in each of the several TR1 relays 6–09, 5–09, and 4–09 of the Parking Circuit 3–13, beginning at the last line and extending through to the first. This chain is then further extended through the normally closed upper contacts 5–6 on each of SL relays 4–01, 5–01 and 6–01 from the first test line to the last. This arrangement has been chosen to insure that all prior waiting test calls have been served by the Transmission Measuring Circuit 3–11 before a new call on any one of the test lines is served. Ordinarily, a hunting marker tests a group of trunks numerically from the first to the last in seeking an idle trunk, but in the case of a second attempt, the marker starts hunting from the last trunk in the group downward. It is, therefore, impractical to assume that each call will be handled in exactly the same sequence in which the test lines are seized. However, with this particular chain arrangement it is feasible to insure that all prior waiting test calls will be served before a new call originated on any test line is served. Furthermore, it is desirable for each test line to be isolated from the preference chain after being served by the Transmission Measuring Circuit 3–11, but before being released by the distant test operator or automatic test circuit.

For example, let us assume a chain of three test lines in which a test call has been completed to each one of the test lines. Furthermore, let us assume that the Transmission Measuring Circuit 3–11 has served all three calls, but that, because of a slow disconnection at the originating end, SL relay 4–01 in Fig. 4 is still operated; however due to quick disconnection in the case of the test call on the second test line, SL relay 5–01 is now released. Since the third call was the last call served, TR relay 6–05 in the last test line is locked operated under control of engaged contacts 3 and 2 to ground under control of TC relay 6–03, and if that relay should release, under control of right-hand contacts 3 and 4 of TR relay 4–09 released in the first test line circuit, to lead 9–01, which is grounded in the Transmission Measuring Circuit 3–11. The second test line is connected to the Transmission Measuring and Noise Checking Circuit 3–11 in a manner which will now be described.

*Trunk seizure*

Assume that one of the Parking Circuits 3–13a, 3–13b, 3–13c is seized by a hunting marker. Ground is connected through the lead 5–24 to the trunk block connector circuit, causing this circuit to give a busy signal to other hunting markers. The connected marker makes its conductor continuity tests through a pair of paths, one of which paths includes the incoming trunk conductor 5–14, the normally closed left-hand contacts 8 and 9 of the TC relay 5–03, the 850 ohm resistor 5–29, and the incoming trunk conductor 5–16; and the other of which paths includes the outgoing trunk conductor 25–15′, the normally closed lower contacts 2 and 3 of TC1 relay 5–04, the 850 ohm resistor 5–28, the normally closed right-hand contacts 7 and 8 of TC relay 5–03, and the outgoing conductor 25–13′.

The SL relay 5–01 is subsequently locked operated over a path which passes through its own normally open upper contacts 2 and 1 which close after the release of the contacts 1 and 3, and through the lead 5–19 which is connected to ground in the Outgoing Link and Connector Circuit 3–5.

The operation of SL relay 5–01 initiates the following functions:

(a) Connection of ground to the lead 5–24 through its normally open lower contacts 1 and 2;

(b) Connection of ground to the Call-Waiting lead 5–13 through a path which includes its normally open lower contacts 4 and 5 and the normally closed left-hand contacts 3 and 4 the TR1 relay 5–09, thereby indicating to the Transmission Measuring Circuit 3–11 that there is a test call waiting; and (c) Connection of the windings of TC relay 5–03 and TC1 relay 5–04 to the lead 8–01 through the preferential chain circuit which includes its upper normally open contacts 4 and 5, and the normally closed left-hand contacts 8 and 9 of TR1 relay 4–09, thereby completing connection to the Transmission Measuring Circuit 3–11 preparatory to being seized by that circuit.

When the Transmission Measuring Circuit 3–11 is ready, it connects ground for a period of 150 milliseconds to lead 8–01, which energizes TC relay 5–03, of the second test line, through a path which includes the following: The normally closed left-hand contacts 8 and 9 of TR1 relays 6–09, and 5–09, in the third and second line circuits, the normally open contacts 7 and 8 of TR1 relay 4–09 in the first line circuit, lead 4–32, normally open upper contacts 4–5 of SL relay 5–01, and normally closed right-hand contacts 6 and 7 of TR1 relay 5–09.

Operation of TC relay 5–03 performs the following functions:

(a) It locks itself operated through its own normally open left-hand contacts 10—11, through a circuit which includes the normally open contacts 7T—8T to ground of SL relay 5–01;

(b) It opens its normally closed left-hand contacts 8 and 9, and its normally closed right-hand contacts 7 and 8, respectively removing resistors 5–28 and 5–29 from incoming and outgoing trunk connectors 5–14 and 25–15' which connect with the Outgoing Link and Connector Circuit 3–15;

(c) It prepares in part a locking circuit for TR relay 5–05 which passes through the normally open right-hand contacts 4 and 5 of TC relay 5–03;

(d) It connects leads 5–14, 5–16, 25–15' and 25–13' respectively through left-hand pairs of contacts 7 and 8, and 3 and 4, and the right-hand pairs of contacts 9 and 10, and 6 and 7 to the Transmission Measuring and Noise Checking Circuit 3–11.

The connected circuit remains in this condition until the Transmission Measuring and Noise Checking Circuit 3–11 signals it to disconnect.

*Transmission measuring and noise checking equipment signals "Release" following satisfactory operation*

In this case, let us assume that the Transmission Measuring and Noise Checking Circuit 3–11 has satisfactorily completed the necessary transmission measurements and has registered that the noise level of the connected trunk line under test is within satisfactory limits. When Circuit 3–11 has completed its operation, it connects ground to the lead 7–01 for a period of 150 milliseconds which causes the operation of TR relay 5–05 in the second test line circuit, indicated in Fig. 5, through a path which includes the normally open contacts 4—5 of the TC relay 5–03, and the normally closed contacts 1 and 3 of the TR relay 5–05. Under the conditions indicated in the previous section, it may be assumed that the TC relays 6–03 and 4–03 in the third and first transmission test lines are operated, and that the TR relays 4–05 and 6–05 in both these test lines are also operated and locked.

Operation of the TR relay 5–05 in the second test line circuit causes the following functions to be performed:

(a) It locks itself operated through a path to ground which includes its own right-hand normally open contacts 2 and 3 and the normally open right-hand contacts 2 and 3 of the relay 5–03;

(b) It breaks connection between its normally operated left-hand contact combinations 5 and 6, and 3 and 4, and its normally operated right-hand contact combinations 1T and 2T, and 5 and 6, respectively disconnecting the incoming and outgoing trunk conductors 5–14, 5–16, 25–15' and 25–13' from the Outgoing Link Connector Circuit 3–05, causing a steady "on hook" signal to be transmitted over the connected intertoll trunk line under test, indicating to the test board operator or the automatic test circuit at the Near-Terminal that the test trunk line should be released, and that the noise observation made by the Transmission Measuring and Checking Equipment is satisfactory;

(c) It causes the operation of TR1 relay 5–09 by connecting ground to the energizing circuit of the same through its right-hand contacts 7 and 8; and (d) By breaking connection of its left-hand contacts 8 and 9 it disconnects the winding of RO relay 5–07 in the circuit of Fig. 5 from the Reorder lead 7–05 to the Transmission Measuring and Noise Checking Circuit 3–11.

Operation of the TR1 relay 5–09 causes the following functions to be performed:

(a) By disengaging its normally closed right-hand contacts 2 and 8, it breaks the locking circuit of the TR relay 4–05 in the first test line terminating circuit indicated in Fig. 4, in case the SL relay 4–01, and the TC relay 4–03 in Fig. 4 release while the second test line is being served;

(b) By engaging its normally open right-hand contacts 5 and 6, it connects lead 4–32 from the first test line to lead 4–32 in the third test line, through a path which includes the normally open upper contacts 4 and 5 of SL relay 5–01 preparing for the operation of TC relay 6–03 in the third test line circuit in case that circuit should be released and reseized.

(c) By breaking connection between its normally closed left-hand contacts 3 and 4, it disconnects ground which is connected under control of the SL relay 6–01 through the Call Waiting Lead 4–13 to the Transmission Measuring Circuit 3–11, thereby releasing the ON relay 7–07 in that circuit, providing there are no other calls waiting;

(d) It connects the lead 8–01 from the third test line directly to lead 4–32 in the third test line through its normally open left-hand contacts 8 and 7; and (e) It disconnects the circuit including lead 8–07 which passes from the Transmission Measuring and Noise Checking Circuit 3–11 to TC relay 5–03 by breaking connection between the normally closed contacts 1 and 2 from the locking circuit of relay 5–09 leaving the TC relay 5–03 under control of upper contacts 7 and 8 of relay 5–01.

The energizing circuit of TR relay 6–05 is under control of the TC relay 6–03 through the normally open right-hand contacts 4 and 5, and hence TR relay 6–05, and TR1 relay 6–09 are under control of the Transmission Measuring and Noise Checking Circuit, in case the third test line is reseized.

If no further calls are received before disconnection occurs at the originating end of the connected intertoll test trunk line, SL relay 5–01 releases when earth in the Outgoing Link and Connector Circuit 3–05 is disconnected from the lead 5–19 as the cross points release. This in turn, causes the release of TC relay 5–03, TR relay 5–05, and the TR1 relay 5–09.

On the other hand if the third test line had been seized prior to the release of the second test line, TR and TR1 relays 5–05 and 5–09 of the second test line remain operated under control of the TC relay 5–03 which is released to ground on the off normal lead to the Transmission Measuring and Checking Circuit 5–11, through a path which includes normally open right-hand contacts 2 and 3 of TR relay 5–05, the normally closed right-hand contacts 1 and 3 of TC relay 5–03, and the normally closed right-hand contacts 1 and 2 of TR1 relay 6–09. This insures that the preference will be passed to the first test line whenever the Transmission Measuring and Noise Checking Circuit 3–11 signals the third test line to release.

Transmission measuring and noise checking equipment signals "Release" following unsatisfactory operation In this case, the operation is substantially the same as that described in the previous section, except that ground is connected to the Reorder lead 7-05 by the Transmission Measuring and Noise Checking Circuit 3-11, instead of the release lead 7-01 for a period of 150 milliseconds. This causes the operation of RO relay 5-07 through a path which includes the normally open left-hand contacts 5 and 6 of the TC relay 5-03, and the normally closed left-hand contacts 8 and 9 of the TR relay 5-05.

Operation of the RO relay 5-05 causes the following operations to be performed:

(a) It is locked operated through a path which includes the normally open contacts 8T and 7T of the SL relay 5-01;

(b) It engages its upper contacts 3 and 4 to connect resistor 5-28 across the trunk conductors 25-15' and 25-13' which lead to the Outgoing Link and Connector Circuit 3-05;

(c) It causes the operation of the TR relay 5-05 by closing its lower contacts 1 and 2 to ground.

Operation of the TR relay 5-05 functions as described in the previous section. However, RO relay 5-07 operated connects the midpoint of resistor 5-28 through the normally open contacts 7 and 8 of the SL relay 5-01 and its own lower normally open contacts 3 and 4 to the "interruptor" RO; hence, instead of a steady "on hook" signal being transmitted over the intertoll test trunk circuit, a reorder signal is transmitted which indicates to the test operator or automatic test circuit at the Near-Terminal that the Transmission Measuring and Noise Checking Circuit 3-11 has completed its operations, including a noise level test; but that the observed noise level was too high.

From this point on, the operation is similar to that described in the previous section, except that the release of SL relay 5-01, breaking connection between its contacts 7T and 8T to ground causes the release of TC relay 5-03 and RO relay 5-07, the latter of which breaks connection between its lower contacts 1 and 2 to ground releasing the TR relay 5-05, which in turn breaks connection between its right-hand contacts 7 and 8 to ground deenergizing the TR1 relay 5-09. These operations occur, providing the third test line has not been reseized while the second test line is being served.

Parking circuit operations in response to call abandoned signal

A test call may be abandoned at any time. Ordinarily the Transmission Measuring and Noise Checking Circuit 3-11 will make a noise measurement following the completion of the transmission measurements. However, there may be times when it is desirable to make transmission measurements alone, and eliminate the noise tests. In such cases, the test operator or automatic test circuit at the Near-Terminal may disconnect as soon as the transmission measurements are completed. This causes immediate release of the SL relays 4-01, 5-01, 6-01. However, the TC relay 5-03 will remain locked in operation under the control of the conductor 8-07 from the Transmission Measuring and Noise Checking Circuit 3-11 through a path which includes the left-hand contacts 1 and 2 of the TR1 relay 5-09. Release of the SL relay 5-01 with the TC relay 5-03, engaged, causes ground to be connected to the "Call Abandoned" lead 4-34 through a path which includes the lower normally closed contacts 5 and 6 of the former, and the left-hand normally open contacts 1 and 2 of the latter. This causes the operation of the CA relay 16-01 in the Transmission Measuring and Noise Checking Circuit 3-11, which thereupon advances to the "release" condition, and causes the release of the relays of the Parking Circuit 3-13 in the same manner as described in the previous section. In this case, since the SL relay 5-01 is already released, TC relay 5-03 releases as soon as TR1 relay 5-09 operates, breaking the energizing circuit of the latter. If the next test line in succession, which is the third in this case, has been seized while the second line is being served, TR relay 5-05 in the second test line will remain locked through a locking path which extends through its own right-hand normally open contacts 2 and 3, through the normally closed contacts 1 and 3 of TC relay 5-03, and through the normally closed contacts 1 and 2 of TR1 relay 6-09, to ground through the ON lead 9-01 which connects to the Transmission Measuring Circuit 3-11.

Removing transmission test line circuit from service

Make Busy jacks 4-40, 5-40, and 6-40 have been provided in each of the circuits to provide for the removal of a test line from service when a cordless plug is inserted in the respective one of these jacks. The corresponding lead 4-24, 5-24 or 6-24 to the trunk block connector circuit and to the automatic test circuit is disconnected from battery and connected to ground, making the Parking Circuit 3-05 test "busy" to the operator, or to the automatic test circuit at the Near-Terminal, and to all hunting markers.

THE MULTIVIBRATOR CIRCUIT

The "nerve center" of the Transmission Measuring and Noise Testing Circuit 3-11 is a multivibrator comprising the two three-electrode vacuum tubes 12-01 and 12-02. This circuit is the control mechanism which directs the sequence and timing of all of the operations performed by the test circuit. This is carried out through a complex system of relays connected to each of the grids of tubes 12-01 and 12-02, which operate under control of the multivibrator itself to change the grid biases at different points in the operational cycle, thereby varying the period and mode of operation in accordance with the particular test function to be performed. Throughout the circuit description tubes 12-01 and 12-02 will be referred to as "triodes," although actually they are twin triodes within a single envelope.

Figure 27:
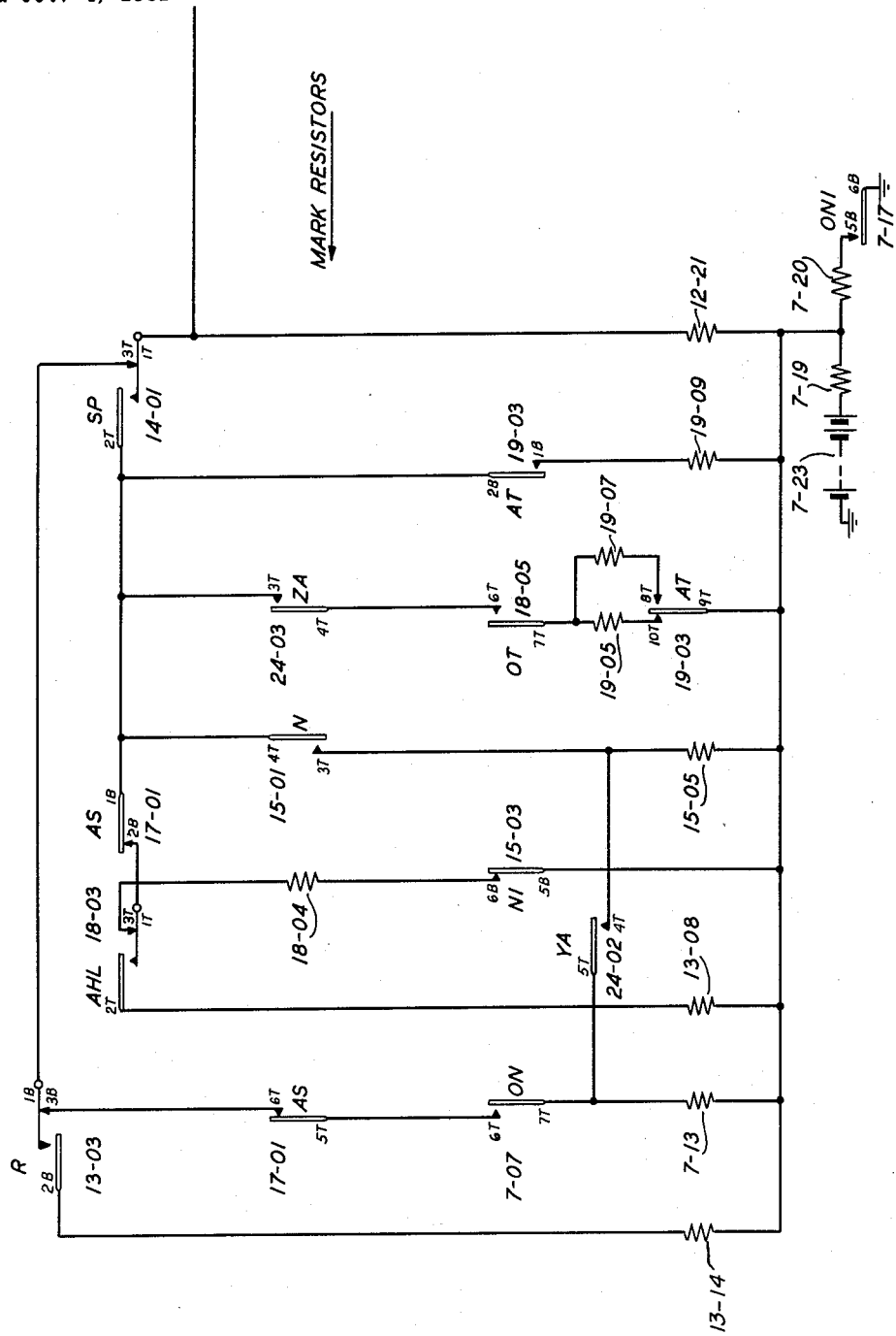
Figure 28:
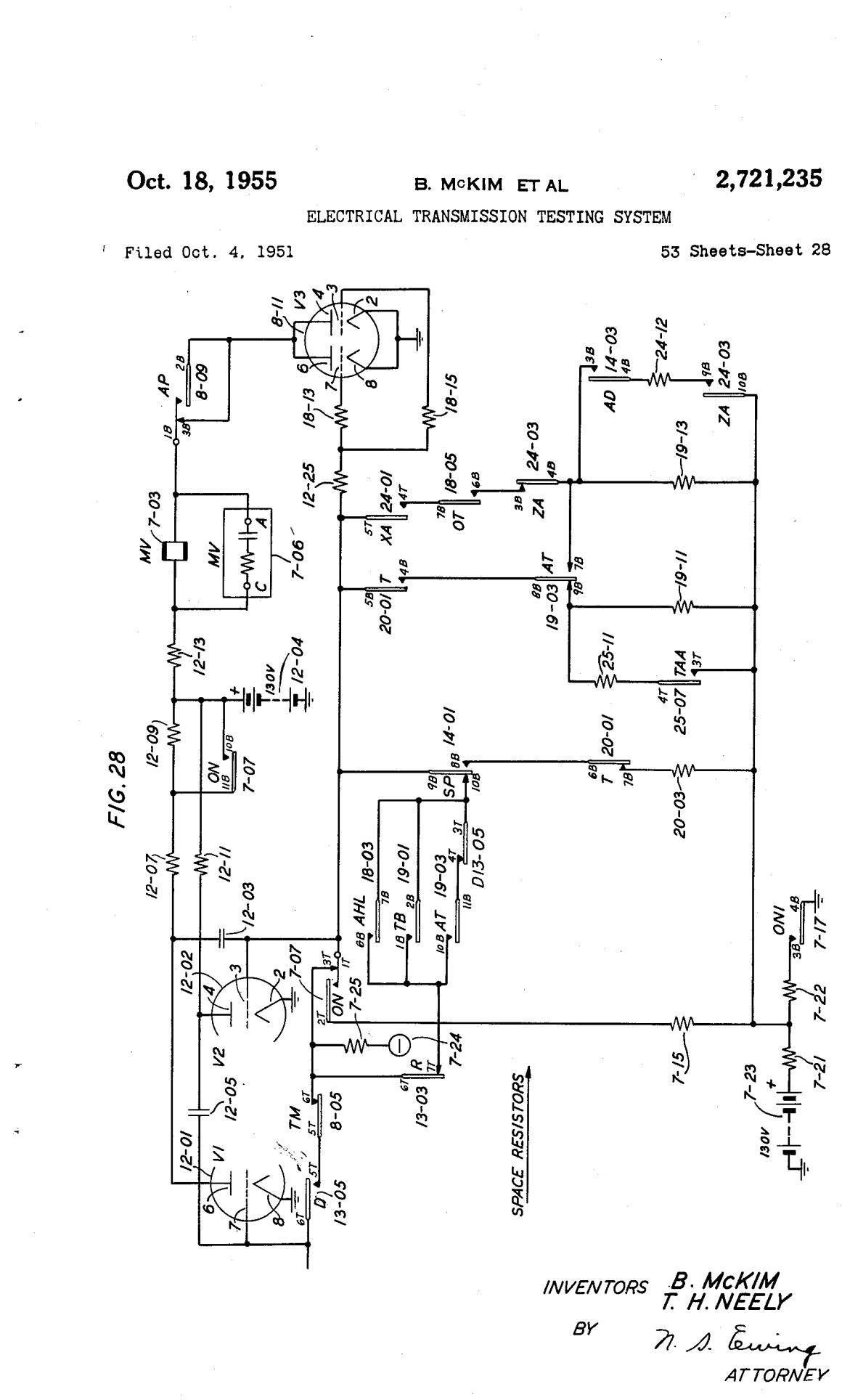

Figs. 27 and 28 of the drawings give a schematic showing of the multivbrator circuit, including details of the plate load circuit and the grid timing resistors, which is simplified to show connections through the various relay contacts without including the energizing circuits of these relays. The contacts are shown in their normally open or closed conditions.

The plate circuit of tube 12-01 is connected to the grid of tube 12-02 through a 1.08 microfarad condenser 12-03; and the plate circuit of tube 12-02 is connected to the grid of tube 12-01 through a 3.24 microfarad condenser 12-05. The twin plates are energized from a 130 volt positive potential source, the plate energizing circuit for tube 12-01 including the 10,500 ohm resistor 12-07 in series with the 39,700 ohm resistor 12-09, and the plate energizing circuit for tube 12-02 including the 10,500 ohm resistor 12-11. Under control of the normally open lower contacts 10 and 11 of ON relay 7-07, the plate circuit of tube 12-01 is provided with an additional 130 volt energizing source connected directly in parallel with the source and resistor 12-09.

The energizing circuit for MV relay 7-03 passes from the positive pole of 130 volt battery 12-04, through the 1600 ohm resistor 12-13 in series with the winding of MV relay 7-03, and through the normally closed lower contacts 1-3 of AP relay 8-09 (which are shunted by its normally open lower contacts 1 and 2) to the plate circuits of the twin triode 8-11. The winding of MV relay 7-03 is shunted by a protective circuit 7-06 which includes an 0.1 microfarad condenser in series with a 510 ohm resistor.

The cathodes of the triodes 12-01 and 12-02, and of twin triode 8-11 are all connected to ground.

Those resistors comprising the resistance network connected to the grid of tube 12-01 are called the "mark" resistors, because the bias which their combined values imposes on that grid determines the duration of the "mark" pulse of the multivibrator output.

Similarly, those resistors connected to bias the grid of tube 12–02 are called "space" resistors since the bias presented by their combined values determines the length of the multivibrator "space" period.

The 48 volt negative potential source 7–24 in series with the 210 ohm resistor 7–25 is arranged for alternative application to either of the grids of tubes 12–01 or 12–02 under control of the various relay contacts.

The path from the negative source 7–24 to the grid of tube 12–01 passes through the normally closed upper contacts 5 and 6 of TM relay 8–05 and through the normally open upper contacts 6 and 5 of D relay 13–05.

The path from the negative source 7–24 to the grid of tube 12–02 passes through a complex circuit which includes a first path directly to the aforesaid grid through the normally closed upper contacts 1 and 3 of the ON relay 7–07. This path is shunted by another path which passes through the normally closed upper contacts 6 and 7 of R relay 13–03 and through three parallel circuit branches, one of which passes through the normally open lower contacts 6 and 7 of AHL relay 18–03, the second of which passes through the normally open lower contacts 1 and 2 of TB relay 19–01, and the third of which passes through the normally open lower contacts 10 and 11 of the AT relay 19–03, and the normally closed upper contacts 3 and 4 of D relay 13–05. The junction of the three branches passes through the normally closed lower contacts 9 and 10 of SP relay 14–01, contact 9 of which is connected to the grid of tube 12–02.

The mark resistors are connected in a complex network arrangement between the grid of tube 12–01 and a junction between resistors 7–19 and 7–20, which are connected in series with the 130 volt positive potential source 7–23 to ground under control of the normally open lower contacts 5 and 6 of ON1 relay 7–17. A first branch, which includes the 3.44 megohm resistor 12–21, is connected directly between the grid of tube 12–01 and the junction between resistors 7–19 and 7–20. A second branch, which includes the 1.13 megohm resistor 19–09 is connected through the normally open lower contacts 1 and 2 of the AT relay 19–03 to upper contact 2 of SP relay 14–01, the normally open upper contact 1 of which is connected to the grid of tube 12–01. A third and a fourth branch are also connected between the upper contact 2 of SP relay 14–01 and the aforesaid junction of resistors 7–19 and 7–20. The third branch passes through the normally open upper contacts 3 and 4 of the ZA relay 24–03, the normally open, upper contacts 6 and 7 of the OT relay 18–05, and the parallel resistors 19–05 of 178,000 ohms, and 19–07 of 101,000 ohms which are respectively connected to upper contacts 10 and 8 of AT relay 19–03, the contact 9 of which is normally engaged with contact 10. The fourth branch includes the normally open upper contacts 3 and 4 of N relay 15–01 in series with the 3.4 megohm resistor 15–05. Also connected to the upper contact 2 of the SP relay 14–01 is the lower contact 1 of AS relay 12–01 which is normally engaged with its lower contact 2, which is in turn connected to the upper contact 1 of the AHL relay 13–03 which normally engages its upper contact 3. To this contact is connected a fifth branch of the network which includes the 30,100 ohm resistor 18–04 in series with the normally closed lower contacts 5 and 6 of N1 relay 15–03, the former of which is connected to the aforesaid junction between resistors 7–19 and 7–20. A sixth branch of the circuit is connected between the upper contact 2 of AHL relay 18–03, normally disengaged from its upper contact 1, through the 16,700 ohm resistor 13–08 to the junction between resistors 7–19 and 7–20. A seventh and an eighth branch of the circuit are connected respectively to lower contact 2 and to lower contact 3, the former of which is normally open, and the latter of which is normally closed with respect to contact 1 of R relay 13–03.

Lower contact 1, is in turn, connected to the upper contact 3 of SP relay 14–01, normally engaged with contact 1 of that relay. The seventh branch of the circuit passes through the normally closed upper contacts 6 and 7 of ON relay 7–07, and the 64,900 ohm resistor 7–13 to the junction of resistors 7–19 and 7–20. The armature 7 of ON relay 7–07 is also cross-connected through the normally open upper contacts 4 and 5 of YA relay 24–02 to the upper contact 3 of N relay 15–01. The eighth branch of the "marking" circuit is connected between the lower contact 2 of R relay 13–03, normally in disengagement with respect to lower contact 1 of that relay, and the aforesaid junction of resistors 7–19 and 7–20 through the 226,000 ohm resistor 13–14.

A network of space resistors is connected between the grid of tube 12–02 and the junction between resistors 7–21 and 7–22 which are connected in series from 130 volt positive potential source 7–23 to ground under control of the normally open contacts 4 and 3 of ON1 relay 7–17.

A first branch is connected to the aforesaid junction through the normally open upper contacts 2 and 1 of ON relay 7–07 and the 3.79 megohm resistor 7–15. The upper contact 3 of relay 7–07 is normally closed to upper contact 1, connecting a path directly from the negative potential source 7–24 through the 210 ohm resistor 7–25 to the grid of tube 12–02.

The second branch of the circuit is connected between the grid and the junction of resistors 7–21 and 7–22 through the lower contact 9 and normally open contact 8 of SP relay 14–01, the normally closed lower contacts 6 and 7 of T relay 20–01, and the 82,500 ohm resistor 20–03.

A third branch of the circuit is connected from the grid of tube 12–02 to the junction of resistors 7–21 and 7–22 through the normally open lower contacts 4 and 5 of T relay 20–01, the normally closed lower contacts 8 and 9 of AT relay 19–03, and a parallel path which includes as one branch the 148,000 ohm resistor 25–11 connected through the upper normally open upper contacts 4 and 3 of TAA relay 25–07, and as the other branch the 4.59 megohm resistor 19–11.

A fourth branch of the circuit is connected between the grid of tube 12–02 and the aforesaid junction through the normally open upper contacts 4 and 5 of XA relay 24–01, the normally open lower contacts 6 and 7 of OT relay 18–05, the normally closed lower contacts 3 and 4 of ZA relay 24–03, and a parallel circuit which includes, as one branch, the 0.556 megohm resistor 19–13, and as the other branch the normally open lower contacts 3 and 4 of AD relay 14–03 in series with the 0.34 megohm resistor 24–12 and the normally open lower contacts 9 and 10 of ZA relay 24–03. The lower contact 4 of the ZA relay 24–03 is cross-connected to the normally open contact 7 of AT relay 19–03.

Connection is made between the grid of tube 12–02 and the twin grids of tube 8–11 through a circuit which includes the 225,000 ohm resistor 12–25 and respective parallel branches, 18–13 and 18–15, each including a 1000 ohm resistor. A better understanding of the interrelation between the multivibrator function and that of the connected relays will be had from a study of the sequence charts shown in Figs. 32–53 of the drawings, which show for each operation of the multivibrator, the sequence of operation and release of each of the indicated relays.

*Operation of the multivibrator*

When the multivibrator circuit is in its normal released condition, tube 12–01 is conducting, and tube 12–02 is non-conducting.

The multivibrator operates in the following manner:

A potential of 48 volts negative from the potential source 7–24 is connected to the grid of tube 12–02 through the upper contact 1 and make-before-break contact 3 of the ON relay 7–07, while the circuit is in a normal, unoperated condition, thereby keeping the tube 12–02 non-conducting during the period when no tests are being made. In response to seizure of the test circuit by a call-waiting signal from the "Parking Circuit" 3–13 through the CW lead 4–13, the ON relay 7–07 is operated, and in turn operates the D relay 13–05 by applying ground to its energizing circuit over a path which includes normally open lower contacts 1 and 2 of ON relay 7–07, normally closed upper contacts 9 and 10 of SR relay 13–01, normally closed lower contacts 1 and 2 of A relay 8–03, and normally closed upper contacts 7 and 8 of C relay 18–01.

The operation of ON relay 7–07 disconnects the 48 volt negative potential source 7–24 from the grid of triode 12–02 by breaking a path which includes its make-before-break upper contacts 1 and 3; and connects negative potential source 7–24 to the grid of triode 12–01 through a path which includes normally operated upper contacts 5 and 6 of TM relay 8–05, and normally open upper contacts 5 and 6 of D relay 13–05. Hence, triode 12–02 immediately becomes conducting, and through a connection through the 225,000 ohm resistor 12–25 between its grid and both grids of the twin triode 18–11, renders the latter conducting. This completes the energizing circuit of the MV relay 7–03 from the potential source 12–04 through a circuit to ground which includes the 1600 ohm resistor 12–13, the make-before-break lower contacts 1 and 3 of the AP relay 8–09 and the twin plate circuit of tube 18–11, which tube comprises a pair of triodes operated in parallel. The protective network 7–06, which includes a 510 ohm resistance in series with a 0.1 microfarad condenser, is connected across the windings of the MV relay 7–03.

With the MV relay 7–30 energized, the potential on the plate of triode 12–01 is the potential of the plate supply 12–04, that is, 130 volts positive; and the plate potential of triode 12–02 is 67 volts, that is, 130 volts minus the plate load resistance drop of tube 12–02. When the 48 volt negative potential from source 7–24 is removed from the grid of triode 12–01, this grid is maintained at a negative potential with respect to its cathode for a time period determined by the magnitude of condenser 12–05 and the grid timing resistance network connected to triode 12–01. As described in the foregoing sections, these resistances are referred to as the "marking" resistors, since their magnitudes determine the length of time that triode 12–02 remains conducting, hence determining the length of time that MV relay 7–03 is operated. After condenser 12–05 drops to the plate potential of triode 12–02, the potential on the grid of tube 12–01 is on the positive side of borderline cut-off, and this tube then commences to conduct.

The plate current of triode 12–01 builds up very rapidly and drops its plate potential from 130 volts to its operating potential of 67 volts. This permits condenser 12–03, which was previously charged to the plate potential of triode 12–01, to discharge to the operating potential of triode 12–01 through the grid timing resistors connected to the grid to triode 12–02 through the paths indicated in Figs. 27 and 28, and described in the preceding section. During this transient, the grid of triode 12–02 is driven negative with respect to its cathode, blocking the plate-cathode currents of both triodes 12–02 and 8–11, resulting in the release of MV relay 7–03 by removing ground from the energizing path previously indicated. After condenser 12–05 discharges of the operating plate potential of triode 12–01, the potential on the grids of triode 12–02 and 8–11 becomes sufficiently positive to cause these tubes to conduct. The plate-cathode current in triode 12–02 builds up very rapidly causing its plate potential to fall from that of the plate supply battery to the operating potential of 67 volts. The timing action in connection with triode 12–01 involving its grid resistors and condenser 12–05 is again repeated as described above. If the multivibrator is left in this condition, it will continue to automatically operate triodes 12–01 and 12–02 alternately, resulting in the alternate operation and release of MV relay 7–03. As pointed out in the previous section, the grid timing resistors associated with triode 12–02 will be referred to as the space resistors, since they determine the length of time that triode 12–02 remains non-conducting. During this time MV relay 7–03 is released. The multivibrator may be blocked at any time in the marking condition by connection of a negative potential to the grid of triode 12–01. Furthermore, the mark and space times of the multivibrator will be changed from time to time during the operation of the circuit by merely changing the magnitudes of the marking and space resistors, respectively. The multivibrator designed for this circuit provides various mark times ranging from 50 milliseconds to ten seconds. The space time, that is, the period during which MV relay 7–03 will be released, ranges from 70 milliseconds to 6 seconds.

THE SIGNAL TERMINAL PATH THROUGH THE FAR-TERMINAL TESTING CIRCUIT

Figure 29:
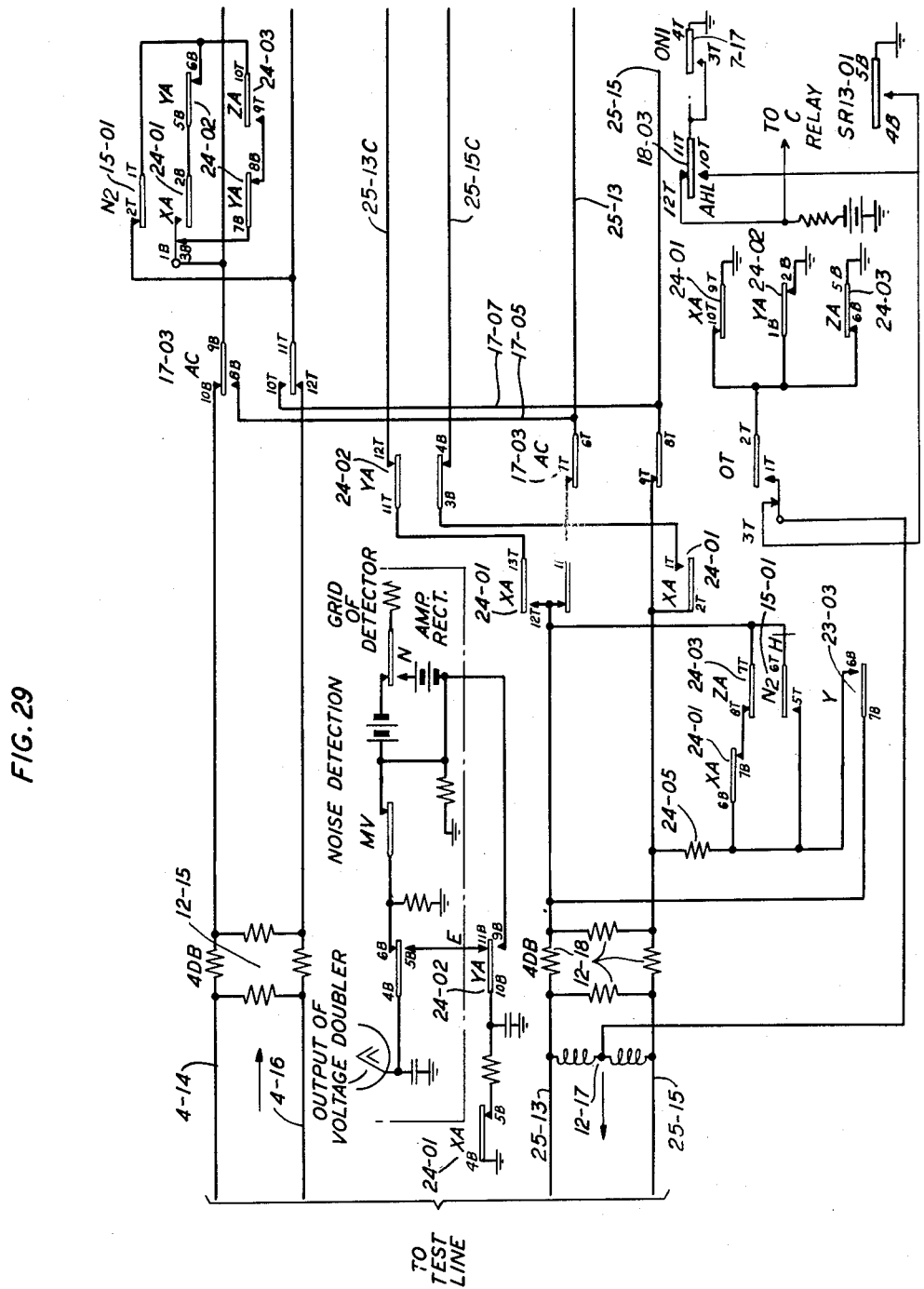
Figure 30:
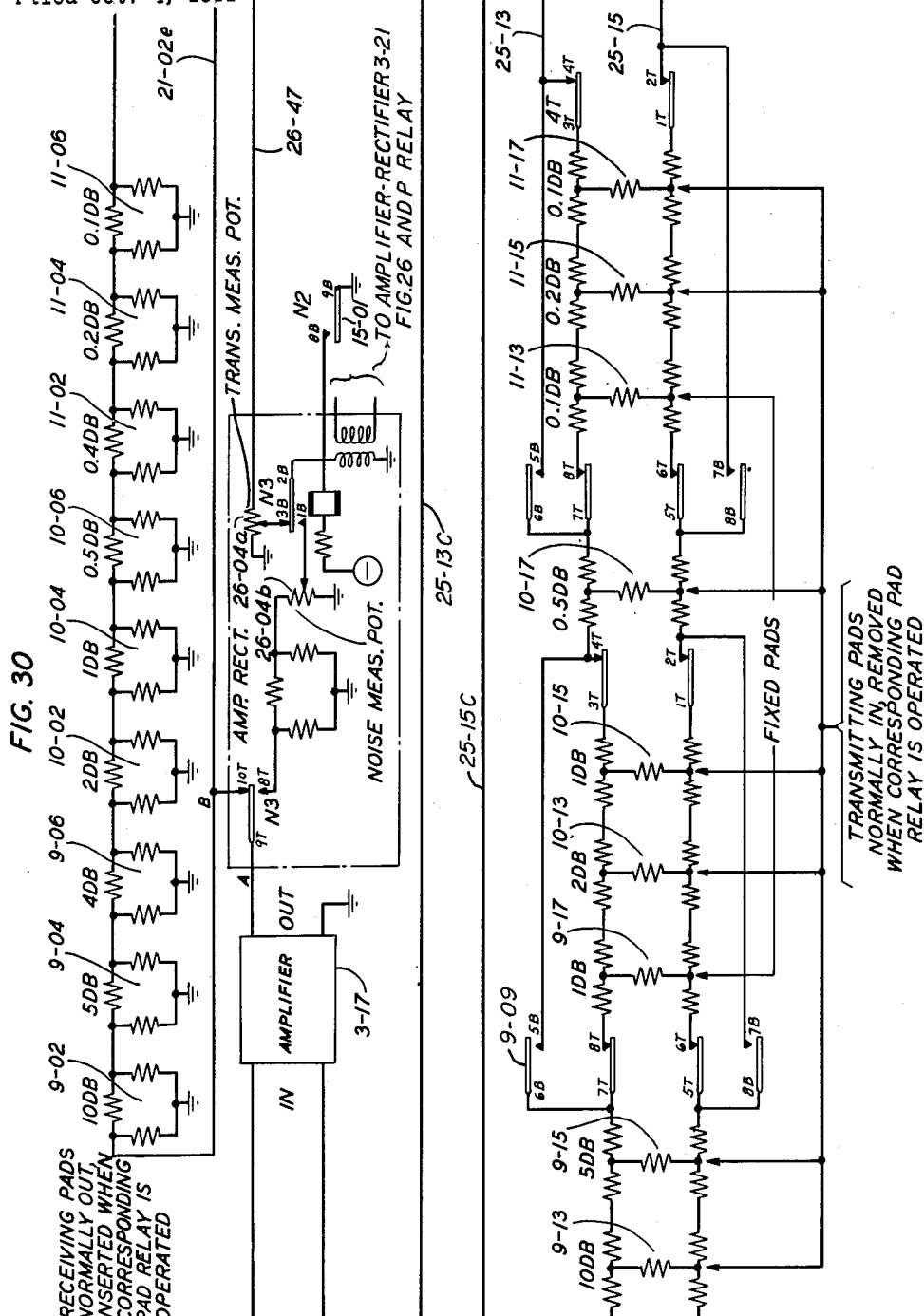

Figs. 29, 30 and 31 of the drawings give a simplified schematic showing the transmission paths through the Far-Terminal circuit, for both the received and transmitted test signals.

The receiving attenuator pads, which are normally out of the circuit, are inserted in the received signal path between the output terminals of the Amplifier 3–17 and the input terminals of the Amplifier-Rectifier Circuit 3–21 whenever the corresponding pad relays are operated. Likewise, the transmitting attenuator pads, which are normally in the circuit, are removed from the path of the 1 milliwatt transmitted tone upon operation of the corresponding pad relays.

The incoming signal transmission path from the Parking Circuit 3–13 passes through a pair of incoming trunk leads 4–14 and 4–16, which are connected across the 4-decibel pad 12–15, to the lower 10 and upper 12 contacts respectively of the AC relay 17–03, which normally engages its lower contact 9 and upper contact 11 respectively.

One pair of leads from the lower contact 9 and the upper contact 11 of the AC relay 17–03 is connected to the input terminals of the Amplifier 3–17. A shunt is provided across the input terminals of Amplifier 3–17 under control of a number of relay contacts. The shunt connection extends from lower contact 9 of the AC relay 17–03, through a pair of alternative parallel paths. One path passes through the lower normally closed contacts 1 and 3 of the XA relay 24–01, the normally closed lower contacts 7 and 8 of the YA relay 24–02, and the normally open upper contacts 9 and 10 of the ZA relay 24–03. The other path passes through the normally open lower contacts 1 and 2 of the XA relay 24–01, and the normally closed lower contacts 5 and 6 of the YA relay 24–02. The two paths meet in a junction which is connected through the normally closed upper contacts 1 and 2 of the N2 relay 15–01 to the upper contact 11 of the AC relay 17–03.

The output terminals of the Amplifier 3–17 are connected to the Amplifier-Rectifier Circuit 3–21, to be described in detail hereinafter, through either one of a pair of alternative paths, one of which is connected for attenuation measurements, and the other of which is connected for noise measurements.

The path for measuring the attenuation of signals is connected through the normally closed upper contacts 9 and 10 of the N3 relay 26–16, from which it passes either to the input potentiometer 26–04A of the Amplifier-Rectifier Circuit 3–21 through the attenuator 3–19, in a manner to be described, or directly under control of the normally closed lower contacts 9 and 10 of the SR relay 13–01, or the normally open upper contacts 11 and 12 of the AS relay 17–01, in parallel with the above.

The path passing through the receiving portion of the Attenuator 3–19 comprises in series a plurality of attenuator pads alternatively connected in or out of the circuit in series with the connection leading from the upper contact 10 of the N3 relay 26–16.

Following is a table giving the denominations and corresponding designations of the attenuator pads which are normally disconnected from the circuit but which may be included upon the operation of the corresponding pad relay.

| Denomination: | Designation |
|---|---|
| 10 decibels | 9–02 |
| 5 decibels | 9–04 |
| 4 decibels | 9–06 |
| 2 decibels | 10–02 |
| 1 decibel | 10–04 |
| 0.5 decibel | 10–06 |
| 0.4 decibel | 11–02 |
| 0.2 decibel | 11–04 |
| 0.1 decibel | 11–06 |

In addition to the denominational relay pads listed, the circuit may also include certain auxiliary pads such as a pair of 0.5-decibel pads 22–05 and 22–07 and a 0.2-decibel pad 22–09, which are added or subtracted during the course of the various test operations which take place. Hence, after passing through whichever of the denominational pads are included in the circuit, the path for the received test signal passes through a plurality of alternative branches, a first one of which passes directly through a path which includes a first 0.5-decibel pad 22–05, a second 0.5-decibel pad 22–07 and a third 0.2-decibel pad 22–09. The 0.5-decibel pad 22–05 may be shunted by any one of three circuits in parallel, the first one of which passes through the lower normally open contacts 1 and 2 of the AC relay 17–03 and normally closed lower contacts 4 and 5 of X relay 23–01, the second one of which passes through the normally closed upper contacts 9 and 10 of the Z relay 23–05, and the third one of which passes through the normally closed upper contacts 1 and 2 of the AL relay 22–03. These three branches are connected together to the junction between pads 22–05 and 22–07. From this junction is connected another shunt circuit across the terminals of the 0.5-decibel pad 22–07 which includes the lower normally closed lower contacts 1 and 2 of the AC1 relay 22–17, the lower normally closed contacts 1 and 2 of the AL relay 22–03, and the normally open upper contacts 11 and 12 of the Z relay 23–05, from which an alternative connection may be made either to ground through the normally closed lower contacts 1 and 2 of the AH relay 22–02, or to the input terminal of the 0.2-decibel pad 22–09 through the normally open lower contacts 3 and 4 of the AH relay 22–02. A shunting circuit across the 0.2-decibel pad 22–09 is provided through the normally open upper contacts 9 and 10 of the AC1 relay 22–17. The 0.5-decibel pad 22–05 is connectable either to ground through a circuit which passes through the normally open lower contacts 4 and 5 of the AC relay 17–03 in series with the normally open lower contacts 11 and 12 of the X relay 23–01; or through a path which includes the normally open lower contacts 3 and 4 of the AL relay 22–03 to the previously mentioned upper contact 11 of Z relay 23–05. The second 0.5-decibel pad 22–07 is connectable to ground through any one of three circuits, one of which passes through the normally open upper contacts 7 and 8 of the AL relay 22–03; the second of which passes through the normally open lower contacts 6 and 7 of the AC relay 17–03; and the third of which passes through the normally closed upper contacts 4 and 5 of the Z relay 23–05 in series with the lower normally closed contacts 3 and 4 of the AS relay 17–01. The 0.2-decibel pad 22–09 is connectable to ground through the normally closed upper contacts 1 and 3 of the AC relay 17–03.

Figure 26:
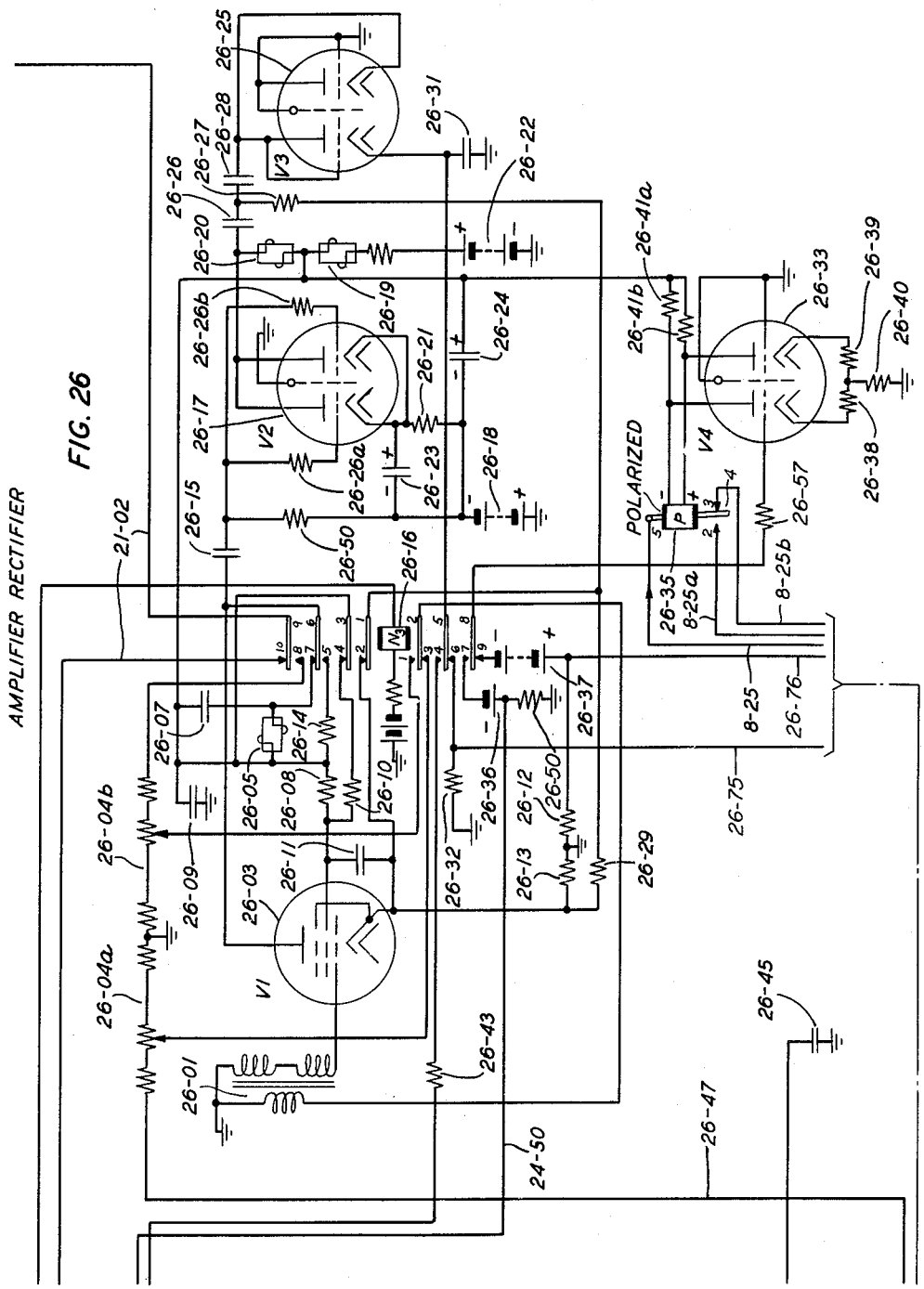
Fig. 26 shows the Amplifier-Rectifier Circuit.

The return path to the input of the Amplifier-Rectifier Circuit 3–21 passes from the terminal of the 0.2-decibel pad 22–09 through leads 21–02b and 26–47 to the potentiometer 26–04a. The P relay 26–01 is energized from the output of the Amplifier-Rectifier Circuit 3–21, as indicated in Fig. 26, in a manner to be described in detail hereinafter, under control of upper contacts 8, 9, and 10 of N3 relay 26–16.

The signal transmission path from the conventional one milliwatt distribution circuit 25–09 which is designed to provide a thousand-cycle test tone signal corresponding to the test tone provided by the Near-Terminal source 2–01 is connected through a first pair of leads 25–13 and 25–15 which pass through the respective normally open lower contacts 4 and 5, and upper contacts 6 and 7 of the MV2 relay 25–01, and through the respective normally open upper pairs of contacts 11 and 12, and 9 and 10 of the TA relay 25–05 to the input terminals of the transmitting portion of Attenuator 3–19, elements of which correspond denominationally to elements of the receiving portion described above.

An alternative path is connected to leads 25–13a and 25–15a through the respective pairs of contact connections lower 3 and 4, and lower 6 and 7 of the AC1 relay 22–17 to upper contacts 9 and 12 respectively of TA relay 25–05. A circuit is provided across the output terminals of the one milliwatt distributing circuit 25–09 which extends between the upper contact 7 of the MV2 relay 25–01 and the lower contact 5 of the AC1 relay 22–17 through a circuit which includes a 600 ohm terminating resistor 24–10 in series with a pair of alternative paths, one of which passes through the upper contacts 4 and 5 of the MV2 relay 25–01, and the other of which passes through the upper contacts 6 and 7 of the YA relay 24–02.

The transmitting portion of the Attenuator 3–19 includes a plurality of pads which, as previously pointed out, correspond denominationally to the pads in the receiving attenuator circuit, and which are normally included in the transmission circuit, unless removed when a corresponding pad of that denomination is inserted into the signal receiving circuit. The output of the transmitting portion of Attenuator 3–19 is connected through the continuing parallel leads 25–13 and 25–15 to a junction, from which the upper lead of the first pair passes through the upper normally closed upper pairs of contacts 6 and 7 of the AC relay 17–03, and through the normally closed upper contacts 11 and 12 of the XA relay 24–01 to the lower terminal of the 4-decibel pad 12–18, and from which the lower lead of the first pair passes through contacts 8 and 9 of AC relay 17–03 to the lower terminal of the 4-decibel pad 12–18.

A pair of cross connections 17–05 and 17–07 is provided between the transmitting and receiving attenuator pad circuits, the first of which is connected between the upper contact 6 and the lower contact 8 of AC relay 17–03 and the second of which is connected between the upper contact 8 and the upper contact 10 of the AC relay 17–03. Lower contact 8, which is normally open, is adapted to engage lower contact 9; and upper contact 10, also normally open, is adapted to engage upper contact 11.

A path over leads 25–13c and 25–15c is provided shunting the transmitting portion of attenuator circuit 3–19. Lead 25–13c passes from the lower contact 4 of the MV2 relay 25–01 to the upper contact 12 of the YA relay 24–02, the latter being normally engaged with the upper contact 11 of that relay which is connected in series to the upper contact 13 of XA relay 24–01, normally open with respect to contact 12 thereof. Lead 25–15c of the shunt path passes from the upper contact 6 of the MV2 relay 25–01 through the normally closed upper contacts 3 and 4 of the TA relay 25–05, and through the normally closed lower contacts 3 and 4 of the YA relay 24–02 to the normally open upper contact 1 of the XA relay 24–01, which is adapted to engage the upper contact 2 of that relay.

A possible termination is provided across the transmission path ahead of the 4-decibel pad 12–18 as follows:

A connection to the upper contact 12 of the XA relay 24–01 separates into parallel branches, one of which passes through the upper normally closed contacts 7 and 8 of the ZA relay 24–03 and the lower normally closed contacts 6 and 7 of the XA relay 24–01 to one terminal of the 600 ohm resistor 24–05. An alternative path passes from the upper contact 12 of XA relay 24–01 through the normally open upper contacts 5 and 6 of the N2 relay 15–01 to junction with the other branch at the terminal of the resistor 24–05 which is connected to the lower terminal of attenuator 12–18. This junction is also connected through the normally open lower contacts 6 and 7 of Y relay 23–03 to the upper terminal of the 4-decibel pad 12–18.

Before considering in detail the Transmission Measuring and Noise Testing Circuit 3–19, which is shown in Figs. 4 through 25 of the drawings, certain important auxiliary circuits, namely the Amplifier Circuit 3–17 shown in Fig. 21 and the Amplifier-Rectifier Circuit 3–21 shown in Fig. 26 will be described in detail.

AMPLIFIER AND AMPLIFIER-RECTIFIER CIRCUITS

Figure 21:
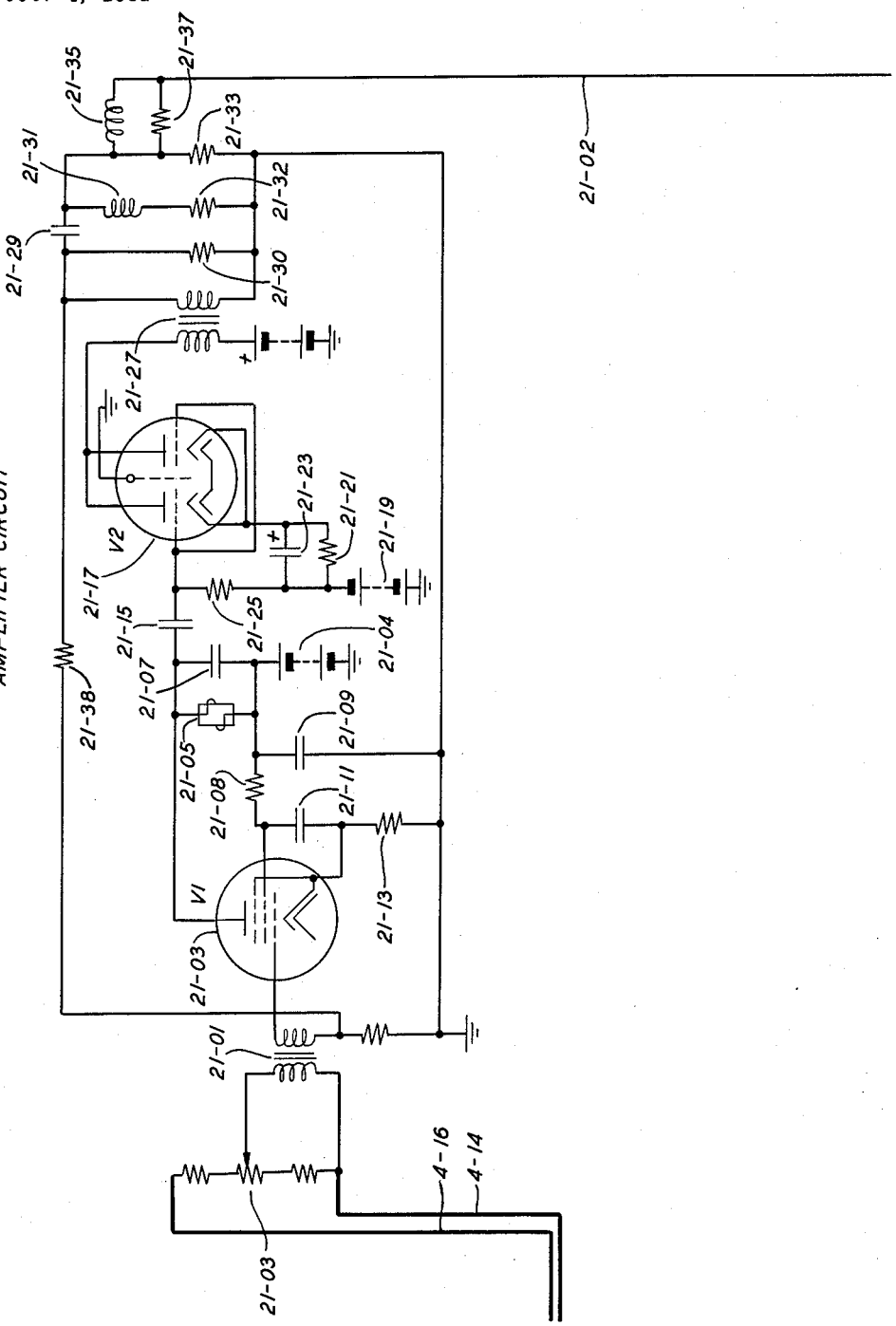
Fig. 21 shows the Amplifier Circuit.
Figure 22:
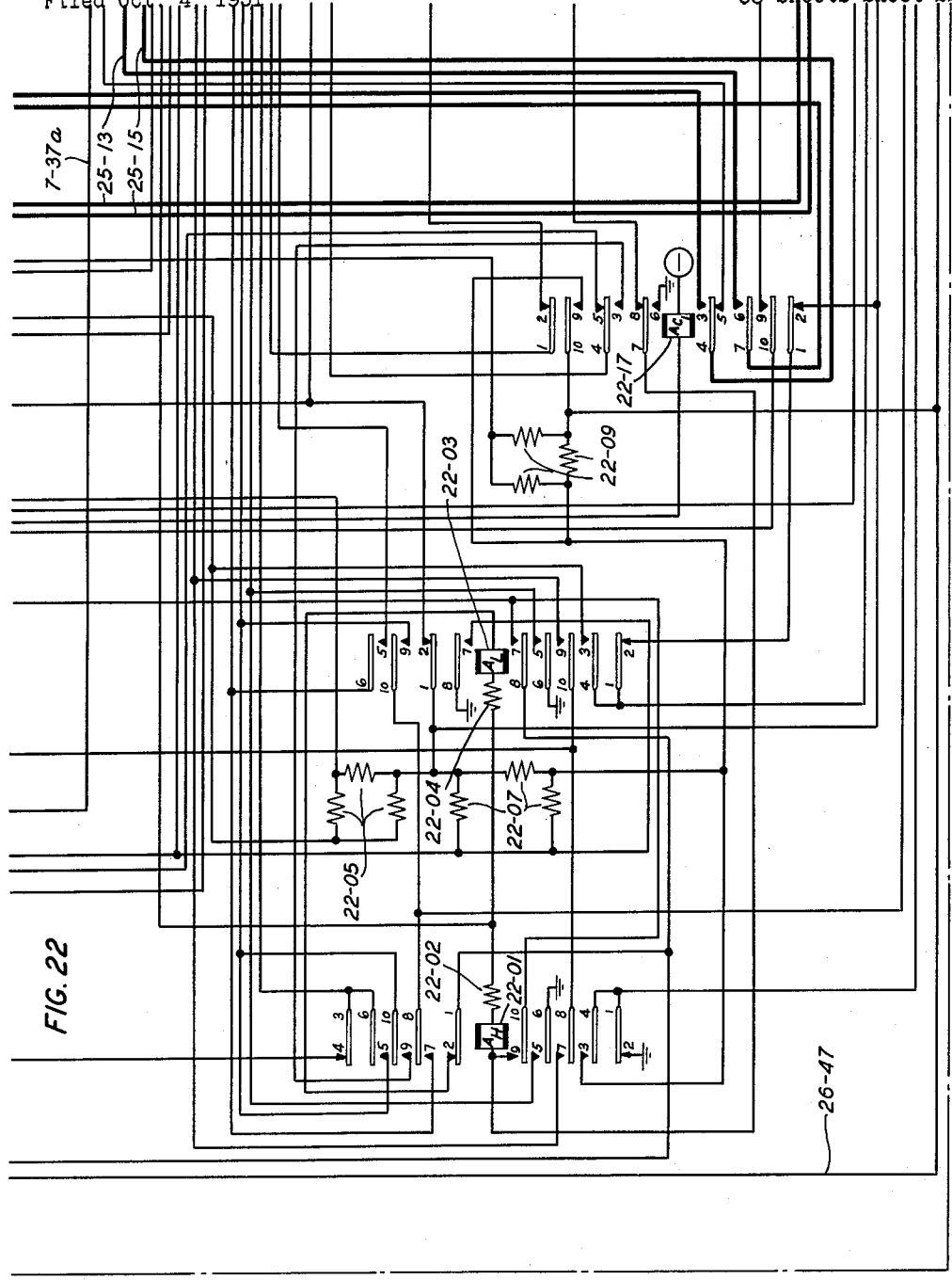
Figure 23:
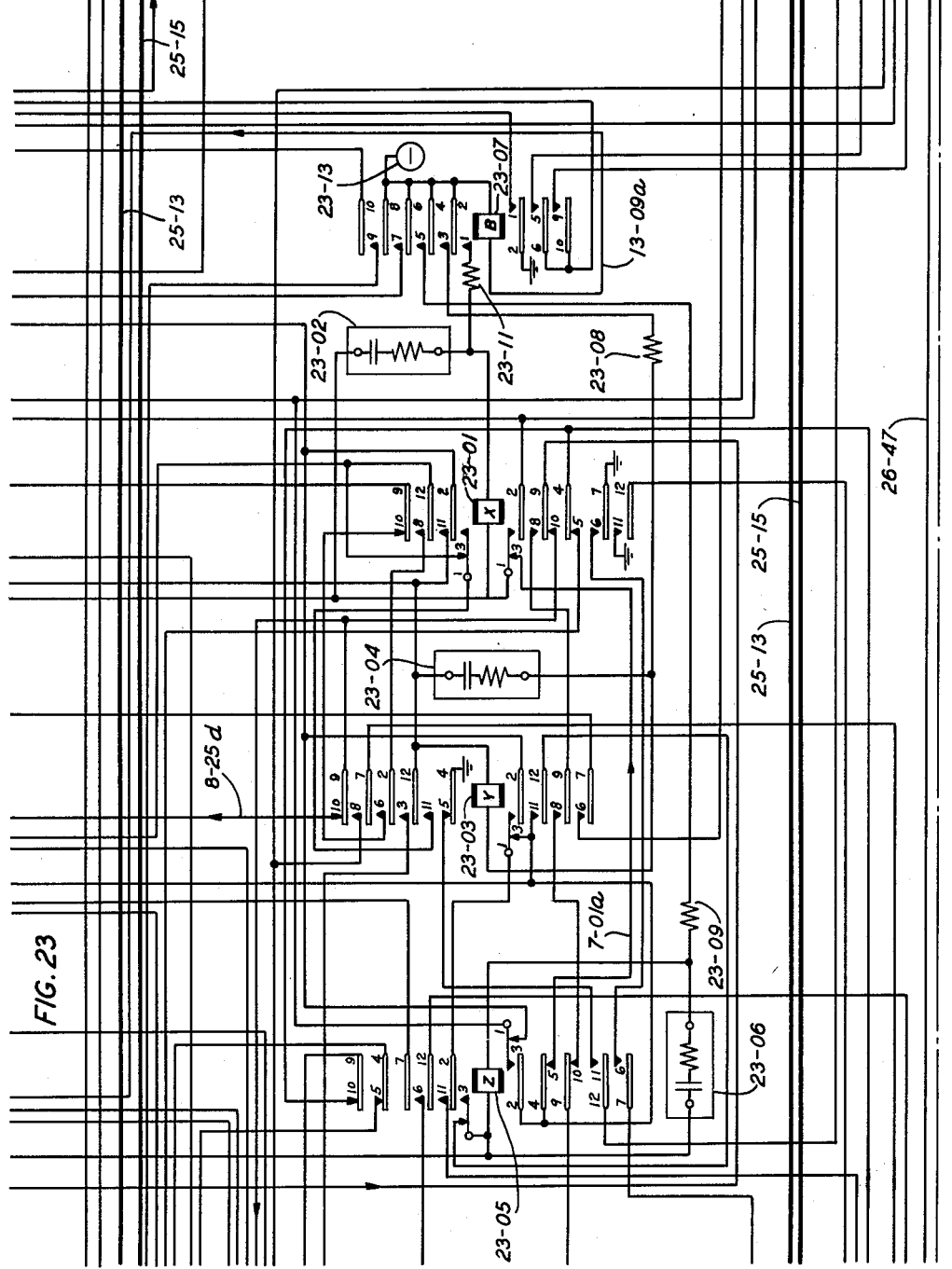
Figure 24:
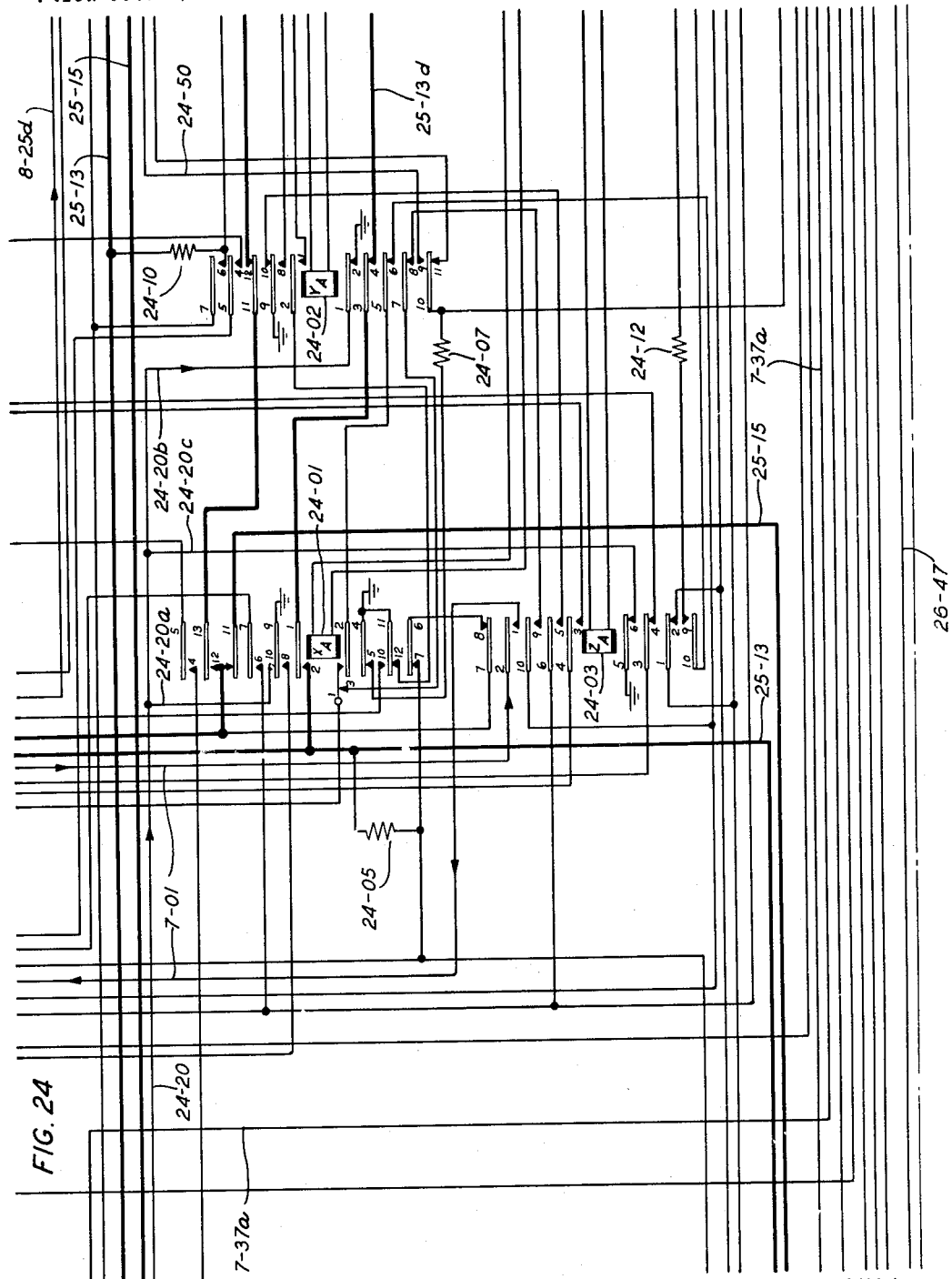

The two stage negative feedback Amplifier circuit 3–17, shown in detail in Fig. 21 of the drawings, is designed to give an over-all amplification of 20.6 decibels. This circuit consists of two vacuum-tube stages coupled on the input side through transformer 21–01, to a 600 ohm voltage divider 21–03, which, in turn is connected through leads 4–14 and 4–16 to the Parking Circuit 3–13 under control of AC relay 17–03; and on the output side through lead 2102 alternatively under control of N3 relay 26–16 either to the Amplifier-Rectifier Circuit 3–21, or to the receiving pads of attenuator 3–19.

Pentode 21–03, the control grid of which is connected to the secondary coil of input transformer 21–01, provides a high voltage gain to the interstage coupling which comprises a 13.3 ohm retard coil 21–05, in parallel with an .0577 microfarad condenser 21–07 connected between the plate circuit of pentode 21–03 and the positive pole of a 130 volt energizing source 21–04. The parallel circuit comprising coil 21–05 and condenser 21–07 is sharply tuned to anti-resonance at 1000 cycles per second. The screen grid of pentode 21–03 is connected to the positive pole of the 130 volt source 21–04 at the junction of retard coil 21–05 and condenser 21–07 through a 9100 ohm resistor 21–08, this junction being connected to ground through a 1–1.25 microfarad capacitor 21–09. A 1–1.25 microfarad capacitor 21–11 also connects the screen and cathode of pentode 21–03, the latter of which is connected to ground through a 619 ohm resistor 21–13. The condenser 21–15 is coupled in series between the plate of pentode 21–03 and the grids of the dual triode 21–17, the cathodes of which are connected to a 130 volt negative potential source of 21–19 through the 619 ohm resistor 21–21 in parallel with the 10 microfarad bypass condenser 21–23. The grids of dual triode 21–17 are connected to the 130 volts negative source 2–19 through the 0.51 megohm resistor 21–25.

Adequate undistorted voltage which is derived from the plate circuit of twin triode 21–17 is impressed across the input of the Amplifier-Rectifier Circuit 3–21 through transformer 21–27, the secondary of which is connected across a resistive and reactive network including the 0.545 microfarad series-connected condenser 21–29, with one of its terminals connected to the low potential side of the transformer secondary through the 1470 ohm resistance 21–30, and the other of its terminals connected to the same junction through a parallel circuit. One branch of the parallel circuit includes the series-connected 13 ohm reactance 21–31 in series with the 10 ohm resistor 21–32, and the other branch includes the 4990 ohm resistor 21–33. The output lead 21–02 to the Amplifier-Rectifier Circuit 3–21 is connected to the high potential terminal of resistor 21–33 through a parallel circuit which includes the .05 henry inductance 21–35 in parallel with the 698 ohm resistor 21–37. Condenser 21–29 serves to block direct current plate potential from the feedback path through resistor 21–28.

The Amplifier-Rectifier Circuit 3–21, shown in Fig. 26, includes first and second amplifier stages of similar type to those described in the foregoing paragraphs with reference to the Amplifier Circuit 3–17, the corresponding parts of the circuits being similarly designated. However, this circuit includes the contacts of the N3 relay, under control of which it is switched from transmission measuring to noise checking condition.

In addition to two amplifier stages, the Amplifier-Rectifier Circuit includes additionally a voltage doubler-rectifier stage, and a balanced current amplifier, to the plate output of which is connected the sensitive P relay 26–35, operation and release of which controls the addition or subtraction of attenuator pads in the Transmission Measuring Circuit 3–19.

Alternative input circuits are connected to the Amplifier-Rectifier Circuit 3–21 through one or the other of the twin input potentiometers 26–04a or 26–04b. The input terminal to the left-hand potentiometer, 26–04a is connected under control of the lower normally closed contacts 9 and 10 of SR relay 13–01 to receive the current output which passes through the receiving branch of the attenuator circuit 3–19. The output slider of potentiometer 26–04a is connected through the normally closed lower contacts 2 and 3 of N3 relay 26–16 to the primary coil of transformer 26–01. The right-hand potentiometer 26–04b is connected directly to the output of the Amplifier Circuit 3–17, through the normally open upper contacts 8 and 9 of N3 relay 26–16 and lead 21–02. The output slider of potentiometer 26–04b is connected through the normally open lower contacts 1 and 2 of N3 relay 26–16 to the primary winding of transformer 26–01.

The secondary coil of transformer 26–01 is connected to the control grid of the pentode 26–03, which, together with the twin triode 26–17, constitute the first two stages of the circuit. The plate circuit of pentode 26–03 is connected to the twin grids of triode 26–17 through a shunt coupling circuit under control of the normally closed upper contacts 7 and 6 of N3 relay 26–16 connected to the positive plate supply, which shunt circuit includes the retard coil 26–05 in parallel with condenser 26–07, tuned to antiresonance at 1000 cycles a second. The 0.1 to 0.125 microfarad condenser 26–15 is connected in series between the plate of the pentode 26–03 and the grid of twin triode 26–17. The suppressor grid of pentode 26–03 is connected directly to the cathode; and the screen grid is connected to the cathode through the 1–1.25 microfarad condenser 26–11. The screen grid is also connected through a circuit which includes a 200,000 ohm resistor 26–08 in parallel with a 100,000 ohm resistor 26–10, the combination of which is connected through normally closed upper contacts 3 and 4 of the N3 relay 26–16 in series with the 1 to 1.25 microfarad condenser 26–09 to ground. A feedback path, such as will be described hereinafter, is connected to the cathode of pentode 26–03 through the upper normally closed contacts 1 and 2 of the N3 relay 26–16.

Twin triode 26–17, the grid of which is connected through condenser 26–15 to the plate circuit of pentode 26–03, has its plate circuit energized from a positive source 26–22 through the 1000 ohm retard coil 26–20, connected in series to the retard coil 26–19, the junction of these coils being connected to 130 volts negative through the 125 microfarad condenser 26–24. Also the twin cathodes of tube 26–17 are connected through 619 ohm resistor 26–21 in parallel with the 10 microfarad condenser 26–23 to 130 volts negative, the latter being connected to the twin grids of twin triode 26–17 through a circuit which includes the 510,000 ohm resistor 26–50, and a respective one of the 1000 ohm resistors 26–26ab. The output of the twin plate circuits of triode 26–17 is connected through the 0.1–0.125 microfarad condensers 26–26 and 26–28 to the paralleled plate and grid of the left-hand triode and to cathode of the right-hand triode of tube 26–25. The junction of the aforesaid condensers 26–26 and 26–28 serves as a connecting point for the feedback path extending to the cathode circuit of the pentode 26–05 and including the 6000 ohm resistor 26–27 and the 160,000 ohm cathode resistor 26–29. Triode 26–25 is a voltage doubler-rectifier of the cascade type, the signal being impressed on this tube between the junction of the first grid and plate with the terminal of condenser 26–28, and the grounded junction of the second grid and plate.

In the half cycle in which the alternating-current input voltage is negative relative to ground, the triode which has the grounded grid and plate passes current, whereupon condenser 26–28 is charged to a potential somewhat less than the peak value with positive polarity on the tube side. In the positive half cycle of the alternating-current input, the voltage to which capacitor 26–28 has been charged is poled in the same direction as the input voltage. Hence, the arithmetic sum of these two voltages is impressed through the high potential conducting triode to charge the 0.1 microfarad capacitor 26–31 connected between the cathode and ground, to a potential somewhat less than twice the peak value of the input voltage. The rectified output voltage to ground appears on the lower armature spring 5 on the N3 relay 26–16, which armature serves to switch the load impedance across capacitor 26–31 between Transmission and Noise conditions, the latter of which will be described hereinafter.

In the Transmission Condition, the Lower Contact 6 of N3 relay 26–16 is connected through upper normally closed contacts 1 and 2 of MV relay 7–03 to (a) the positive terminal of reference battery 26–37 and (b) through the 470,000 ohms load resistor 26–12 to ground.

The voltage developed by the voltage doubler-rectifier 26–25 is utilized through the twin triode amplifier 26–33 to drive the sensitive P relay 26–35. The left-hand grid of twin triode 26–33 is connected through a circuit which extends from ground through .47 megohm resistor 26–12, a 90 volt battery, contacts 8 and 9 of N3 relay 26–16, and the 470,000 ohm grid resistor 26–37 to the left-hand grid of tube 26–33, the right-hand grid being connected to ground. The output from the rectifier tube 26–25 across the resistor 26–32 is fed to the positive pole of the 90-volt battery 26–37 through a circuit which extends under the control of the upper normally closed contacts 1 and 2 of MV relay 7–03 in parallel with the output across resistor 26–12. The negative pole of battery 26–27 is connected to the left-hand grid of the twin triode 26–33 through a circuit under control of normally closed lower contacts 8 and 9 of N3 relay 26–16. The plate of the right-hand twin triode of tube 26–33 is connected through the 8,800 ohm resistor to the junction between coils 26–19 and 26–20, the left-hand plate of the tube 26–33 being similarly connected. Between these plates, which are energized from a common 130 volt source 26–22 through resistor 26–19, through respective resistors 26–41a and 26–41b, is connected the 200 ohm winding of the sensitive P relay 26–35. The twin cathodes of the tube 26–33 are each connected through a 150 ohm resistor, respectively 26–38 and 26–39 and a common 80 ohm resistor 26–40 to ground.

*Transmission condition*

In the transmission condition, the N3 relay 26–16 is released.

The gain is controlled by the potentiometer 26–04a. The screen decoupling resistor 26–10, which is connected to ground through normally closed upper contacts 4 and 3 of N3 relay 26–16, has a relatively low value, namely, 9100 ohms. The inter-stage develops a high impedance at about 1000 cycles per second by sharp antiresonance of retard coil 26–05 and capacitor 26–07. The presence of a shunt capacitance greater than 0.056 microfarad in the inter-stage circuit provides adequate protection against oscillation at a critical frequency in the vicinity of 25 kilocycles. Moreover, antiresonance of capacitor 26–07, together with coil 26–05, provides an extremely high forward gain, resulting in a reduction in gain of about 45 decibels due to loop feedback at 1000 cycles per second through the negative feedback path from the junction of capacitors 26–26 and 26–28 through resistors 26–27 and 26–29 to the input of the first stage. The effect of this large amount of negative feedback is to limit the change in external gain of the amplifier to less than 0.05-decibel for variation of plus or minus twenty-five percent in the amplification constant of each tube. A similar condition exists in the amplifier of Fig. 21.

In the Transmission condition, the amplifiers of the circuits of Figs. 21 and 26 depart radically from linearity when the input power to the 600 ohm voltage divider is of the order of 5 decibels above one milliwatt. The wave form at the input to the rectifier stage becomes entirely different from the input wave form due to action of the amplifier as a driven multivibrator. As the input power is reduced, non-linear multivibrator action continues down to an input of about four decibels above one milliwatt, at which point the amplifier abruptly snaps back to linearity. Practically, the multivibrator action has no effect on the functioning of the Amplifier-Rectifier Circuit 3–21 as an adjunct of the Transmission Measuring System 3–19, since the "snapback" point is far enough above one milliwatt input to assure linearity when Receiving Pads in the Attenuator Circuit 3–19 make the final small-loss steps in their adjustment sequence. Moreover, the relay 26–35 always operates when multivibrator action occurs, giving positive indication that the receiving pads have been set at too low a loss.

*Noise condition*

With N3 relay 26–16 operated, while awaiting a noise measurement, capacitor 26–31 is shunted by 2.49 megohm resistor 26–43 in series with a 200 ohm resistor 24–07. Noise integration begins when the Transmission Measuring Set 3–19 removes the 200 ohm resistor from ground, by breaking connection between lower contacts 4 and 5 in XA relay 24–01, causing capacitor 26–45 to be charged through resistor 26–43 over a path which includes the lead 26–47 and normally closed lower contacts 10 and 11 of YA relay 24–02.

Under the two different conditions, namely during transmission measurement, and after noise integration, respectively, the following voltages are impressed through 0.47 megohm resistor 26–57 on the left-hand control grid of tube 26–33:

*Transmission condition.*—Voltage across capacitor 26–31 is opposed by 90 volt battery 26–37;

*Noise condition.*—Voltage across capacitor 26–45 is opposed by 13.5 volts of battery 26–36.

Twin triode 26–33 is arranged in a differential circuit designed to cause operation of P relay 26–35 upon appearance of a small net positive voltage from the left-hand control grid to ground. In the case of both transmission and noise measurements, this small net positive voltage is the difference between a large rectified voltage and a dry battery bias poled in opposition to the former. In this manner, P relay 26–35 is caused to operate by an increase of a small fraction of a decibel in the power input to the Amplifier-Rectifier Circuit 3–21.

Twin triode 26–33 may be considered to be a part of a Wheatstone bridge configuration, the four bridge arms of which are respectively the 8080 ohm resistor 26–40, the 8080 ohm resistor 26–41, impedance from the left-hand plate to left-hand cathode in series with 150 ohms, which is half of resistor 26–41, and impedance from the right-hand plate to cathode in series with 150 ohms, which is the other half of resistor 26–41. Power is supplied to the bridge by +130 volt battery 26–22. The detecting branch comprises P relay 26–35 connected from the left-hand plate to the right-hand plate of tube 26–33.

With a very low or substantially no signal input, the left-hand grid is more negative than the grounded right-hand grid due to the presence of reference bias battery 26–36 or 26–37. The plate current of the left-hand triode is therefore less than that of the right-hand triode, causing the voltage drop across resistor 26–41 to exceed that across resistor 26–40, and placing the left-hand plate at a potential positive relative to the right-hand plate. Accordingly, current flows in polar relay in the direction to hold it released. On the other hand, when high input signal overrides the reference battery and drives the left-hand grid positive relative to the right-hand grid, the plate current of the left-hand triode rises above that of the right-hand triode, unbalancing the bridge in the opposite direction, and causing current flow in the direction to operate P relay 26–35. Operation of P relay performs functions as indicated hereinafter.

TRANSMISSION MEASURING AND NOISE-CHECKING CIRCUIT

General description

The Transmission Measuring and Noise-Checking Circuit provides for the measurement of transmission losses and for the observation of noise conditions in both directions over a trunk line under test. The initiation and control of the tests is executed by automatic test equipment or by a toll test board operator at the Near-Terminal.

The transmission measurements are made in three, fundamental steps:

1. Test tone is transmitted from the Near-Terminal of the trunk line under test for the Near-Far measurement.

2. Test tone for the Far-Near measurement is transmitted from the Far-Terminal of the trunk line under test, that is from the Transmission Measuring and Noise-Checking Circuit.

3. Test tone below one milliwatt by the Near-Far trunk-loss is transmitted from the Far-Terminal to the Near-Terminal of the trunk line under test, repeating to the Near-Terminal the Near-Far trunk-loss measurement.

Briefly, the general scheme of operation is as follows:

When ready to serve a particular call, the Transmission Measuring and Noise-Checking Circuit signals the preferred, seized, transmission test line to connect itself thereto, and then signals the Near-Terminal of the connected trunk line under test with a steady "off-hook" signal, indicating that it is ready to proceed with the test. At the Near-Terminal, either an automatic test circuit or a test board operator connects one milliwatt, thousand-cycle, test tone to the transmitting or Near-Far channel for a period long enough for this circuit to measure the Near-Far transmission loss.

The test tone level received by the Transmission Measuring and Noise-Checking Circuit at the Far-Terminal is below zero level (1 milliwatt) by the loss through the trunk line under test. At the Far-Terminal, the test tone is raised 19.9 decibels through the fixed gain Amplifier 3–17; attenuated through the receiving pads of the Adjustable Attenuator 3–19; and then connected through the Amplifier-Rectifier 3–27 to the sensitive, receiving P relay 26–35.

The P relay in the receiving circuit at the Far-Terminal is so arranged that it is operated by test tone at zero level or greater, but is not operated at levels below zero at the input to the Amplifier-Rectifier. Prior to adjustment of Attenuator 3–19, all receiving pads are out of the circuit, and the initial input to the Amplifier-Rectifier is plus 19.9 decibels minus the loss through the trunk line under test.

As soon as the Transmission Measuring and Noise-Checking Circuit detects the test tone from the Near-Terminal, it starts a pulsing mechanism which on a step-by-step basis momentarily opens the input to the sensitive, receiving circuit, inserts a receiving pad, and closes the input to the receiving circuit. If the receiving P relay remains released, the pad is removed, otherwise the pad remains in circuit and the mechanism is advanced by the operation of the selector to the next smaller pad on which the same operation is performed. In this manner, the attenuator is adjusted until the receiving P relay just operates, indicating that the input level of test tone to the Amplifier-Rectifier is approximately zero decibels above one milliwatt. In this condition the following power relation holds from the Near-Terminal of the trunk line under test to the input of the Amplifier-Rectifier Circuit:

0 dbm—Near to Far trunk loss+19.9 db—receiving arm attenuator loss (db)=0 dbm (where 0 dbm is 1 milliwatt. The term "dbm" expresses power level in decibels above or below 1 milliwatt).

Hence, 19.9 db—receiving arm attenuator loss (db)= Near to Far trunk loss (db).

Each attenuator pad relay controls a receiving-arm pad, and an equal-valued, transmitting-arm pad. When the attenuator is completely adjusted as described above, the loss in the transmitting-arm of the attenuator will equal 19.9 decibels minus the receiving-arm attenuator loss, and is therefore equal to the Near-Far trunk loss. This completes Step No. 1.

Upon completion of Step No. 1, the initial attenuator adjustment, and prior to commencing Step No. 2, the transmission of tone from the Far-Terminal, the Transmission Measuring and Noise-Checking Circuit advances to the last selector step for checking the accuracy of the completed attenuator setting against the Near-Far Channel trunk loss. Assuming the loss has remained steady or has dropped, the sensitive P relay will operate when the circuit through the receiving attenuator to the Amplifier-Rectifier is closed by periodic multivibrator action. If the addition of a half-decibel pad in series with the adjusted attenuator in the receiving circuit is sufficient to prevent reoperation of the P relay during the next multivibrator pulse, the adjustment is considered accurate enough. Otherwise, the circuit signals the Near-Terminal for a repetition of the test. Assuming the line loss has risen during the course of the tests, the P relay will be released when the circuit through the receiving attenuator is closed. In this case, if the shorting out of a half decibel pad from the receiving attenuator circuit causes reoperation of the P relay, the attenuator setting is deemed sufficiently accurate. Otherwise, the circuit signals for retest.

An additional test which is performed for the purpose of showing up faulty operation of any of the components of the Transmission Testing and Noise-Checking Circuit is the so-called "horse-shoe" test in which a test tone is applied through a series circuit which includes the adjusted transmitting section of the attenuator, the fixed gain Amplifier Circuit, the adjusted receiving section of the attenuator, and the Amplifier-Rectifier Circuit. If the circuit is in working order, the P relay operates when the output circuit of the Amplifier-Rectifier is closed. If the P relay does not operate under this condition, the Transmission and Noise-Checking Circuit restores the attenuator pad relays to normal and signals the Near End for a repetition of the test tone transmission. If the P relay operates, a half-decibel pad is inserted in the receiving arm of the attenuator. If, under the last-described condition, the P relay operates, the Transmission Measuring and Noise-Checking Circuit releases the operated, attenuator-pad relays, and signals the Near End to repeat the test tone transmission.

After complete adjustment and check of the attenuator, and removal of the test tone from the Near-Terminal of the trunk line under test, the Transmission Measuring and Noise-Checking Circuit connects one milliwatt, thousand-cycle, test tone for a selected time period to the Far- Near channel for measuring the Far-Near transmission loss of the trunk line under test, completing Step No. 2.

Following Step No. 2, the Transmission Measuring and Noise-Checking Circuit connects one milliwatt, thousand-cycle tone for a selected time period through the transmitting-arm pads of attenuator 3–19 to the Far-Near channel of the trunk line under test for transmitting the Near-Far trunk loss measurement to the Near-Tterminal of the circuit. The test tone level measured at the Near-Terminal during this step is one milliwatt minus the attenuator transmitting-arm loss ( measured Near-Far loss) minus the Far-Near loss.

After the completion of Step No. 3, providing the test call is not immediately abandoned, the Transmission Measuring and Noise-Checking Circuit observes noise conditions on the Near-Far channel. Prior to disconnection, the connected transmission test line is signalled by the Transmission Measuring and Noise-Checking Circuit to send either a satisfactory or unsatisfactory noise report to the Near-Terminal of the trunk line under test.

There will now follow a detailed description of the structure and operation of the Transmission Measuring and Noise-Testing Circuit 3–19 with reference to Figs. 4 through 26 of the drawings. It will be noted that the circuit elements in each of the figures have a composite designation, the first digit of which corresponds to the figure number in each case, lead wires being designated according to the figure of their origin.

As an aid in understanding the sequence of operations in the description which follows, the reader is referred to the sequence charts of Figs. 32 through 59 which indicate the order in which the multivibrator timing circuit and each of the connected relays operate and release at each step in the operational cycle of the system.

*Call waiting and seizure*

Figure 32:
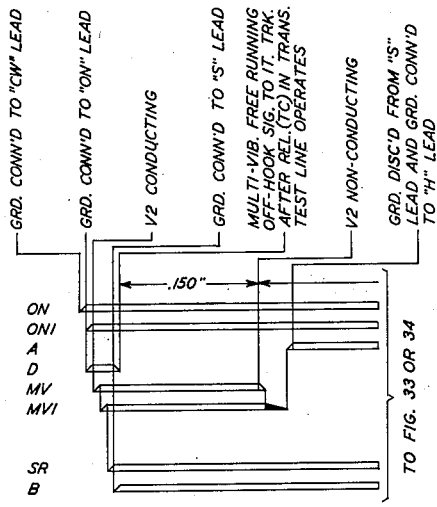

The sequence of the operations which occur during this particular operation of the circuit is indicated in Fig. 32 of the accompanying Sequence charts which is entitled "Seizure."

When the trunk line to be tested is seized at its distant end by a test board operator or by an automatic circuit for the purpose of making transmission measurements, and the sender and marker complete their operations as described previously in the section relating to the Parking Circuits, the SL relay 4–01, 5–01 or 6–01 is energized in one of the Parking Circuits, and applies ground to the Call Waiting Lead 4–13.

This operation energizes ON relay 7–07, which upon operation performs the following functions:

(a) It connects ground through its normally open upper contacts 8 and 9 to the ST lead 7–29 to the transmission measuring milliwatt distributing circuit 25–09, which is a conventional source of milliwatt thousand-cycle tone;

(b) It closes its upper contacts 6 and 7 including the 64,900 ohm resistor 7–13 in the mesh connected to the grid of tube 12–01, thereby providing for a "mark" pulse of 0.15 seconds;

(c) It connects ground to ON lead 7–31 through the normally open lower contacts 3 and 4 to the associated Parking Circuit as an "off normal indication";

(d) It provides several "off normal" holding grounds to certain of the relay circuits as will be indicated hereinafter through closure of normally open lower contact pairs 5 and 6, 1 and 2, and 7 and 8, respectively to leads 7–33, 7–35 and 7–37;

(e) It prepares the multivibrator for a "space" pulse of six seconds, by breaking connection between its upper contacts 1 and 3 to the negative biasing source 7–24, engaging upper contacts 1 and 2 to include the 7.58 megohm resistor 7–15 in the mesh connected to grid of tube 12–02, and further connecting its lower contacts 10 and 11 to shunt out the 39,700 ohm resistor 12–09 connected between the plate of triode 12–01 and the 130 volt energizing source 12–04;

(f) Through its normally open upper contacts 4 and 5, it connects ground to the energizing circuit of ON1 relay 7–17; and (g) It causes operation of D relay 13–05 by applying ground through its normally open lower contacts 1 and 2 through a circuit which includes normally closed upper contacts 9 and 10 of SR relay 13–01, normally closed lower contacts 1 and 2 of A relays 8–03 and normally closed contacts 7 and 8 of C relay 18–01.

ON1 relay 7–17 operated performs the following functions:

(a) Through its normally open upper contacts 3 and 4, it applies ground over lead 7–10 through the normally operated upper contacts 11 and 12 of AHL relay 18–03, providing a shunt path around the windings of TB relay 19–01 for current from the energizing source 19–15.

(b) Through its normally open contact pairs 6—5 and 3—4, it applies ground to each of the twin branches of potentiometer circuit comprising resistors 7–19, 7–20 and 7–21, 7–22, energizing these branches from source 7–23.

The first branch furnishes a potential of ground plus 30 volts to the grid of tube 12–01, and the second branch operates through the normally open upper contacts 1 and 2 of ON relay 7–07 to apply a like potential to the grids of tube 12–02 and 8–11 during operation of the latter relay.

D relay 13–05 operated, connects a negative potential to tube 12–01 from the source 7–24 through a path which includes the upper normally closed contacts 5 and 6 of the TM relay 8–05, and its own upper normally open contacts 5 and 6.

As the grid of tube 12–01 is reduced below cut-off, this in turn causes the tube 12–02 to become conducting, simultaneously raising the grid potential on twin triode 8–11, causing the latter also to become conducting. This results in the operation of MV relay 7–03, the energizing circuit of which is connected in series with the plate circuits of twin triodes 8–11 through the normally closed lower contacts 1 and 3 of AP relay 8–09.

Operation of MV relay 7–03 applies ground through its normally open upper contacts 3 and 4 to the energizing windings of the slow-release MV1 relay 7–04.

Operation of MV1 relay 7–04 connects the energizing circuit of the SR relay 13–01 through a path which includes: the lower normally-open contacts 1 and 2 of MV1 relay 7–04, the normally closed lower contacts 4 and 5 of A relay 8–03, the lower normally closed contacts 1 and 2 of TM relay 8–05, the normally closed upper contacts 1 and 2 of N1 relay 15–03 and the windings of the SR relay 13–01 to the energizing source.

Operation of Slow-Release relay 13–01 performs the following functions:

(a) By breaking connection between its upper contacts 9 and 10, it breaks the energizing circuit of D relay 13–05, releasing it;

(b) It connects ground through its normally open upper contacts 6 and 7 to the Seizure lead 8–01 by completing a circuit which extends through the normally closed upper contacts 3 and 4 of TM relay 8–05 and the upper normally closed contacts 8 and 9 of A relay 8–03, causing the seized test line in the Parking Circuit 3–13 to connect itself to the Transmission Measuring Circuit 3–11;

(c) It locks itself operated over lead 7–35, 7–35a through a circuit which includes the normally closed left-hand upper contacts 1 and 2 of N1 relay 15–03, the normally closed lower contacts 1 and 2 of TM relay 8–05 normally closed upper contacts 8 and 9 of AHL relay 18–03, normally open upper contacts 8 and 9 of SR relay 13–01, and the normally open lower contacts 1 and 2 of ON relay 7–07; and (d) It operates B relay 23–07 by applying ground to its energizing circuit through a path which includes its own lower normally open contacts 6 and 7 and the lower normally closed contacts 10 and 11 of the C relay 18–01.

B relay 23–07 operated connects the 48 volt potential source 23–13 to the windings of X, Y and Z relays 23–01, 23–03, and 23–05 through its respective normally open upper contact combination 2—1, 4—3, and 6—5.

Operation of the SR relay 13–01 also breaks the circuit through its upper contacts 9 and 10, breaking the energizing circuit of the D relay 13–05, which extends to ground under control of ON relay 7–07 as previously described.

When D relay 13–05 thus releases, it removes the negative biasing potential 7–24 from the grid circuit of tube 12–01 by breaking the previously described path through its upper contacts 5 and 6. This permits the multivibrator to run freely.

After a multivibrator marking period of .150 millisecond, tube 12–02 becomes non-conducting, resulting in the release of MV relay 7–03 when the potential of the grids of twin triode 18–11 drops below cut-off. This, in turn, causes the release of MV1 relay 7–04 by opening its upper contacts 3 and 4 to remove ground from its energizing circuit.

MV1 relay 7–04 released, closes its lower contacts 1 and 3, applying ground to the energizing circuit of A relay 8–03, through a circuit which extends through the normally open upper contacts 12 and 13 of SR relay 13–01, normally closed upper contacts 1 and 2 of TM relay 8–05 and the normally closed lower contacts 1 and 3 of N1 relay 15–03.

A relay 8–03 operates performing the following functions:

(a) It breaks connection between its normally closed upper contacts 8 and 9, thereby removing ground from "S" lead 8–01, which was applied over a previously described path including the upper normally closed contact combination 6 and 7 of SR relay 13–01;

(b) It provides a locking circuit for itself by engaging its upper contacts 1 and 2 closing a path to ground which extends through normally open lower contacts 1 and 2 of ON relay 7–07;

(c) It provides a locking circuit for ON relay 7–07 which extends to ground through its upper contacts 7 and 8 of the A relay 8–03;

(d) It breaks combination of its normally closed lower contacts 4 and 5 opening the initial operating circuit of SR relay 13–01, which, as previously traced, extends through leads 7–35, 7–35a under control of the contacts of N1 relay 15–03, TM relay 8–05, A relay 8–03 and MV1 relay 7–04 to ground.

Through the action of the multivibrator, ground was connected to "S" lead 8–01, providing ample time for the operation of the test line circuit. Since the multivibrator is running freely, as soon as the .150 millisecond marking period is completed, a six second spacing period is begun.

As soon as the trunk line under test is connected from one of the Parking Circuits 3–13a, 3–13b, 3–13c through leads 4–14, 4–16, 25–13 and 25–15 to the Transmission Measuring Circuit 3–19, SR relay 13–01, being operated, connects ground to the midpoint of the iron core retardation coil 12–17. This retardation coil provides a high impedance voice frequency shunt, but is low enough resistance to provide a simplexed, direct-current supervisory circuit.

This operation results in a signal which may take the form of an "off-hook" indication to the Near-Terminal of the connected trunk circuit appraising the switchboard operator or, alternatively, the automatic testing circuit that the Transmission Measuring Circuit 3–19 at the Far-Terminal is connected and ready. This steady off-hook signal indicates to the Near-Terminal that one milliwatt 1000-cycle test tone source 2–01 indicated in Fig. 2 should be connected to the circuit for measurement by the equipment at the Far-Terminal. If the test tone is not received at the Far-Terminal before the six second spacing period elapses, the sensitive P relay 26–35 in the Amplifier-Rectifier Circuit fails to operate.

Figure 34:
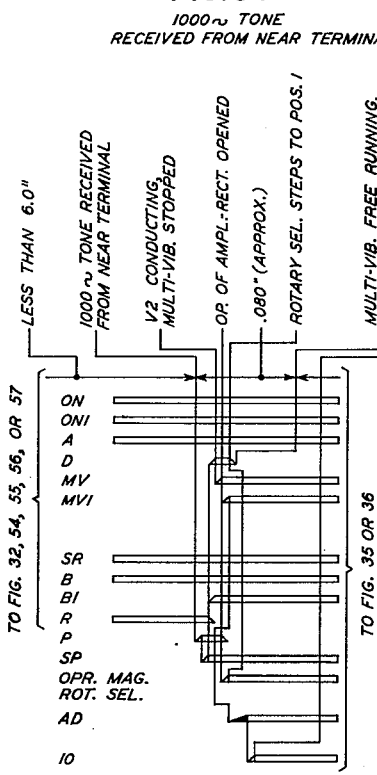

The reader is now referred to Fig. 34 of the drawings which shows the sequence of operations upon receipt at the Far-Terminal of the 1000-cycle tone from the Near-Terminal within the six second spacing period of the multivibrator.

The P relay 26–35, which is actuated by the output current from the Amplifier-Rectifier Circuit, described hereinbefore with reference to Fig. 26, closes the energizing circuit for SP relay 14–01. This energizing circuit extends over lead 8–25 from the 130 volt source 8–23 in series with a 500 ohm resistor 8–24, through the normally closed lower contacts 9 and 10 of AP relay 8–09, through the normally open contacts 5 and 2 of P relay 26–35 over lead 8–25a, through the normally open upper contacts 4 and 5 of SR relay 13–01, through the normally closed upper contacts 5 and 6 of C relay 18–01, through the normally closed lower contacts 9 and 10 of AHL relay 18–03, through the normally closed lower contacts 1 and 3 and the energizing windings of the SP relay 14–01, through 1600 and 850 ohm resistors 14–02 to 130 volt negative potential source 14–04.

When SP relay 14–01 is operated, it performs the following operations:

(a) It locks itself operated under control of ON relay 7–07 through a path 7–37, 7–37c which includes the normally open lower contacts 1 and 2 of SP relay 14–01, normally closed upper contacts 1 and 2 of AS relay 17–01, and the normally open lower contacts 7 and 8 of ON relay 7–07.

(b) It closes in part a circuit to ground over leads 7–01, 7–01a through the lower normally open contacts 1 and 2 of MV1 relay 7–04 to the winding of X relay 23–01, which includes the normally open lower contacts 3 and 4 of A relay 8–03, the normally open upper contacts 8 and 9 of SP relay 14–01, the normally closed lower contacts 1 and 3 of C relay 18–01, the normally open upper contacts 7 and 6 of AP relay 8–09, through contact arm and contact 10 of rotary selector 14–09, through normally open upper contacts 9 and 8 of AP relay 8–09, through the closed lower contacts 4 and 5 of Z relay 23–05 and the normally closed lower contacts 1 and 3 of X relay 23–01.

(c) It connects ground to the winding of AD relay 14–03 through a circuit which includes the normally open lower contacts 1 and 2 of MV relay 7–03, the normally open upper contacts 6 and 7 of SP relay 14–01, the normally open upper contacts 5 and 6 of MV1 relay 7–04, and the normally closed upper contacts 1 and 3 of AP relay 8–09.

(d) It connects the grid of tube 12–02 to the 82,500 ohm spacing resistor 20–03 through a path which includes the normally open lower contacts 8 and 9 of SP relay 14–01 and the normally closed lower contacts 6 and 7 of T relay 20–01.

(e) It connects the grid of tube 12–01 to the 30,100 ohm marking resistor 18–04 through a path which includes normally open upper contacts 1 and 2 of SP relay 14–01, the normally closed lower contacts 1 and 2 of AS relay 17–01, and the normally closed upper contacts 1 and 3 of AHL relay 18–03.

(f) It opens its upper normally operated contacts 4 and 5 breaking an energizing circuit to R relay 13–03, thereby guarding against false operation of this relay.

(g) It provides a holding circuit for the slow release SR relay 13–01 by applying ground through its normally open lower contacts 4 and 5 through a path which includes the normally closed lower contacts 1 and 2 of TM relay 8–05, and the normally closed lower contacts 1 and 2 of N1 relay 15–03.

It operates the B1 relay over a path which includes the normally open lower contacts 5 and 6 of C relay 18–01 and the normally open lower contacts 6 and 7 to ground of the SP relay 14–01.

B1 relay 9–03 connects battery to the attenuator control relays 9–05 and 9–07 for the 10- and 5-decibel pads respectively, through its normally open lower contacts 3 and 4; to control relay 9–09 for the 4-decibel pad through its normally open upper contacts 1 and 2; and from these same contacts to control relays 10–01 and 10–03 for the 2- and 1-decibel pads respectively through parallel paths extending from the normally open lower contacts 1 and 2 of B1 relay 9–03 through normally closed lower contacts 3 and 4 of relay 9–07 and normally closed lower contacts 3 and 4 of relay 9–09; to control relays 10–05 and 11–01 for the 0.5- and 0.4-decibel pads through a path which extends from the normally open upper contacts 3 and 4 of B1 relay 9–03; to control relays 11–03 and 11–05 for 0.2- and 0.1-decibel pads through the normally open upper contacts 5 and 6 of B1 relay through a pair of branches extending in parallel under control of normally closed lower contacts 3 and 4 of pad control relay 10–05 and of pad control relay 11–01.

*Adjusting attenuator (Near-Far transmission measurement)*

When D relay 13–05 operates, it connects a negative potential to the grid of tube 12–01 through a path which extends from the source 7–24 through the normally closed upper contacts 5 and 6 of TM relay 8–05, and normally open upper contacts 5 and 6 of D relay 13–05.

Accordingly, conduction is shifted to tube 12–02 resulting in the operation of MV relay 7–03.

Energization of MV relay 7–03 performs the following operations:

(*a*) Through its normally open upper contacts 3 and 4, ground is applied to the energizing circuit of MV1 relay 7–04;

(*b*) The output of the Amplifier-Rectifier Circuit 3–21 is opened by disconnection of its normally closed upper contacts 1 and 2, thereby causing the release of P relay 26–35;

(*c*) The rotary selector magnet 14–09 is actuated by application of ground through its normally closed lower contacts 1 and 2 over a path which includes the normally open upper contacts 6 and 7 of SP relay 14–01, the normally closed upper contacts 1 and 2 of C relay 18–01, and the normally closed upper contacts 4 and 5 of AHL relay 18–03.

The rotary selector magnet 14–09 then steps to position 1.

MV1 relay 7–04 when operated, energizes the slow operate AD relay 14–03 over a path which extends from the ground applied over the normally open lower contacts 1 and 2 of MV relay 7–03, the normally open upper contacts 6 and 7 of SP relay 14–01, the normally open upper contacts 5 and 6 of MV1 relay 7–04, and the normally closed upper contacts 1 and 3 of the AP relay 8–09.

When the rotary selector 14–09 advances to position 1, the off-normal springs are operated by the rotary selector magnet 14–07, disengaging contacts 3 and 4 to ground, opening the circuit to D relay 13–05 causing this relay to release.

D relay 13–05 released, opens its contacts 5 and 6, removing the negative potential from the grid of tube 12–01, permitting the multivibrator to run freely.

Under this condition, the "mark" and "space" resistors previously described are arranged to keep MV relay 7–03 operated for a period of approximately 90 milliseconds and released for a period of 70 milliseconds.

With rotary selector switch 14–09 in position 1, and with AD relay 14–03 operated, a circuit is closed for the operation of the (10) pad relay 9–05 through a path which includes the normally open upper contacts 3 and 4 of AD relay 14–03, the normally closed upper contacts 4 and 5 of AP relay 8–09, and the normally open lower contacts 1 and 2 of MV1 relay 7–04 to ground.

Relay 9–05 operated, opens its normally closed upper contacts 9 and 10 thereby removing the shunt circuit around the 10-decibel pad in the receiving arm 9–02 of the attenuator, and it closes its normally open lower contacts 7 and 8, removing a 10-decibel pad 9–13 from the transmitting arm of the attenuator.

At the end of the marking period, tube 12–02 becomes non-conducting, resulting in the release of MV relay 7–03, which breaks its normally open upper contacts 3 and 4, opening the energizing circuit of MV1 relay 7–04.

Upon release, MV relay 7–03 also closes its normally closed upper contacts 1 and 2, closing the output from the Amplifier-Rectifier 3–21, and permitting the sensitive P relay 26–01 to operate, providing the 10-decibel pad is not too high.

Figure 35:
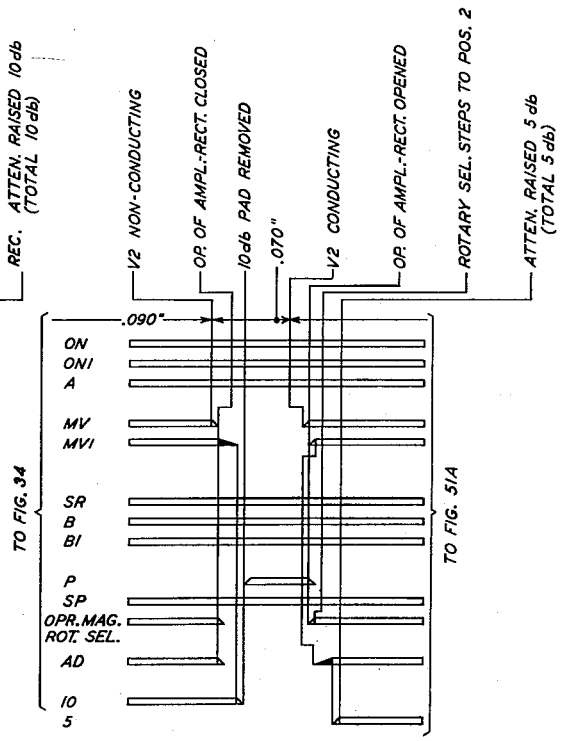
Figure 36:
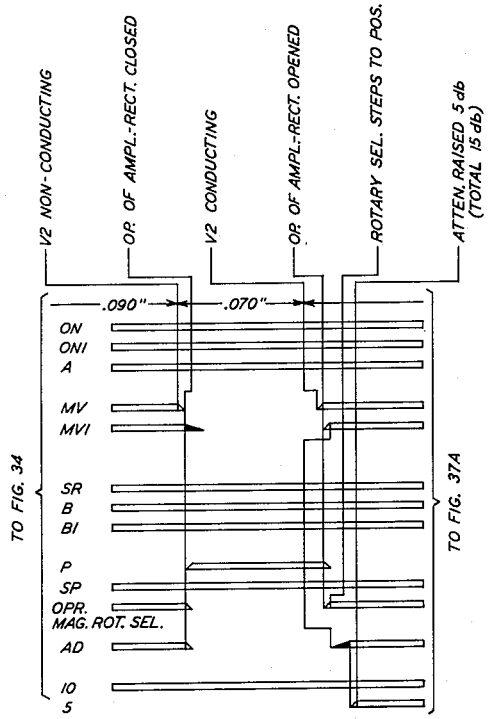

From Fig. 35 of the sequence chart, it is seen that MV1 relay 7–04 is slow releasing. This serves the purpose of providing time for the operation of P relay 26–35 if this relay is going to operate. When MV1 relay 7–04 releases, P relay 26–01 will be either operated or released, depending on whether the 10-decibel pad in the receiving arm is too high or not. If the 10-decibel pad is too high, then P relay 26–35 will be released. When MV1 relay 7–04 releases, it provides a reversing circuit along the path 8–25, 8–25b, for the winding of the 10-decibel relay 9–05 which extends from a 130 volt positive potential source 8–23 in series with resistor 8–24, through contacts 9 and 10 of AP relay 8–09, through the normally closed armature 5 and contact 3 of P relay 26–35, the normally closed contacts 3 and 4 of MV1 relay 7–04 under control of brush and bank 14–11. This arrangement provides a very fast releasing period for relay (10). As soon as relay 9–05 releases, removing the 10-decibel pad from the receiving arm, the receiving P relay 26–35 reoperates.

If, after MV relay 7–03 releases, but prior to the release of MV1 relay 7–04, P relay 26–01 operates, it indicates that the 10-decibel pad is not too high. This condition is indicated on Fig. 36 of the sequence charts.

When MV1 relay 7–04 releases with P relay 26–35 operated, the circuit for releasing relay 9–05 is broken, and the 10-decibel pad remains in the circuit. In either case, after the end of the spacing period, which is approximately 70 milliseconds, triode 12–02 becomes conducting, resulting in the operation of MV relay 7–03, closing its contacts 3 and 4 in turn energizing MV1 relay 7–04. As previously described, with MV relay 7–03 operated, the output of the Amplifier-Rectifier Circuit 3–21 is opened by the break between its normally open upper contacts 1 and 2, releasing the sensitive P relay 26–01.

In a manner previously described, MV relay 7–03 and MV1 relay 7–04, operated, cause the operation of AD relay 14–03 and also the operation of the magnet 14–07 of rotary selector 14–09, stepping the same to position 2.

AD relay 14–03 is made slow operating through the use of a secondary winding closed through lower contacts 1 and 2 so that the rotary magnet of selector 14–09 has an opportunity to move the selector switch to the next position before AD relay 14–03 operates. This guards against reoperation of a pad relay which may have been released because the pad was too large, before the switch advances to the next position. Since lower contacts 1 and 2 are open when AD relay 14–03 releases, it is normally fast releasing.

The same cycle of operations recurs during each step of selector 14–09; hence, the selector is advanced to position 10. Upon arrival at position 10, certain of the pad relays will have remained operated, inserting a certain receiving arm loss in the Attenuator 3–19, the magnitude of which is equal to the sum of the pads removed from the transmitting arm of the attenuator, as pointed out in the general discussion. Hence, the transmitting arm loss is the measured transmission loss of the Near-Far trunk channel.

Figure 37A:
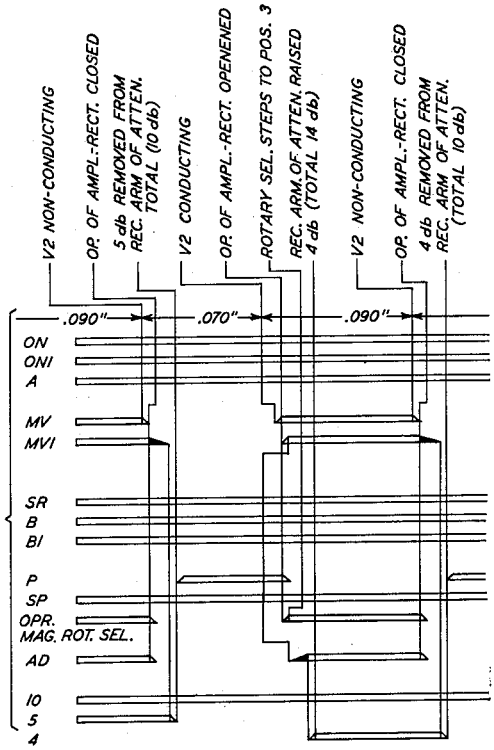
Figure 37B:
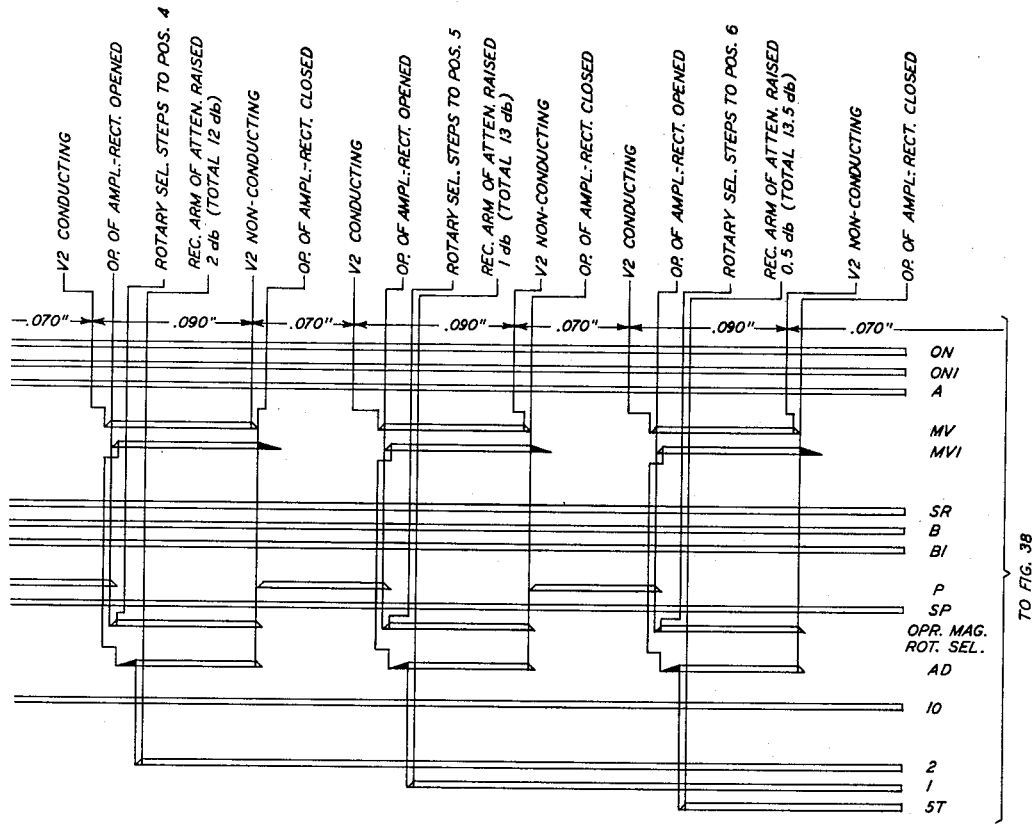
Figure 38:
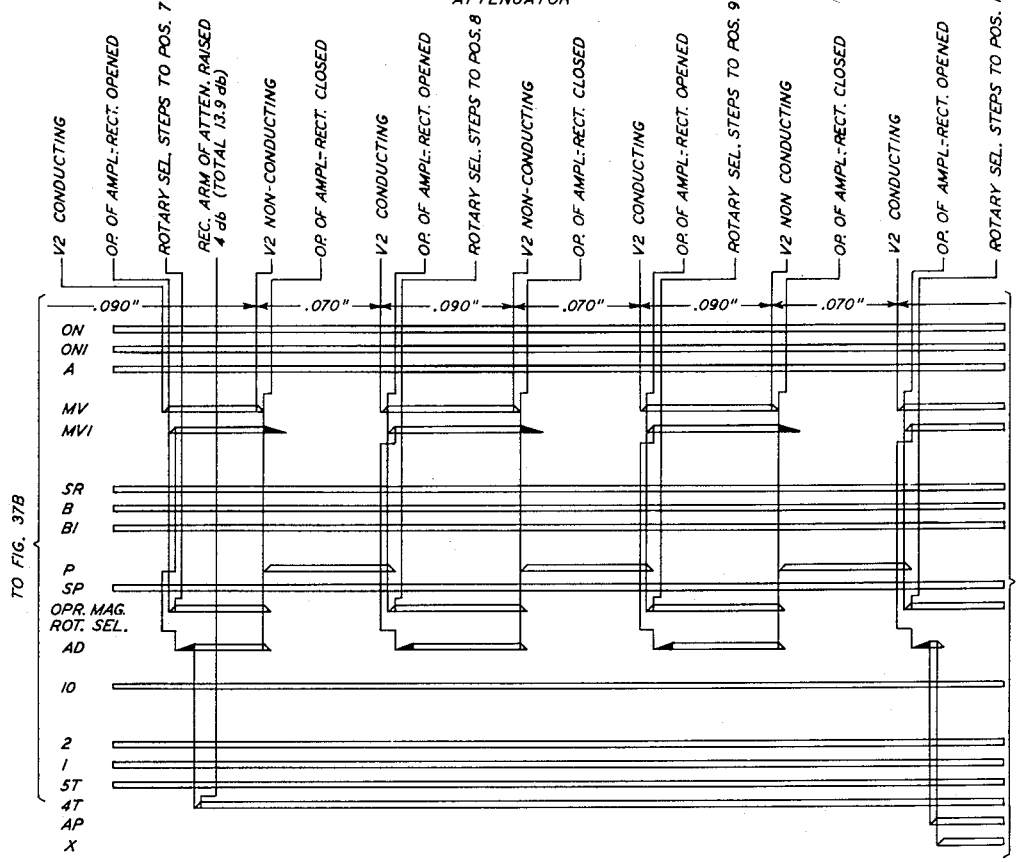

The sequence of the specific relay operations described is indicated in Figs. 37, 37A, and 37B of the sequence charts.

As an example, let us assume the Near-Far channel transmission loss is 11.7 decibels. Under this condition, relays 9–07, 10–1, 10–03, and 11–03 are operated. The summation of the pads 5, 2, 1, and 0.2 decibels controlled by these relays is the total receiving arm loss. With these relays operated, the transmitting pads remaining in the transmitting arm total 19.9 (the gain of amplifier 3–17) −8.2=11.7 decibels. This is the loss of the Near-Far channel.

*Completely adjusted attenuator checked against receiving or Near-Far channel trunk loss*

Since there are nine pad relays the rotary selector 14–09 must make nine steps before attenuator adjustment is completed. The selector must then take a tenth step for the purpose of checking the attenuator. Since the marking period is 90 milliseconds and the spacing period is 70 milliseconds, the total time per step is approximately 160 milliseconds. That is, a period of about 1.44 seconds is required to adjust the attenuator, allowing for adjustment of both the transmitting and receiving attenuators and spacing time between operations. During this time the transmission loss of the trunk line under test may have increased or decreased to such an extent that the attenuator adjustment may not represent the final transmission conditions over the channel. This is particularly true in view of the fact that the large pad adjustments are made first, and an appreciable fluctuation in the line may take place during the more precise part of the adjustment. Hence, a final recheck of the completely adjusted attenuator is desirable.

*Condition 1.*—Terminal net loss remains steady or drops during attenuator adjustment, but not enough to cause failure of "Attenuator Check"

Figure 39:
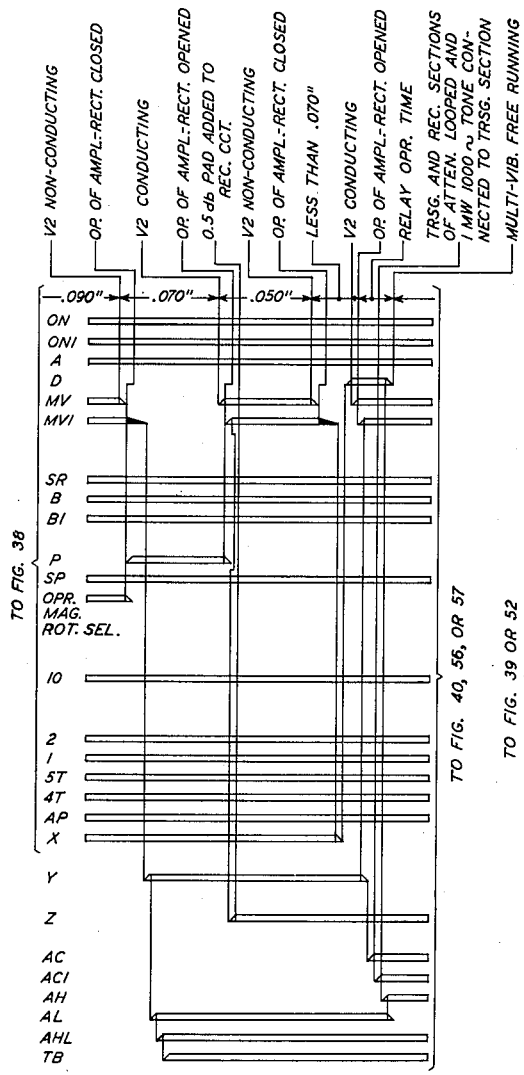

Under this condition, indicated in Fig. 39 of the sequence charts, since the loss remains steady or has dropped, the sensitive receiving P relay 26–35 will be operated when MV1 relay 7–04 releases after selector 14–09 steps to position 10. Accordingly, the pad relays will be operated. Prior to the operation of P relay 26–35, MV relay 7–03, MV1 relay 7–04 and the rotary magnet 14–07 of selector 14–09 will be operated. MV1 relay 7–04 also causes the operation of AD relay 14–03 which, in turn, causes the operation of AP relay 8–09 over a path 7–01, 7–01a, 14–08, including the normally open lower contacts 1 and 2 of MV1 relay 7–04, normally closed upper contacts 4 and 5 of AP relay 8–09, normally open upper contacts 4 and 3 of AD relay 14–03, contact 10 of the rotary selector 14–09, normally closed upper contacts 9 and 10 of AP relay 8–09, the windings of that relay, and the normally open lower contacts 7 and 8 of B1 relay 9–03, and the energizing source 9–16.

AP relay 8–09 when energized, performs the following operations:

(a) It locks itself operated over a path which includes its normally open upper contacts 11 and 12 to ground under control of contacts 5 and 6 of ON relay 7–07.

(b) It disconnects the contact spring of the sensitive P receiving relay 26–35 in the Amplifier-Rectifier Circuit from resistor 8–24 by breaking its normally closed lower contacts 9 and 10, and connecting grounded contact 8 instead;

(c) It breaks connection between its normally closed upper contacts 1 and 3, opening the circuit to AD relay 14–03 permitting the same to release;

(d) It opens the energizing circuit of AD relay 14–03 through its normally closed upper contacts 1 and 3, releasing AD relay 14–03;

(e) It closes an energizing circuit for X relay 23–01 from ground through normally open, lower contacts 1 and 2 of MV1 relay 7–04, through normally open, lower contacts 4 and 3 of A relay 8–03, over lead 7–01, through normally open upper contacts 9 and 8 of SP relay 14–01, through normally closed lower contacts 3 and 1 of C relay 18–01, over lead 7–35b, through normally open, upper contacts 7 and 6 AP relay 8–09, through brush and contact 10 of selector 14–09 over lead 14–08, through normally open upper contacts 9 and 8 of AP relay 8–09, over leads 7–01 and 7–01c, through normally closed lower contacts 4 and 5 of Z relay 23–05, through normally closed lower contacts 3 and 1 and winding of X relay 23–01, through resistor 23–11 to energizing source 23–13 through normally open upper contacts 1 and 2 of B relay 23–07. This results in the operation of X relay 23–01.

The three relays (X), (Y) and (Z) work together in a three-way arrangement, the two-relay counterpart of which is known as a W–Z arrangement, and is disclosed in Patent 1,751,263, March 18, 1930, to O. Cesareo. The first operation of MV1 relay 7–04 causes the operation of X relay 23–01. The subsequent release of MV1 relay 7–04 causes the operation of Y relay 23–03. The next reoperation of MV1 relay 7–04 causes the operation of Z relay 23–05. All three relays are now operated. The next release of MV1 relay 7–04 causes the release of X relay 23–01. The following reoperation of MV1 relay 7–04 results in the release of Y relay 23–03 and the subsequent release of MV1 relay 7–04 causes the release of Z relay 23–05. This completes one full cycle. Such a cycle is used initially to check the adjusted attenuator against the actual trunk loss, and also to check the transmitting and receiving arms of the attenuator together with the Amplifier 3–17 and Amplifier-Rectifier 3–21 against the local source of one milliwatt, thousand cycle tone. After these checks have been completed, X, Y and Z relays 23–01, 23–03 and 23–05 together with their auxiliaries (XA) relay 24–01, (YA) relay 24–02 and (ZA) relay 24–03 are again used to direct the sequence of operation of this circuit during the period when one milliwatt, 1,000 cycle tone is being transmitted from this circuit to the Near-Terminal for the Far-to-Near transmission measurement, and for repeating the Near-to-Far measurement. Subsequent to that, these relays are recycled to control the operational sequence during the noise observation.

At the end of the marking period after rotary selector 14–09 has stepped to position 10, MV relay 7–03 releases, breaking connection between its normally open lower contacts 1 and 2, releasing the rotary magnet of selector 14–09. Release of the MV relay 7–03 also opens its normally open upper contacts 3 and 4, opening the energizing circuit of MV1 relay 7–04, and closes the output circuit of the Amplifier-Rectifier 3–21 by connecting its contacts 1 and 2. Since it is assumed that the terminal net loss of the Near-to-Far channel has remained steady, or has dropped, the sensitive P relay 26–35 in the Amplifier-Rectifier Circuit 3–21 operates.

When the MV1 relay 7–04 releases, Y relay 23–03 is operated through a circuit which includes normally closed, lower contacts 1 and 3 of MV1 relay 7–04, normally open upper contacts 12 and 11 of X relay 23–01, resistor 23–08, and normally open upper contacts 3 and 4 of B relay 23–07.

This provides a circuit under control of P relay 26–35 and of operated X relay 23–01, Y relay 23–03, and AL relay 22–03 which indicates that the pad loss of the receiving arm of the attenuator may be less than it should be. When AL relay 22–03 operates, it causes the operation of AHL relay 18–03 through a path which includes the normally open lower contacts 5 and 6 of the AL relay 22–03. At this time, if the 10-decibel relay 9–05 is released, OT relay 18–05 operates and locks over a path which includes the upper normally open grounded contacts 4 and 5 of the ON relay 7–07, the normally closed upper contacts 4 and 5 of the R relay 13–03, the normally closed lower contacts 3 and 4 of the 10-decibel pad relay 9–05, the normally open lower contacts 9 and 10 of the AL relay 22–03, and the normally closed lower contacts 1 and 3 of the OT relay 18–05. Otherwise, if the relay 9–05 is not released, OT relay 18–05 remains released.

AHL relay 18–03 operated, removes the short circuit from the winding of TB relay 19–01 by breaking connection between its normally closed upper contacts 11 and 12, and engaging the normally open upper contact 10. This causes TB relay 19–01 to operate.

At the end of the spacing period, triode 12–02 becomes conducting, causing operation of the MV relay 7–03, which in turn closes its upper contacts 3 and 4, causing the operation of MV1 relay 7–04. Under this condition, the output circuit of the Amplifier-Rectifier 3–21 is again opened by the break in connection between normally closed upper contacts 1 and 2 of the MV relay 7–03; hence, the P relay 26–35 is released in the circuit of the Amplifier-Rectifier 3–21.

Operation of the MV1 relay 7–04, closing its normally open lower contacts 1 and 2, causes operation of the Z relay 23–05 over a path which includes the normally open lower contacts 6 and 7 of TM relay 8–05, the normally open upper contacts 7 and 8 of TM relay 8–05, normally open upper contacts 8 and 9 of N1 relay 15–03, normally open upper contacts 1 and 2 of ZA relay 24–03, the normally open lower contacts 11 and 12 of Y relay 23–03, normally closed upper contacts 1 and 3 and the winding of Z relay 23–05, resistor 23–09, and normally open upper contacts 5 and 6 of B relay 23–07.

Upon operation of X relay 23–01, Y relay 23–03, and Z relay 23–05, together with AL relay 22–03 and AHL relay 18–03, the 0.5-decibel pad 22–07 is inserted in series with the adjusted attenuator receiving arm pads, thereby increasing the loss of the receiving arm by 0.5 decibel.

At the end of the marking period, which is now 50 milliseconds instead of 90 milliseconds due to the operation of the AHL relay 18–03 and the substitution of the grid timing resistor 13–08 for grid timing resistor 18–04, MV relay 7–03 releases, closing the output circuit of the Amplifier-Rectifier Circuit 3–21 through its normally closed upper contacts 1 and 2, and opening the energizing circuit to the MV1 relay 7–04 by releasing the connection to ground through its normally open upper contacts 3 and 4. Since we are assuming that the transmission loss from the Near-to-Far Terminal of the connected trunk line remains steady or has dropped slightly, the addition of the 0.5-decibel pad is sufficient to prevent operation of the P relay 26–35 of the receiving circuit.

When the MV1 relay 7–04 releases breaking connection between its normally open lower contacts 1 and 2 to ground, X relay 23–01 is released. Hence, with Y relay 23–03 operated, Z relay 23–05 operated, and P relay 26–35 released, a circuit is closed for the operation of D relay 13–05 over a path 8–25, 8–25b, 7–35b which includes the grounded, normally open lower contacts 8 and 9 of the AP relay 8–09, the normally closed contacts 5 and 3 of the P relay 26–35, the normally closed upper contacts 4 and 3 of MV1 relay 7–04, the normally closed lower contacts 9 and 10 of X relay 23–01, the normally open upper contacts 9 and 8 of Y relay 23–03, the normally open upper contacts 5 and 6 of AL relay 22–03, the normally open upper contacts 11 and 12 of SP relay 14–01, lead 8–25d, lead 7–35b, winding of the D relay 13–05 and the negative potential source 13–12.

Operation of D relay 13–05 connects a negative potential source 7–24 to the grid of tube 12–01 through its upper normally open contacts 5 and 6 over a path which includes the upper normally closed contacts 5 and 6 of the TM relay 8–05, and the resistor 7–25. This operation causes tube 12–02 to become conducting, reoperating MV relay 7–03, which results in the operation of MV1 relay 7–04. Operation of relay D also causes the operation of the 10 decibel-pad relay 9–05 in case OT 18–05 relay is operated.

Accordingly, the multivibrator is no longer free running but is now held in its marking condition. MV1 relay 7–04, operated disengages its lower contacts 1 and 3, and connects its lower contacts 1 and 2, causing the release of Y relay 23–03. This leaves only Z relay 23–05 operated.

With Y relay 23–03 released and Z relay 23–05 operated, a circuit is closed energizing AC relay 17–03 over a path which includes upper normally closed contacts 2 and 3 of T1 relay 25–03, lower normally open contacts 12 and 11 of Z relay 23–05, and upper normally closed contacts 5 and 4 of Y relay 23–03.

The operation of AC relay 17–03, in turn causes the operation of AC1 relay 22–17 by closing its normally open lower contacts 11 and 12 to ground, completing the energizing circuit of the latter.

Operation of AC1 relay 17–03, closing its lower contact pairs 3 and 4, and 6 and 7, and of AC relay 17–03, opening its upper contact pairs 6 and 7, and 8 and 9, and closing its lower contact pairs 8 and 9, and 11 and 12, completes connection of the one milliwatt thousand-cycle test tone source 25–09 through leads 25–13 and 25–15, the transmitting arm of the attenuator, leads 4–14, and 4–16, the Amplifier circuit 3–17, which raises its power level 20.6 decibels, through the receiving arm of the Attenuator 3–19, and through the 0.5-decibel pad 22–07, over lead 26–47 to the Amplifier-Rectifier Circuit 3–21.

Operation of AC1 relay 22–17 also causes the operation of AH relay through a path which includes the upper normally open grounded contacts 6 and 7 of the AC1 relay 22–17; the latter, in turn, breaks connection between upper 1 and 2 contacts, causing the release of AL relay 22–03. The 0.2-decibel pad 22–09, which was previously in series with the attenuator circuit has been removed through the closure of upper contacts 9 and 10 of AC1 relay 22–17, and the opening of upper contacts 1 and 3 of AC relay 17–03 to provide operational tolerances for the Amplifier 3–17, receiving and transmitting arms of the Attenuator 3–19, the one milliwatt thousand-cycle tone supply 22–09, and the Amplifier-Rectifier 3–21.

AC1 relay 22–17, in operating, disengages its upper contacts 1 and 2, breaking the energizing circuit of the D relay 13–05, causing the release of the same, which in turn breaks connection between its upper contacts 5 and 6, removing the negative potential source 7–24 from the grid of the triode 12–01, permitting the multivibrator to run freely.

Figure 54:
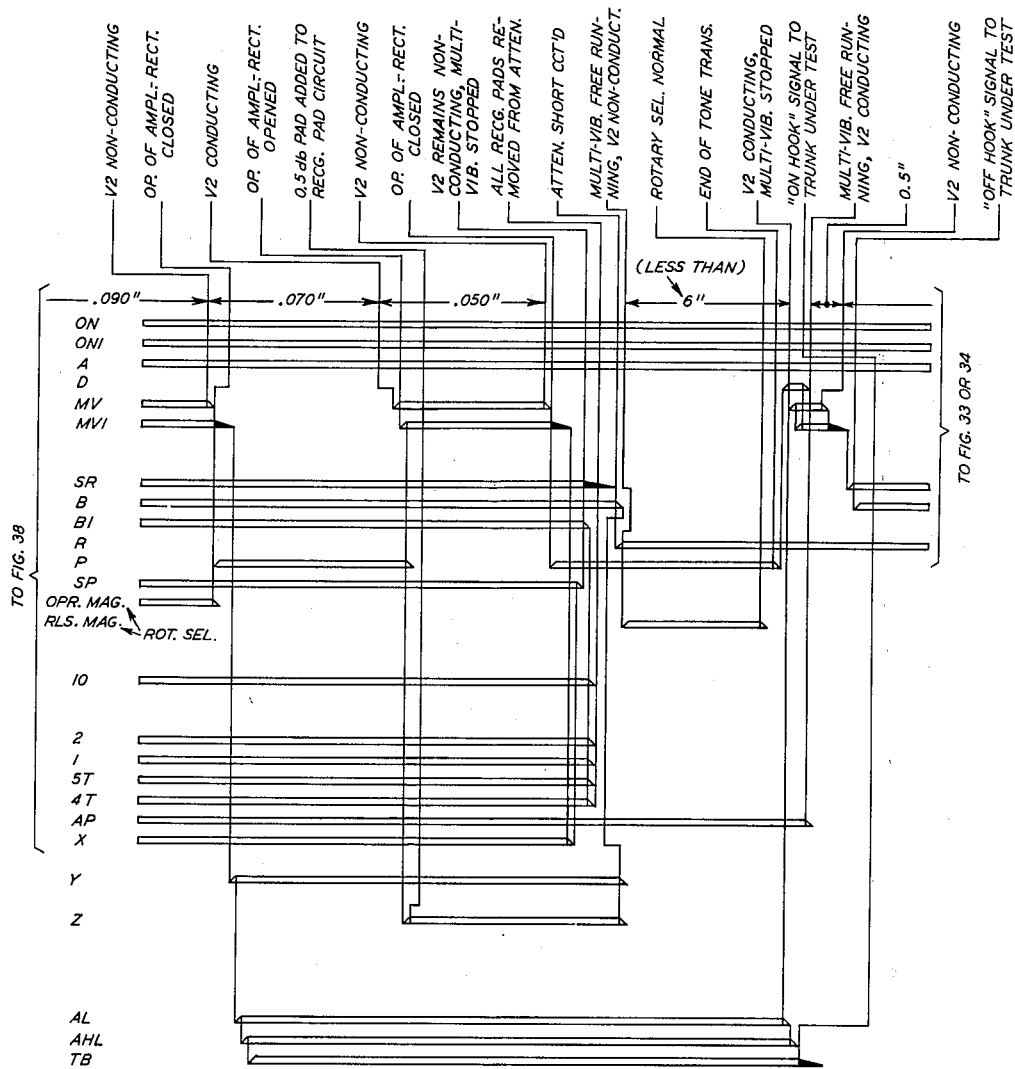

*Condition 2.*—Terminal net loss dropped enough during Attenuator adjustment to cause failure of "Attenuator Check" test Under this condition, which is indicated in Fig. 54 of the Sequence Charts, operation is the same as described under the previous section up to the time of the release of MV relay 7–03, after a 0.5-decibel pad has been added during the marking period.

Release of MV relay 7–03, closing its upper contacts 1 and 2, closes the output circuit of the Amplifier-Rectifier 3–21, permitting the sensitive P receiving relay 26–35 to operate, since under this condition it is assumed that the loss of the Near-Far channel has decreased to such an extent that the addition of a 0.5-decibel pad is not sufficient to guard against the operation of P relay 26–35.

When MV1 relay 7–04 finally releases with P relay 26–35 operated, it breaks its lower normally open contact combination 1 and 2, releasing X relay 23–01, which in turn operates its upper normally closed contacts 9 and 10 to close a short circuit to ground which extends from the normally open contacts 2 and 5 of P relay 26–35, through the normally open upper contacts 4 and 5 of SR relay 13–01, the normally closed upper contacts 1 and 2 of MV1 relay 7–04, the normally closed upper contacts 9 and 10 of X relay 23–01, the normally open upper contacts 6 and 7 of Y relay 23-03, the normally open upper contacts 9 and 10 of AL relay 22-03, the normally open lower contacts 11 and 12 of SP relay 14-01, releasing SP relay 14-01.

SP relay 14-01 released, opens its normally open lower contacts 4 and 5, breaking the energizing circuit of slow releasing SR relay 13-01.

SR relay 13-01, when it releases, opens its normally open lower contacts 6 and 7, releasing B relay 23-07.

Release of SR relay 13-01, engaging its normally closed lower contacts 1 and 3, also completes an energizing circuit for R relay 13-03. This circuit extends to ground through the normally open lower contacts 9 and 10 of A relay 8-03 and to the winding of R relay 13-03 through the normally closed lower contacts 1 and 3 of SR relay 13-01, the normally closed upper contacts 9 and 10 of C relay 18-01, the normally closed lower contacts 4 and 5 of TM relay 8-05, and the normally closed upper contacts 4 and 5 of SP relay 14-01.

SR relay 13-01 has a period of slow release of such duration as to insure that the grid space condenser 12-03 is fully charged before R relay 13-03 operates and the multivibrator comprising tubes 12-01 and 12-02 commences to run freely. B relay 23-07 released, disengages its upper contact combinations 3 and 4, and 5 and 6 disconnecting the energizing sources from Y relay 23-03 and Z relay 23-05.

The operation of R relay 13-03 disengages its normally closed upper contact combination 4 and 5 causing the release of OT relay 18-05 if the latter is operated.

Operation of R relay 13-03 also applies ground to the energizing circuit of the rotary selector release magnet 14-05 over a circuit which includes the normally open lower contacts 8 and 9 of R relay 13-03, and normally open contacts 1 and 2 of the "off-normal" springs of rotary selector release magnet 14-05. This restores the rotary selector 14-09 to normal.

When SP relay 14-01 releases, closing its lower normally closed lower contacts 9 and 10, it connects the negative potential source 7-24 to the grid of tube 12-02 over a path which includes the normally closed upper contacts 6 and 7 of R relay 13-03, normally open lower contacts 6 and 7 of AHL relay 18-03, and the normally closed lower contacts 9 and 10 of SP relay 14-01. Operation of R relay breaking its connection between its contacts 6 and 7 removes negative potential source 7-24 from the grid of tube 12-02, permitting the multivibrator to run freely, initiating a 6-second spacing period while awaiting the removal of 1000-cycle test tone at the Near-Terminal of the connected test trunk line. Under this condition, as indicated in Fig. 54 of the sequence charts, the following relays are operated:

| | |
|---|---|
| ON relay 7-07 | AP relay 8-09 |
| ON1 relay 7-17 | AL relay 22-03 |
| A relay 14-09 | TB relay 19-01 |
| P relay 26-35 | R relay 13-03 |
| AHL relay 18-03 | Rotary selector release relay 14-05 |

When the test tone is removed at the Near-Terminal of the trunk line under test, P relay 26-35 releases, closing a circuit through its contacts 3 and 5 for the operation of D relay 13-05 in a circuit which includes normally open lower contacts 4 and 5 of AHL relay 18-03, normally open lower contacts 6 and 7 of R relay 13-03, and normally closed upper contacts 3 and 4 of MV1 relay 7-04.

Operation of the D relay 13-05 closes its normally open upper contacts 5 and 6, connecting the negative potential source 7-24 to the grid of triode 12-01 over a path which includes the upper normally closed contacts 5 and 6 of the TM relay 8-05. This operation biases the triode 12-01 beyond cutoff, and renders triode 12-02 conducting, thereby energizing the operating circuit of MV relay 7-03, which, in turn, closes its contacts 3 and 4 energizing MV1 relay 7-04.

Operation of D relay 13-05 breaking connection between its lower contacts 1 and 2 also causes release of the AL relay 22-03 by breaking the energizing path of the latter. Release of the AL relay 22-03, breaking connection between its lower contacts 6 and 5 to ground, causes the release of the AHL relay 18-03. Release of the AHL relay 18-03 causes release of the D relay 13-05 by breaking connection between its lower normally open contacts 4 and 5, thereby opening the energizing circuit of the latter.

Release of the D relay 13-05 breaks connection between its upper normally open contacts 6 and 5, breaking connection to the negative potential source 7-24 which was biasing the grid of the triode 12-01, thereby permitting the multivibrator to run freely in the marking condition for a period of 0.5 second. During this period with AHL relay 18-03 released, ground is removed from the simplex circuit to the retardation coil 12-17, causing a momentary "on-hook" signal to be transmitted to the Near-Terminal of the connected trunk line. This signal indicates to either an automatic test circuit or to a test board operator that the transmission measuring circuit is requesting a repetition of the thousand-cycle test tone transmission from the Near-Terminal.

When the marking period is completed triode 12-02 becomes non-conducting, resulting in the release of MV relay 7-03, breaking its upper contact combination 3 and 4, in turn, causing the release of the MV1 relay 7-04.

Figure 33:
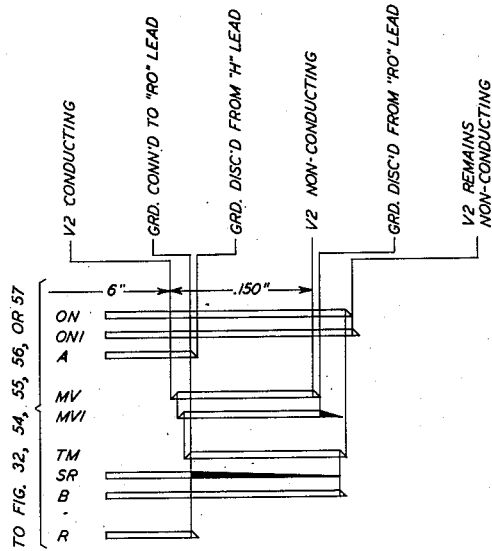

Upon the release of MV1 relay 7-04, assuming relay 13-03 is operated, a circuit is established for the reoperation of SR relay 13-01 through the following path: the grounded lower contact combination 1 and 3 of the MV1 relay 7-04, the upper normally closed contact combination 6 and 7 of the AHL relay 18-03, the upper normally open contact combination 10 and 11 of the R relay 13-03, the upper normally closed contacts 1 and 2, of the D relay 13-05 the lower normally closed contacts 1 and 2 of the TM relay 8-05 and the normally closed upper contacts 1 and 2 of N1 relay 15-03. This circuit is now in the same condition as it was following seizure of the transmission measuring circuit, but prior to the receipt of the test tone from the Near-Terminal such as indicated in Fig. 33 of the sequence charts. The multivibrator is now operating in the spacing condition.

*Condition 3.*—Terminal net loss rises during attenuator adjustment; but not sufficiently to cause failure of "Attenuator Check Test"

Under this condition, which is indicated in Fig. 52 of the Sequence Charts, the circuit steps selector 14-09 to position 10 in the manner described previously under condition 1. At the end of the 90 millisecond marking period, triode 12-02 becomes non-conducting releasing MV relay 7-03, which breaks connection between its normally closed upper contacts 1 and 2 to remove the short circuit from the receiving Amplifier-Rectifier Circuit 3-21; and breaks connection between its normally open lower contacts 1 and 2, releasing the rotary magnet 14-07 of selector 14-09; and which also breaks connection between its normally open upper contacts 3 and 4; releasing MV1 relay 7-04.

Under this condition, P relay 26-35 operates differently than it did under condition 1. Release of MV1 relay 7-04 closes its normally closed lower contacts 1 and 3, causing the operation of Y relay 23-03 through a circuit which includes also the normally open upper contacts 11 and 12 of the X relay 23-01. With X relay 23-01, and Y relay 23-03 operated, and P relay 26-35 released, a circuit is closed from the Amplifier-Rectifier Circuit 3-21 for the operation of AH relay 22-02 over a path which includes the normally closed contacts 3 and 5 of the P relay 26-35 the normally closed upper contacts 3 and 4 of the MV1 relay 7-04, the lower normally open contacts 9 and 8 of X relay 23-01, the normally open lower contacts 9 and 8 of relay Y 23-03, the lower normally closed contacts 10 and 9 of Z relay 23–05 and the upper normally closed contacts 8 and 7 of AC1 relay 22–17.

Operation of the AH relay 22–01 energizes the winding of AHL relay 18–03 by closing its lower normally open grounded contacts 5 and 6. Also, operation of AH relay 22–01 indicates that the loss through the test trunk line has risen during the adjustment of the attenuator to such a value that the loss in the attenuator receiving line is now higher than what it should be.

Upon operation of AHL relay 18–03, providing the 10-decibel pad relay 9–05 is released, OT relay 18–05 is operated over a path which includes the normally open upper grounded contacts of 4 and 5 of the ON1 relay 7–07, the upper normally closed contacts 4 and 5 of R relay 13–03, the lower normally closed contacts 3 and 4 of the 10-decibel pad relay 9–05, the lower normally open contacts 7 and 8 of the AH relay 22–02, and the normally closed lower contacts 1 and 3 of the OT relay 18–05.

Operation of the AHL relay, breaking connection between its upper normally open contacts 11 and 12, breaks the shunting path around the winding of the TB relay 19–01, causing the same to be energized.

At the end of the spacing period, triode 12–02 becomes conducting, causing the operation of MV relay 7–03 which in turn closes its upper normally open contacts 3 and 4 reenergizing the MV1 relay 7–04. Operation of the MV1 relay 7–04, in turn, causes operation of the Z relay 23–05 over the following path which includes the normally open lower contacts 1 and 2 to ground of the MV1 relay 7–04, the normally open lower contacts 3 and 4 of the A relay 8–03 the normally open upper contacts 8 and 9 of the SP relay 14–01, the normally open lower contacts 1 and 2 of the C relay 18–01, the normally open lower contacts 11 and 12 of the Y relay 23–03, and the normally closed upper contacts 1 and 3 of Z relay 23–05.

The operation of Z relay 23–05, closing its normally open upper contacts 11 and 12, now connects a short circuit around the 0.5-decibel pad 22–07 inserted in the signal path before the input terminal of the Amplifier-Rectifier Circuit 3–21.

Operation of the MV relay 7–03 breaks combination between its upper contacts 1 and 2 opening the output of the Amplifier-Rectifier Circuit 3–21, and thereby preventing the operation of the P relay 26–35.

At the end of the marking period, which has a duration at this time of 50 milliseconds, the triode 12–02 becomes non-conducting, causing the release of MV relay 7–03, which accordingly engages its normally closed upper contacts 1 and 2, thereby closing the output of the Amplifier-Rectifier Circuit 3–21, reoperating P relay 26–35. Through connection of the normally open upper contacts 3 and 4 of MV relay 7–03, MV1 relay 7–04 is reoperated.

If the transmission loss of the Near-Far channel of the connected trunk line has not risen too high, P relay 26–35 should operate upon the release of MV relay 7–03. Let us assume that P relay 26–35 does operate. Accordingly, the release of MV1 relay 7–04 breaking its normally open lower contacts 1 and 2, causes the release of X relay 23–01. Upon the release of X relay 23–01, Y relay 23–03, Z relay 23–05, and P relay 26–35 being operated, a circuit is closed for the operation of D relay 13–05 over the following path: from the grounded lower contacts 8 and 9 of AP relay 8–09 through normally open contacts 5 and 2 of P relay 26–35, normally open upper contacts 5 and 4 of SR relay 13–01, normally closed upper contacts 2 and 1 of MV1 relay 7–04, normally closed upper contacts 9 and 10 of X relay 23–01, normally open upper contacts 6 and 7 of Y relay 23–03, normally open upper contacts 8 and 7 of AH relay 22–01, normally open upper contacts 11 and 12 of SP relay 14–01, over leads 8–25d and 7–35b to the winding of D relay 13–05.

The operation of D relay 13–05 closes its normally open upper contacts 6 and 5, completing a path from the grid of triode 12–01 to a negative potential source 7–24 through the normally closed upper contact combination 5 and 6 of the TM relay 8–05, accordingly biasing this tube beyond cut-off and transferring the current conduction to tube 12–02. This causes the operation of MV relay 7–03. Under this condition, the multivibrator is being held in the marking condition.

Operation of the MV relay 7–03, closes its upper normally open contacts 3 and 4, causing the operation of MV1 relay 7–04; and through disconnection of its upper normally closed contacts 1 and 2, again opens the output of the Amplifier-Rectifier Circuit 3–21, causing the release of the sensitive P relay 26–35. Providing OT relay 18–05 is operated, operation of the D relay 13–05 also causes operation of the 10-decibel pad relay 13–05 through a path which includes normally open lower contacts 4 and 3 of D relay 13–12, and normally open upper contacts 4 and 5 of OT relay 18–05.

D relay 13–05 operated, causes operation of MV relay 7–03, and MV1 relay 7–04, in turn, causing the release of Y relay 23–03. In a manner described in detail with reference to condition 1, release of Y relay 23–03, causes operation of AC relay 17–03 which, in turn, causes the operation of AC1 relay 22–17. Since, in this case, AH relay 22–01 was previously operated, it remains so.

Figure 55:
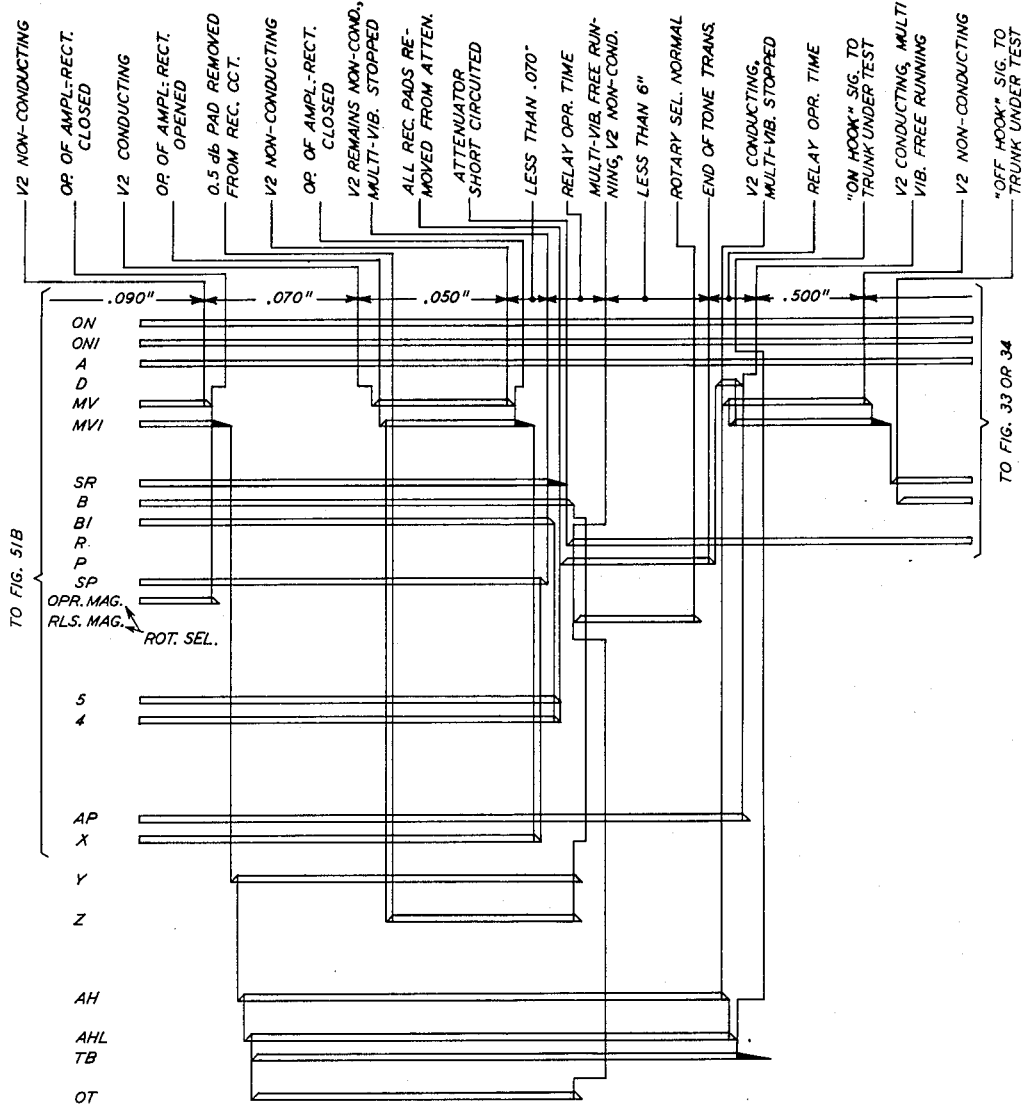

*Condition 4.*—Terminal net loss rises sufficiently during attenuator adjustment to cause failure of "Attenuator Check" test Under this condition which is indicated in Fig. 55 of the sequence charts, the operation of the circuit is the same as described with reference to condition 3, up to the end of the marking period after a 0.5-decibel pad has been removed from the circuit between the receiving arm of the attenuator and the Amplifier-Rectifier Circuit 3–21.

At the end of this marking period, triode 12–02 becomes non-conducting, releasing MV relay 7–03, which accordingly closes its upper contacts 1 and 2, closing the circuit from the output of the Amplifier-Rectifier. MV relay 7–03 also breaks its contact combination 3 and 4 releasing MV1 relay 7–04. Upon the release of MV1 relay 7–04, breaking its grounded lower contact combination 1 and 2, X relay 23–01 is released. Under this condition, however, P relay 26–35 is not operated, and hence a short circuit around energizing winding of SP relay 14–01 is closed under control of P relay 26–35, released. This short circuit extends through the normally open lower contacts 11 and 12 of SP relay 14–01, the normally open upper contacts 5 and 6 of AH relay 22–01, the normally closed lower contacts 9 and 10 of X relay 23–01, the normally closed upper contacts 3 and 4 of MV1 relay 7–04, normally closed contacts 3 and 5 of P relay 26–35, and the normally opened lower contacts 8 and 9 of AP relay 8–09.

The release of SP relay 14–01, further causes the release of B1 relay 9–03 by breaking the normally open lower grounded contacts 6 and 7 of the former to the energizing circuit of the latter; and also causes the release of the SR relay 13–01 by breaking connection between the lower contacts 4 and 5 to ground of the SP relay 14–01. Release of SP relay 14–01 also connects the negative potential source 7–24 to the grid of tube 12–02 by closing its lower normally closed contacts 9 and 10 completing a path which includes the normally open lower contacts 6 and 7 of the AHL relay 18–03 and the normally closed upper contacts 6 and 7 of the R relay 13–03. This operation maintains tube 12–02 in non-conducting condition.

Release of B1 relay 9–03 causes the release of all the operated attenuator pad relays by disconnecting its contacts from their respective energizing sources. As soon as these relays are released, the attenuator receiving arm has substantially zero loss, and the P relay 26–35 at this time performs no useful function except to indicate that test tone is still connected to the terminal of the connected test trunk line.

Upon the release of SR relay 13–01, breaking connection between its lower contacts 6 and 7, B relay 23–07 releases. Moreover, release of the SR relay also causes operation of R relay 13–03 by connecting the energizing circuit of the latter to ground through a path which includes the normally open lower grounded contacts 10 and 9 of the A relay 8–03, the lower normally closed contacts 3 and 1 of the SR relay 13–01, the normally closed upper 10 and 9 contacts of C relay 18–01, the lower normally closed contacts 4 and 5 of the TM relay 8–05, and the upper normally closed contacts 4 and 5 of the SP relay 14–01.

The release of the B relay 23–07 breaks connection between its contact pairs 3 and 4, and 5 and 6, respectively, to the energizing sources of Y relay 23–03, and Z relay 23–05, releasing the same.

Operation of the R relay 13–03 performs the following operations: it breaks connection between its normally closed upper contacts 6 and 7 thereby removing the biasing negative potential source 7–24 from the grid of triode 12–02, permitting the multivibrator to run freely in the spacing condition; it breaks connection between its normally closed upper contacts 4 and 5 causing the release of OT relay 18–05; it operates the rotary selector release magnet 14–05 by connecting the energizing circuit of the latter over a path which includes the normally open "off-normal" contacts 1 and 2 of the rotary selector release magnet 14–05, and lower normally open contacts 8 and 9 to ground of R relay 13–03.

This operation restores the rotary selector 14–09 to normal.

In this condition, the circuit is awaiting the release of P relay 26–35 with the following relays operated:

ON 7–07        R 13–03
ON1 7–17       TB 19–01
A 8–03         OT 18–05
AH 22–01       AP 8–09
AHL 18–03

When the thousand-cycle test tone is removed from the line at the Near-Terminal of the connected test trunk circuit, P relay 26–35 releases, causing the operation of D relay 13–05 over a path which includes the grounded normally open lower contacts 8 and 9 of the AP relay 8–09, the normally closed contacts 3 and 5 of the P relay 26–35, the normally closed upper contacts 3 and 4 of MV1 relay 7–04, the normally open lower contacts 6 and 7 of R relay 13–03, and the normally open lower contacts 4 and 5 of the AHL relay 18–03.

Operation of the D relay 13–05 opening its normally closed lower contacts 1 and 2, releases AH relay 22–01, over a path which includes the normally open upper contacts 1 and 2 of R relay 13–03. Operation of D relay 13–05 also connects the negative potential source 7–24 to the grid of triode 12–01, biasing the same beyond cut-off and making triode 12–02 conducting, which in turn, results in the operation of the MV relay 7–03. Operation of MV relay 7–03, previously described, causes the operation of MV1 relay 7–04.

The release of AH relay 22–01 causes the release of the AHL relay 18–03 by breaking connection between the normally open lower contacts 5 and 6 of the former.

Release of the AHL relay 18–03 performs the following functions: it closes its normally closed upper contacts 11 and 12 restoring the short circuit across the winding of TB relay 19–01, releasing this relay, it breaks connection between its normally open lower contacts 4 and 5, causing the release of the D relay 13–05, which, in turn, causes the release of the AP relay 8–09 by breaking connection between upper contacts 7 and 8 of the former in the energizing circuit of the latter.

Release of D relay 13–05 also disconnects its upper contacts 5 and 6 breaking the path between the negative potential source 7–24 and the grid of tube 12–01 thereby permitting the multi-vibrator to run freely in a marking condition for a period of a half-second.

Upon the release of AHL relay 18–03, breaking connection between its normally open upper contacts 10 and 11, ground is removed from the retardation coil 12–17, resulting in a momentary "on-hook" signal being transmitted to the Near-Terminal of the connected test trunk line. From this point on the circuit operation is similar to that described under condition 2.

*One-milliwatt thousand-cycle test tone is applied through a circuit comprising the transmitting section of the attenuator amplifier, receiving section of the attenuator, and Amplifier-Rectifier Circuit*

Condition 5.—Check is satisfactory

Figure 40:
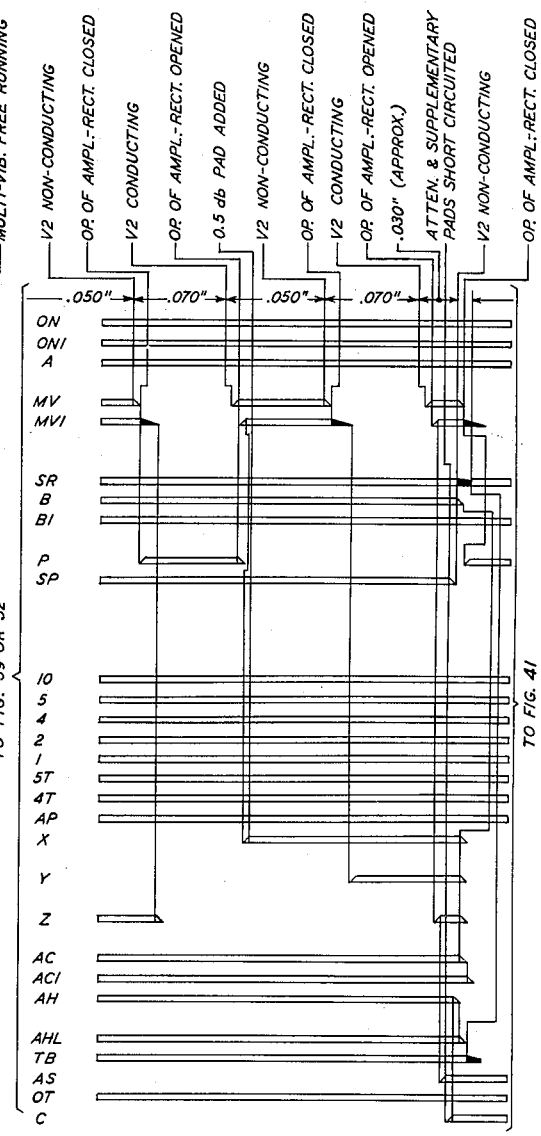

Under this condition, which is indicated in Fig. 40 of the sequence charts, the following relays are operated:

ON 7–07        ONI 7–17
MV 7–03        B 23–07
MV1 7–04       B1 9–03
SR 13–01       SP 14–01
A 8–03 the pad control relays,

Z 23–05        AHL 18–03
AC 17–03       AP 8–09
AC1 22–17      AL 22–03 and AH relay 22–01 are operated, and OT relay 18–05 may be operated.

At the end of a marking period of 50 seconds' duration, MV relay 7–03 releases, closing the output circuit of the Amplifier-Rectifier 3–21, and thereby permitting the operation of P relay 26–35.

If the entire circuit is in working order, and the sum of the transmitting and receiving arm losses does not exceed the sum of their nominal values, P relay 26–35 should operate under this condition. When MV1 relay 7–04 releases, it disconnects its lower contacts 1 and 2, thereby causing the release of the Z relay 23–05.

At the end of the spacing period, triode 12–02 becomes conducting, resulting in the operation of MV relay 7–03, and MV1 relay 7–04, as previously described, and opening the output of the Amplifier-Rectifier Circuit causing the release of P relay 26–35. Operation of the MV1 relay 7–04 closes its lower contacts 1 and 2 to ground completing the energizing circuit of the X relay 23–01 over the path previously described. With X relay 23–01 operated, a 0.5-decibel pad 22–05 is inserted between the adjusted attenuator and the Amplifier-Rectifier Circuit.

At the end of the marking period MV relay 7–03 releases, closing the output circuit of the Amplifier-Rectifier Circuit 3–21, as previously described, and causing the release of MV1 relay 7–04. Since the sum of the nominal losses of the transmitting and receiving arms, together with 0.5-decibel pad 22–07 should be just sufficient, with a 0.2-decibel tolerance, to operate P relay 26–35, the addition of the second 0.5-decibel pad 22–05 should prevent operation of P relay 26–35. When MV1 relay 7–04 releases, reengaging its lower contacts 1 and 2 this reestablishes the energizing circuit for the operation of Y relay 23–03. Under this condition, assuming that everything is in order, receiving P relay 26–35 will be released at this time. At the end of a 70 millisecond spacing period, tube 12–02 again becomes conducting, operating MV relay 7–03, and MV1 relay 7–04 in the manner previously described.

Operation of the MV1 relay 7–04 reconnects its lower contacts 1 and 2, causing operation of the Z relay 23–05 over the path previously described. With X relay 23–01, Z relay 23–05, and AC1 relay 22–17 operated, AS relay 17–01 is operated over a path which includes the grounded lower contacts 6 and 7 of the X relay 23–01, the lower contacts 6 and 7 of the Z relay 23–05 and the lower contacts 9 and 10 of the AC1 relay 22–17.

When AS relay 17–01 is energized, it initiates the following operations:

(a) It energizes the C relay 18–01 over a path to ground through its normally open upper contacts 9 and 10;

(b) It causes the release of SP relay 14–01 by breaking connection between its normally closed upper contacts 1 and 2 in the energizing circuit of the same;

(c) It places the B1 relay 9–03 under control of the off-normal springs 3 and 4 of rotary selector release magnet 14–05 over a path which includes its normally open lower contacts 9 and 10;

(d) It locks itself operated under control of normally open lower contacts 5 and 6 of B1 relay by actuating its own lower contacts 5 and 6; and (e) It short circuits the receiving arm of the adjusted Attenuator, together with the 0.5- and 0.2-decibel pads to the input of the Amplifier-Rectifier by closing its normally open upper contacts 11 and 12.

Release of the SP relay 14–01 causes the release of B relay 23–07 by breaking connection between lower grounded contacts 6 and 7 of the former to the energizing circuit of the latter, and moreover, release of the SP relay 14–01 connects the negative potential source 7–24 through a path previously described, to the grid of tube 12–02, biasing this tube beyond cut-off, making tube 12–01 conducting, and releasing MV relay 7–03, as previously described.

Operation of C relay 18–01 guards against the false operation of SP relay 14–01, and causes the release of AH relay 22–01 by breaking its normally closed upper contacts 3 and 4 to the energizing source of the same. Release of the AH relay 22–01 causes the release of the AHL relay 18–03 in a manner previously described.

In a manner also previously described, release of the B relay 23–07 breaks contact with the energizing sources, thereby causing the release of X, Y, Z, and AC relays 23–01, 23–03, 23–05, and 17–03, respectively.

Release of AC relay 17–03 breaks its grounded lower contact connection 11 and 12, causing the release of the AC1 relay 22–17.

AHL relay 18–03, when released, reconnects its upper normally closed contacts 11 and 12, completing a short circuit around the windings of the TB relay 19–01, releasing this relay. Since the TB relay 19–01 is a slow release type, it guards against the operation of TM relay 8–05 at this time by retaining its normally closed right-hand contacts 1 and 2 in closed condition for an average interval of 175 milliseconds. This insures that the space condenser 12–03 is fully charged before the multivibrator commences to run freely. The circuit is now operating in a six second timing period awaiting the removal of the thousand-cycle test tone source 2–01 at the Near-Terminal of the connected test trunk circuit.

*Condition 6.*—P relay in Amplifier-Rectifier circuit fails to operate

Figure 57:
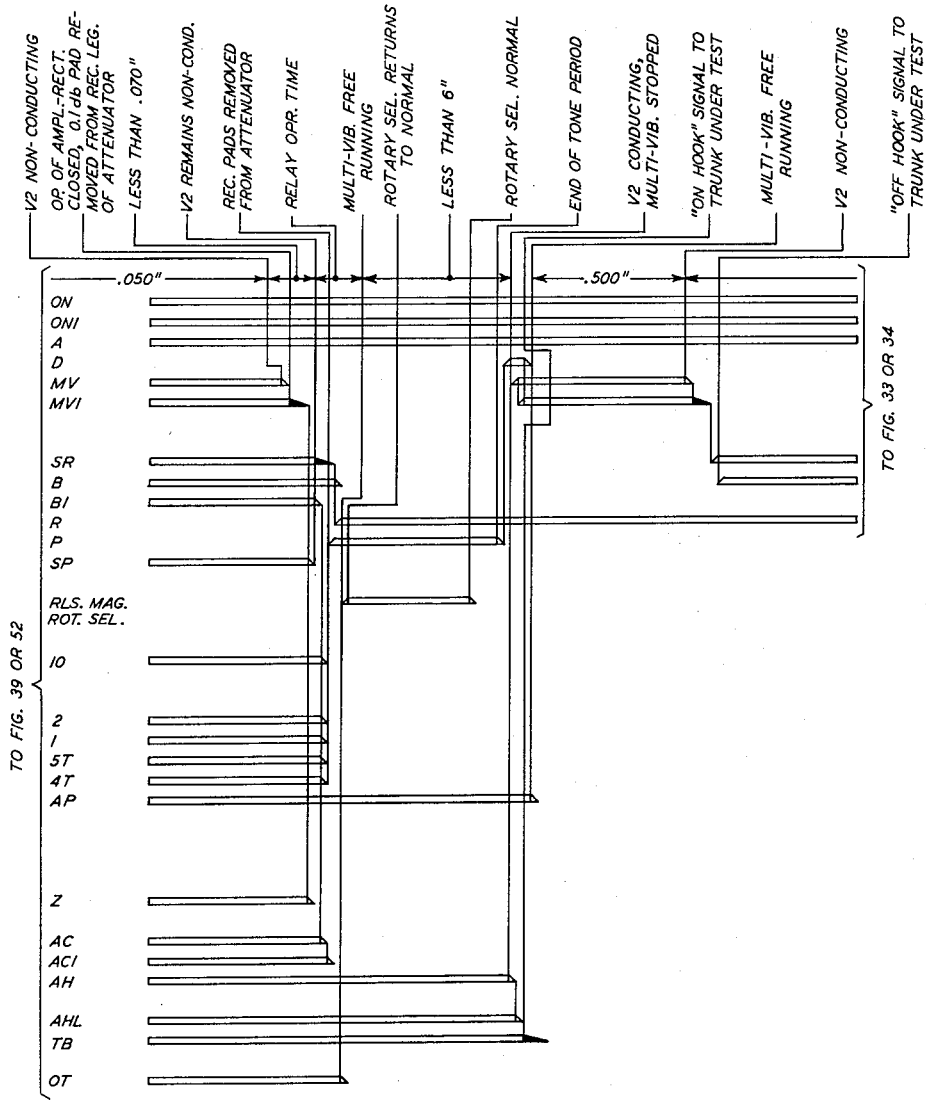

The above condition is indicated in Fig. 57 of the sequence charts. At the end of the 50 millisecond marking period following connection of one milliwatt thousand-cycle tone to the transmitting arm of the attenuator through the Amplifier, through the receiving arm of the Attenuator to the Amplifier-Rectifier Circuit, triode 12–02 becomes non-conducting causing the release of MV relay 7–03. When MV relay 7–03 releases, it closes its contacts 1 and 2, closing the output circuit of the Amplifier-Rectifier 3–21; and it also opens its upper contacts 3 and 4, to ground, releasing MV1 relay 7–04, as previously described.

Because of failure in any one of the following, the one milliwatt, thousand-cycle tone supply circuit, the Amplifier-Rectifier, the Amplifier, relay contacts, Attenuator pad resistors, it may be assumed that the P relay 26–35 does not operate at the time MV 7–03 relay releases.

When MV1 relay 7–04 releases, following the release of MV relay 7–03, the winding of SP relay 14–01 is short-circuited, causing its release, and the energizing circuit of Z relay 23–01 is broken.

SP relay 14–01 released, opens the energizing circuits of relays B1 9–03 and SR 13–01, and blocks the multivibrator comprising tubes 12–01 and 12–02 in the spacing condition. B1 relay 9–03 released, releases all Attenuator pad relays and also, breaking connection between its lower normally open contacts 7 and 8, it opens the energizing circuit of AC relay 17–03, which upon release causes the release of AC1 relay 22–17.

The foregoing circuit paths have all been previously described.

From here on the circuit operation is the same as that described in condition 4.

*Condition 7.*—The P relay in the Amplifier-Rectifier Circuit fails to release when a half decibel pad is added to the receiving arm of the Attenuator.

Figure 56:
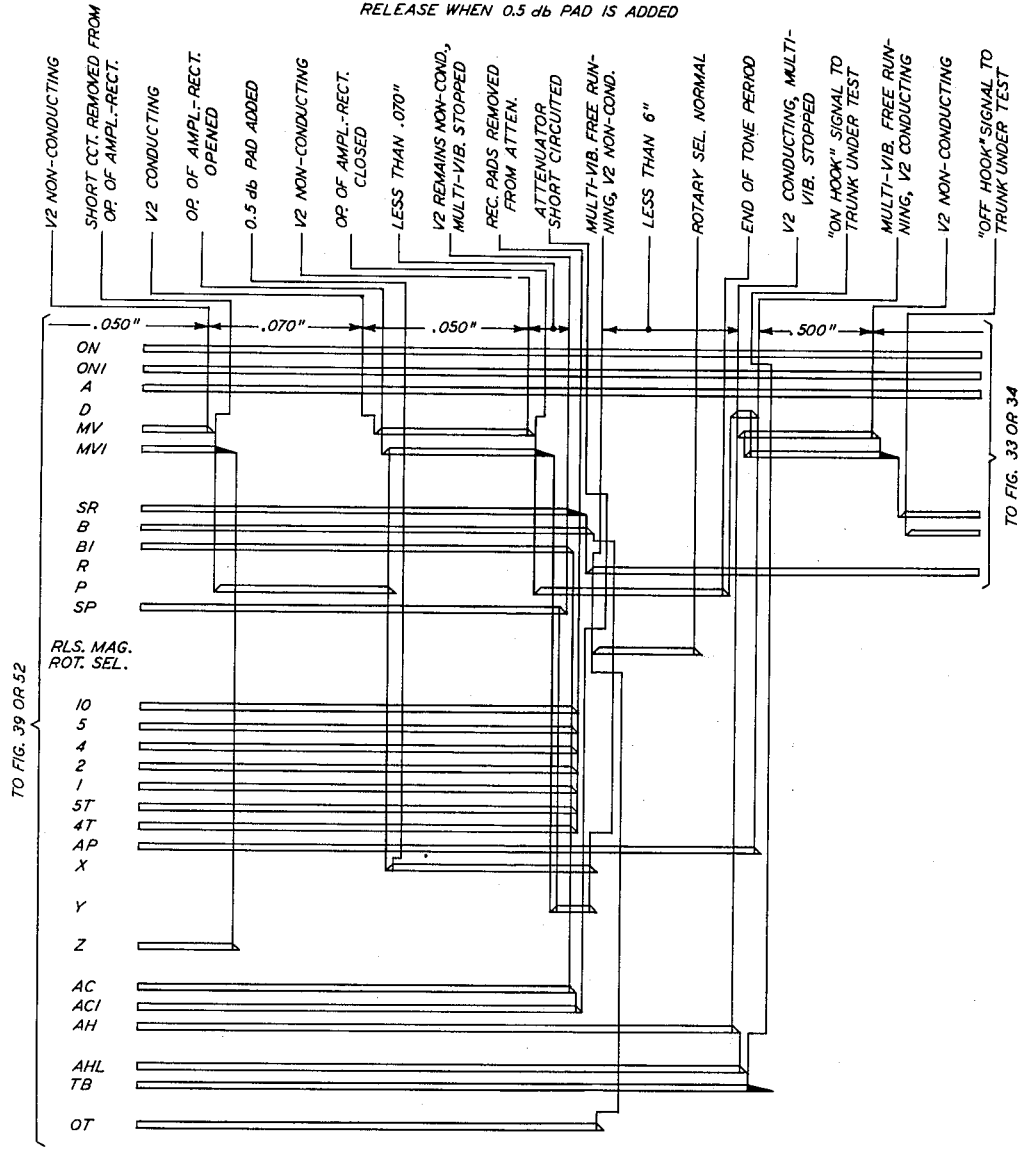

This condition is indicated in Fig. 56 of the Sequence Charts. The circuit operation up to the end of the second marking period has been previously described in condition 5.

The relays in the operated condition during the second marking period as shown in Fig. 56 are as follows:

| | |
|---|---|
| ON 7–01 | MV1 7–04 |
| ON1 7–17 | SR 13–01 |
| A 8–03 | B 23–07 |
| MV 7–03 | B1 9–03 |
| | SP 14–01 |

Attenuator pad relays,

| | |
|---|---|
| AP 8–09 | AH 22–01 |
| AC 17–03 | AHL 18–03 |
| AC1 22–17 | TB 19–01 | and perhaps OT 18–05.

At the end of the marking period tube 12–02 stops conducting, releasing MV relay 7–03, in turn, releasing MV1 relay 7–04. Relay MV 7–03 released, completes a circuit previously described in condition 5 for the operation of P relay 26–35. Under normal circuit conditions P relay 26–35 would not operate at this time, but in this condition it is assumed that P relay 26–35 does operate.

MV1 relay 7–04 released, causes the operation of Y relay 23–03 over a circuit previously described. P relay 26–35 operated, short circuits the winding of SP relay 14–01 through a circuit which includes lower normally open contacts 8 and 9 of AP relay 8–09, normally open contacts 5 and 2 of P relay 26–35, normally open upper contacts 5 and 4 of SR relay 13–01, normally closed upper contacts 2 and 1 of MV1 relay 7–04, normally open upper contacts 9 and 8 of X relay 23–01, normally open upper contacts 2 and 3 of Y relay 23–03, normally open upper contacts 4 and 3 of AC1 relay 22–17, normally open upper contacts 9 and 10 of AH relay 22–01, and normally open lower contacts 11 and 12 of SP relay 14–01.

SP relay 14–01 released, breaks the energizing circuits of B1 relays 9–03 and of SR relay 13–01. B1 relay 9–03 released immediately, releasing all pad relays and AC relay 17–03 which, in turn, causes the release of AC1 relay 22–17. The detailed circuit paths involved have all been previously described in condition 6.

From here on, the circuit operation is the same as described in condition 4.

*One milliwatt, thousand-cycle test tone transmitted for far-near transmission measurement*

*Condition 8.*—Test-board operator at Near-Terminal of trunk under test

Under this condition, which is indicated in Figs. 41, 42 and 44, the following relays are operated:

| | |
|---|---|
| ON 7–07 | SR 13–01 |
| ON1 7–17 | B1 9–03 |
| A 8–03 | P 26–35 | the pad relays,

AP 8–09    AS 17–01
TB 19–01   C 18–01

The OT relay 18–05 may or may not be operated. At this time the multivibrator has stopped in the spacing condition.

Approximately 175 milliseconds following the release of relay AHL 18–03, relay TB 19–01 releases, permitting the multivibrator to start running freely for an initial spacing period of six seconds.

When the thousand-cycle test tone is removed from the Near-Terminal of the test trunk line, the P relay in the Amplifier-Rectifier Circuit 3–21 releases, causing the operation of T relay 20–01 over a path which includes normally open lower contacts 8 and 9 to ground of AP relay 8–09, normally closed contacts 3 and 5 of P relay 26–35, upper normally closed contacts 3 and 4 of MV1 relay 7–04, lower normally closed contacts 9 and 10 of X relay 23–01, upper normally closed contacts 3 and 4 of AH relay 22–01, lower normally open contacts 11 and 12 of AS relay 17–01, and normally closed lower contacts 1 and 3 of T relay 20–01.

This relay, in turn, causes the operation of T1 relay 25–03 by closing its normally open lower grounded contact 8 and 9. Operation of the T relay 20–01 also connects the grid timing resistor 19–11 in parallel with the grid timing resistor 7–15. This operation changes the spacing period of the multivibrator from six seconds to two seconds.

At the end of the spacing period, tube 12–02 again becomes conducting, energizing MV relay 7–03, which upon operation causes the operation of MV1 relay 7–04 by closure of its upper normally open contacts 3–4; and also causes the operation of MV2 relay 25–01 by closing its lower normally open lower contacts 1 and 2 to ground to provide an energizing path for the same which includes the normally open upper contacts 6 and 7 of T relay 20–01, the normally closed upper contacts 5 and 6 of N1 relay 15–03, and the normally closed lower contacts 1 and 3 of TAA relay 25–07.

Operation of the MV2 relay 25–01 causes operation of the SP relay 14–01 by closure of the normally open lower contacts 6 and 7 of the former to provide an energizing path to ground for the latter which passes through the normally closed lower contacts 1 and 3 of the SP relay 14–01, SP relay 14–01 operated, locks itself in this condition under control of ON relay 7–07 in a circuit previously described.

Operation of the SP relay 14–01 also closes its normally open lower contacts 6–7, providing an energizing path to ground for B relay 23–07 which includes the normally open lower contacts 9 and 10 of C relay 18–01, or alternatively, the normally open lower contacts 7 and 8 of AS relay 17–01.

With B relay 23–07, T relay 20–01, and T1 relay 25–03 operated, the windings of relays XA 24–01, YA 24–02, and ZA 24–03 are connected in parallel with the windings of relays X 23–01, Y 23–03, and Z 23–05, respectively. These circuit paths extend from a common energizing source through normally open upper contacts 1 and 2, of T relay 20–01, through normally open lower contacts 5 and 6 of B relay 23–07 to lower contacts 2, 4 and 6 of T1 relay 25–03 and thence through contacts 1, 3, and 5 to the windings of relays ZA 24–03, XA 24–01, and YA 24–02 respectively. The other sides of the windings of these relays are connected to the corresponding sides of the windings of relays Z 23–05, X 23–01 and Y 23–03, respectively.

The multivibrator under this condition is free running, and is in a marking condition under control of the timing resistor 12–21, which provides a period of ten seconds.

The 600 ohm terminating resistance 24–10 is disconnected from the one milliwatt thousand-cycle test tone source 25–09 by the operation of MV2 relay 25–01, disengaging its upper contacts 4 and 5. By this operation the one milliwatt thousand-cycle test tone source 25–09 is connected directly to the Far-Near channel of the connected test circuit through a four-decibel pad 12–18.

During the ten second transmitting period, the test board man at the Near-Terminal of the test trunk line will measure the Far-Near transmission loss.

*Condition 9.*—Automatic test circuit at the Near-Terminal of the test trunk line This condition is indicated in Figs. 43 and 47 of the sequence charts. The operation of this circuit is similar to that described in the previous section, including operation of T relay 20–01 and of T1 relay 25–03. During the two-second spacing period following operation of the T relay 20–01, the automatic test circuit at the Near-Terminal of the connected trunk line connects the One Milliwatt Thousand-Cycle Tone source 25–09 to the test trunk line for a period of approximately 350 milliseconds. When this tone is received by the Far-Terminal, P relay 26–35 is energized, providing an energizing path for the AT relay 19–03 which extends from the potential source 8–24, through normally closed lower contacts 9 and 10 of AP relay 8–09, through contacts 2 and 5 of P relay 26–35, through the normally open upper contacts 5 and 4 of SR relay 13–01, through normally closed upper contacts 1 and 2 of MV1 relay 7–04, through the normally open upper contacts 6 and 7 of T1 relay 25–03, through the normally closed upper contacts 3 and 4 of N1 relay 15–03 and through the normally closed upper contacts 1 and 3 of AT relay 19–03.

Operation of AT relay 19–03 performs the following functions:

(*a*) It closes its lower contacts 1 and 2 partially completing a circuit from grid timing resistance 19–09 to the grid of tube 12–01 in preparation for a 2-second marking period;

(*b*) If OT relay 18–05 is operated, it operates AD relay 14–03 through a path which includes the lower contacts 8 and 9 of OT relay 18–05, and upper contacts 6 and 7 of AT relay 19–03; and (*c*) Through engagement of its lower contacts 10 and 11, it connects the grid of tube 12–02 to the negative potential source 7–24, under control of upper contacts 3 and 4 of D relay 13–05, maintaining the multivibrator in spacing condition.

When the thousand-cycle test tone is disconnected from the Near-Terminal of the trunk under test, the P relay 26–35 in the Amplifier-Rectifier releases, thereby operating the D relay 13–05 over a circuit which includes potential source 8–24, normally closed lower contacts 9 and 10 of AP relay 8–09, contacts 3 and 5 of P relay 26–35, upper contacts 4 and 3 of MV1 relay 7–04, lower contacts 9 and 10 of X relay 23–01, upper contacts 9 and 10 of Y relay 23–03, lower normally open contacts 4 and 3 of AT relay 19–03, and lower normally closed contacts 1 and 2 of TA relay 25–05.

Operation of the D relay 13–05 performs the following operations:

(*a*) It breaks connection between its normally closed upper contacts 3 and 4, disconnecting the negative potential source 7–24 from the grid of tube 12–02;

(*b*) It engages its normally open upper contacts 5 and 6 connecting the negative potential source 7–24 through the upper contacts 5 and 6 of the TM relay 8–05 to the grid of tube 12–01, thereby imposing a bias on that tube and rendering it non-conducting, resulting in the operation of MV relay 7–03;

(*c*) It causes completion of the energizing circuit of SP relay 14–01 over a path from its lower normally open contacts 6 and 5, through normally open upper contacts 12 and 11 at AT relay 19–03, and through the lower normally closed contacts 1 and 3 of SP relay 14–01.

Operation of the MV relay 7–03, as previously described closes its upper contacts 3 and 4 causing the operation of MV1 relay 7–04, and closes its contacts 1 and 2 to ground completing the energizing circuit of the MV2 relay 25–01.

Upon operation, the SP relay 14–01 locks itself up under a circuit which extends from ground through the lower normally open contacts 7 and 8 of the ON relay 7–07, through lower normally open contacts 7 and 8 of T1 relay 25–03, and through its own normally open lower contacts 1 and 2. Operation of the SP relay 14–01 also reconnects the energizing circuit for the B relay 23–07 through the normally open lower contacts 6 and 7 of the former to ground.

With B relay 23–07 and MV1 relay 7–04 operated, the circuits are closed for the operation of X relay 23–01, and XA relay 24–01 through paths previously described.

Operation of MV2 relay 25–01 closing contact pairs lower 4 and 5 and upper 6 and 7 and opening upper contacts 4 and 5 removes the termination 24–10 from across the output of the one Milliwatt Distribution Circuit 25–09, and completes the transmission path over leads 25–13 and 25–15 to 4-decibel pad 12–18. The operation of XA relay 24–01 closing its upper contact pairs 1 and 2, and 12 and 13, and opening its upper contacts 11 and 12, short circuits the input to the Amplifier over a circuit previously described in condition 8.

Operation of the X relay 23–01 breaks connection between its upper contacts 9 and 10, opening the energizing circuit of the D relay 13–05 and permitting the same to release. Release of D relay 13–05, opening its upper contacts 5 and 6, breaks the path from the negative biasing source 7–24 to the grid of tube 12–01, permitting the multivibrator to run freely in the marking condition.

If the AD relay 14–03 is operated it locks itself through its upper normally open contacts 1 and 2 extending its energizing circuit to ground through the upper normally closed contacts 1 and 2 of the TAA relay 25–07 and through the upper normally open contacts 8 and 9 of T1 relay 25–03.

Operation of the AD relay 14–03 closing its lower contacts 3 and 4, connects the grid timing resistor 24–12 in parallel with the grid timing resistor 19–13 to prepare for the next spacing period of the multivibrator.

While the one milliwatt, thousand-cycle tone from the source 25–09 is being transmitted to the Near-Terminal of the trunk under test, the automatic test circuit at the Near-Terminal adjusts the attenuator in the same manner as the attenuator is adjusted in connection with the Far-Near test tone transmission. The test tone from the source 25–09 is kept on the line for an interval of two seconds, which is sufficient to provide time, not only for adjusting the attenuator, but also for making the necessary tests and checks after the attenuator is adjusted. At the end of the marking period tube 12–02 becomes non-conducting, releasing MV relay 7–03 in the manner previously described, which in turn releases MV1 relay 7–04 and MV2 relay 25–01 by respectively breaking connection between its upper contacts 3 and 4 and its lower contacts 1 and 2. MV2 relay 25–01 is designed to be a fast releasing relay so that the test tone is thereby disconnected before the release of MV1 relay 7–04. The release of MV1 relay 7–04 connects its lower normally closed contacts 1 and 3 to ground, reenergizing the circuits of Y relay 23–03 and YA relay 24–02 over paths previously described. In this condition the OT 18–05 and the AD 14–03 relays may or may not be operated, depending on whether Near-Far transmission measurement was in excess of, or less than ten decibels. The multivibrator is now in the spacing condition and is free running.

Figure 49:
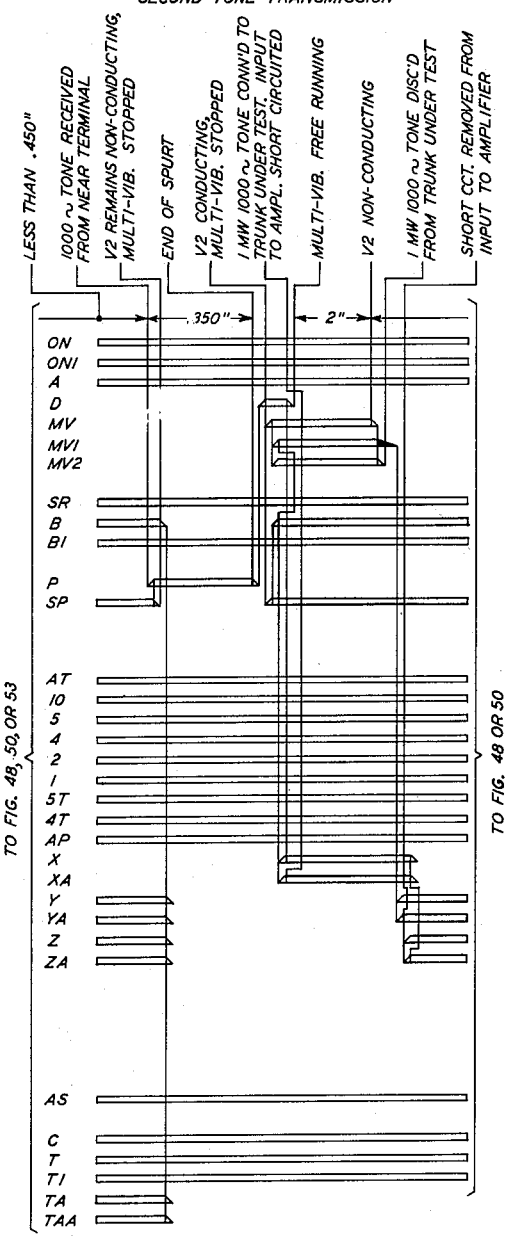

*Condition 10.*—The Near-Terminal signals for a repetition of transmission of the one milliwatt thousand-cycle test tone This condition is indicated in Fig. 49 of sequence charts. If a thousand-cycle test tone spurt of approximately 350 milliseconds' duration is received from the Near-Terminal of the test trunk line during the spacing period following the two second, one milliwatt, thousand-cycle tone transmitted from the Far-Terminal, it is a request for repetition of the previous transmission. Under this condition P relay 26–35 in the Amplifier-Rectifier Circuit 3–21 operates, engaging its contacts 2 and 5 thereby short circuiting energizing circuit of the SP relay 14–01 through a path which includes the normally open upper contacts 4 and 5 of the SR relay 13–01, the normally closed upper contacts 2 and 1 of MV1 relay 7–04, the normally open upper contacts 6 and 7 of the T1 relay 25–03, the upper normally open contacts 4 and 5 of AT relay 19–03, and its own normally open lower contacts 11 and 12. Release of the SP relay 14–01 breaking engagement between its lower contacts 6 and 7 to ground causes the release of B relay 23–07, which in turn breaks the energizing circuits of X relay 23–01, XA relay 24–01, Y relay 23–03 and YA relay 24–02 and Z relay 23–05 and ZA relay 24–03 if operated, releasing the same. In addition, closure of normally closed lower contacts 9 and 10, of SP relay 14–01 connects the negative potential source 7–24 to the grid of tube 12–02 maintaining the multivibrator in its spacing condition.

At the end of the spurt of thousand-cycle test tone from the Near-Terminal of the test trunk line, P relay 26–35 releases, reengaging its normally closed contacts 3 and 5 and thereby causing the operation of D relay 13–05 through an energizing circuit previously described. Operation of the D relay 13–05 removes the negative potential source 7–24 from the grid of tube 12–02 and connects it to the grid of tube 12–01 over the circuit paths previously described, thus permitting tube 12–02 to become conducting, resulting in the operation of the MV relay 7–03. D relay 13–05 operated, also causes the operation of SP relay 14–01 in a circuit described under condition 9.

Operation of the SP relay 14–01 locks itself energized, through a path previously described, under control of ON relay 7–07. Operation of the SP relay 14–01 also causes operation of B relay 23–07. When the relays MV1 7–04 and B 23–07 are operated, the energizing circuits for X and XA relays 23–01 and 24–01, respectively are closed, resulting in the operation of these relays. The energizing circuits of these relays have been previously described.

The Far-Terminal circuit continues to repeat the thousand-cycle test tone transmission as often as such repetition is required from the Near-Terminal equipment.

*One milliwatt, thousand-cycle test tone transmitted through the transmitting arm of the attenuator for passing the Near-Far transmission measurement to the Near-Terminal of the test trunk line*

TEST-BOARD OPERATOR AT THE NEAR-TERMINAL OF THE TEST TRUNK LINE

*Condition 11.*—Near-Far transmission loss 10 decibels or greater

Figure 46:
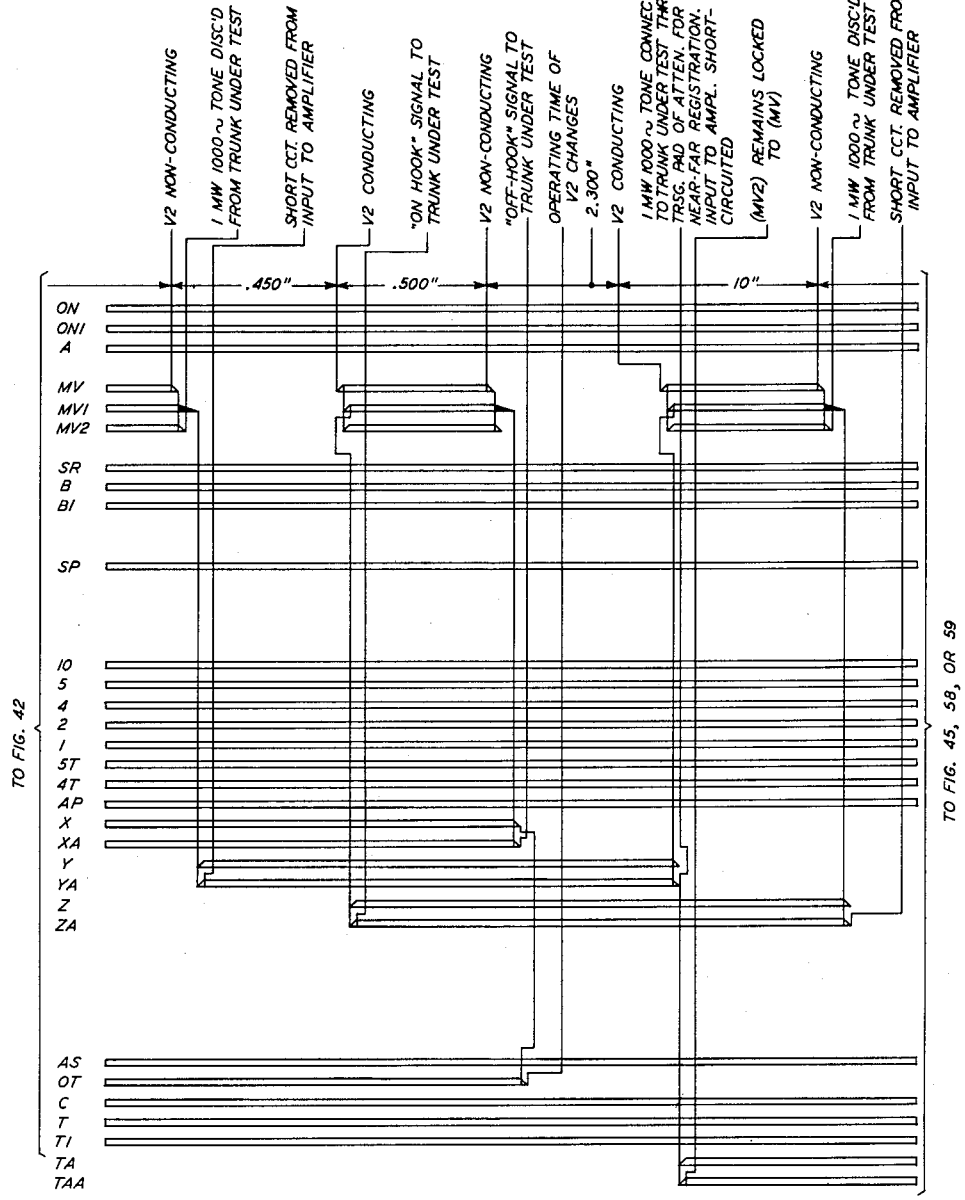

The conditions prevailing during this test are indicated in Fig. 46 of the sequence charts.

At the end of the ten-second marking period, during which the one milliwatt, thousand-cycle test tone is being transmitted from the source 25–09 to the Near-Terminal for the Far-Near channel transmission loss measurement, the tube 12–02 becomes non-conducting, thereby causing the release of MV relay 7–03. As previously described, release of the MV relay 7–03 causes the release of MV1 relay 7–04 and of MV2 relay 25–01. Release of MV1 relay 7–04 completes the energizing circuits previously described for Y and YA relays 23–3 and 24–02. Under this condition, the OT relay 18–05 will be operated. The multivibrator is free running and is in a spacing period.

The operation of the circuit from this point on is substantially the same as that described in the previous section.

At the end of the spacing period which has a duration of approximately 0.450 second, the tube 12-02 becomes conducting, causing the operation of MV relay 7-03. As in the previous operations, MV relay 7-03 operated, causes the operation of MV1 relay 7-04 and of MV2 relay 25-01. Operation of the MV1 relay 7-03 reengages its lower normally open contacts 1 and 2 to ground, causing the operation of Z relay 23-05 and of ZA relay 24-03 over circuit paths previously described. Relays XA 24-01, YA 24-02, and ZA 24-03, operated, disconnect ground from the mid-terminal of retardation coil 12-17, as an "on-hook" signal to the Near-Terminal of trunk under test. This circuit, prior to the operation of ZA relay 24-03, includes normally closed lower contacts 5 and 6 of ZA relay 24-03, normally open upper contacts 1 and 2 of OT relay 18-05, and resistor 12-18. This "on-hook" signal indicates to the Near-Terminal that the next transmission will be made at a transmission level which is ten decibels higher than the normal transmission level.

At the end of the marking period, which is five-tenths of a second, tube 12-02 becomes non-conducting, causing the release, as previously described, of MV relay 7-03, which, in turn, causes the release of MV1 relay 7-04 and of MV2 relay 25-01. Release of MV1 relay 7-04, disengaging its lower contacts 1 and 2, causes the release of X relay 23-01 and XA relay 24-01. At this time the multivibrator continues in a free running condition, and is in a spacing period which has a duration of from two to three seconds.

The release of X relay 23-01 short circuits OT relay 18-05 over a circuit which includes upper contacts 11 and 12 of relay OT 18-05, upper contacts 5 and 4 of T1 relay 25-03, upper contacts 8 and 9 of Y relay 23-03, lower contacts 10 and 9 of X relay 23-01, upper contacts 3 and 4 of MV1 relay 7-04, contacts 3 and 5 of P relay 26-35, and lower contacts 8 and 9 to ground of AP relay 8-09. Release of OT relay 18-05 closes its contacts 1 and 3 reconnecting ground to the retardation coil 12-17, thereby producing a steady off-hook signal to the Near-Terminal of the connected trunk line under test.

At the end of the spacing period, tube 12-02 again becomes conducting, causing the operation of MV relay 7-03, which results in the operation of MV1 relay 7-04, and of MV2 relay 25-01 as previously described. Operation of the MV1 relay 7-04 breaks its normally closed connection to ground through lower contacts 1 and 3, thereby causing the release of Y and YA relays 23-03 and 24-02, the latter in turn causing the operation of TA relay 25-05 and of TAA relay 25-07.

Upon the operation of MV2 relay 25-01, ZA relay 24-03, TA relay 25-05, TAA relay 25-07, and upon the release of YA relay 24-02, the one milliwatt, thousand-cycle tone source 25-09 is connected through the transmitting arm of the Attenuator 3-19, through the four-decibel pad 12-18, to the Far-Near channel connected test trunk line. During this period, the input to the Amplifier circuit 3-17 is short-circuited.

The multivibrator continues to run freely, and is in a ten-second marking period. During this transmission, the test-board operator at the Near-Terminal of the test trunk line is measuring the combined loss of the transmitting arm of the Attenuation 3-19, which represents the Near-Far channel transmission loss, and the Far-Near channel transmission loss. Reception of the momentary "on-hook" signal from the Far-Terminal, informs him that his measured result must be increased by ten decibels to be accurate. This mode of operation serves to avoid test tone levels at the Near-Terminal which may be sufficiently close to the noise levels to cause noise interference with transmission measurements.

At the end of the ten-second marking period, tube 12-02 becomes non-conducting, releasing MV relay 7-03, which upon release, causes the release of MV1 relay 7-04 and of MV2 relay 25-01 in the manner previously described. Upon the release of MV2 relay 25-01, breaking connection between its lower contacts 4 and 5, and upper contacts 6 and 7 and engaging its upper contacts 4 and 5, the one milliwatt, thousand-cycle tone from the source 25-09 is disconnected from the transmitting arm and is terminated with a 600 ohm terminating resistance 24-10. The release of MV1 relay 7-04 disconnects its lower contacts 1 and 2 to ground, releasing Z and ZA relays 23-05 and 24-03, respectively. The multivibrator is running freely and is in a two-tenths second spacing period.

*Condition 12.*—Near-Far transmission loss less than ten decibels

Under this condition, which is indicated in Fig. 44 of the sequence charts, the OT relay 18-05 will be released. At the end of the marking period, during which the one milliwatt, thousand-cycle tone source 25-09 is connected to the Far-Near channel of the connected test trunk line for measurement at the Near-Terminal, the MV relay 7-03 releases, releasing MV1 and MV2 relays 7-04 and 25-01, respectively. The release of MV2 relay 25-01 disconnects its normally open contact pairs, lower 4 and 5, and upper 6 and 7, thereby disconnecting the thousand-cycle tone source 25-09 from the test trunk line. The release of the MV1 relay 7-04 closes its lower contacts 1 and 3, causing the operation of Y and YA relays 23-03 and 24-02, respectively as previously described.

Since the OT relay 18-05 is released, a circuit is closed under control of the operated relays Y 23-03, YA 24-02 and X 23-01 for the operation of Z and ZA relays 23-05 and 24-03 over a path which includes normally open upper contacts 8 and 9 of YA relay 24-02, normally closed lower contacts 3 and 4 of TA relay 25-05, normally closed upper contacts 10 and 9 of OT relay 18-05, and normally open lower contacts 11 and 12 of Y relay 23-03 to the energizing circuits of Z and ZA relays, respectively. Upon the operation of ZA relay 24-03, a locking circuit is opened to X relay 23-01 and XA relay 24-01 through the upper contacts 1 and 2 of the first causing the release of the latter two relays.

The multivibrator is free running and is in a spacing condition for a period of 2 to 3 seconds. At the end of this spacing period, triode 12-02 conducts, causing the operation of MV relay 7-03, in turn causing the operation of MV1 relay 7-04 and MV2 relay 25-01 in the manner previously described. Operation of MV1 relay 7-04, breaking connection between its normally operated lower contacts 1 and 3, causes the release of Y and YA relays 23-03 and 24-02. Operation of ZA relay 24-03 and release of YA relay 24-02 provide an operating circuit for TA and TAA relays 25-05 and 25-07, respectively, which goes to ground through the lower contacts 6 and 5 of ZA relay 24-03 and through upper contacts 9 and 10 of YA relay 24-02. Relays TA and TAA 25-05 and 25-07 lock operated through lower contacts 11 and 12 of the former under control of B relay 23-07, lower normally open contacts 9 and 10.

With MV2 relay 25-01, TA relay 25-05 and TAA relay 25-07 and ZA relay 24-03 operated, the one milliwatt, thousand-cycle tone source 25-09 is connected through the transmitting arm of the Attenuator 3-19, and through the 4-decibel pad 12-18 to the Far-Near channel of the connected test trunk line. Transmission of this signal continues for the duration of the 10-second marking period in which the free running multivibrator is now operating. During this time, the test operator at the Near-Terminal measures the received level of the test tone. This level is reduced from the transmitted level of one milliwatt by the loss of the transmitting arm of Attenuator 3-19 which is a measure of transmission loss over the Near-Far channel, and the Far-Near channel loss.

At the end of the 10-second marking period, tube 12-02 becomes non-conducting releasing the MV relay 7-03, which upon its release, releases the MV2 relay 25–01 and opens the circuit to the MV1 relay 7–04 in the manner previously described. Upon the release of the MV2 relay 25–01, breaking connection between its lower contacts 4 and 5, and its upper contacts 6 and 7, and engaging its upper contacts 4 and 5, the one milliwatt, thousand-cycle tone source 25–09 is disconnected from the transmitting arm of the Attenuator 3–19; and the one milliwatt distributing circuit is terminated in the 600 ohm termination 24–10 as previously described.

Upon the release of MV1 relay 7–04, disconnecting its lower contacts 1 and 2, Z and ZA relays 23–05 and 24–03, respectively, are released. The multivibrator is still running freely and is now in a two-tenths second spacing period.

AUTOMATIC TEST CIRCUIT AT THE NEAR-TERMINAL OF THE TEST TRUNK LINE

*Condition 13.*—Near-Far transmission loss is 10 decibels or greater

This condition is indicated in Fig. 53 of the sequence charts.

Under this condition a two-second pulse of the one milliwatt, thousand-cycle test tone has been transmitted over the Far-Near channel of the connected test trunk line for measurement at the Near-Terminal of the Far-Near channel loss. Since the measurement of the Near-Far channel loss is greater than 10 decibels, the OT relay 18–05 will be operated.

Under this condition the following relays will be operated:

| | |
|---|---|
| ON 7–07 | Y 23–03 |
| ON1 7–17 | YA 24–02 |
| A 8–03 | AT 19–03 |
| SR 13–01 | B 23–07 |
| AD 14–03 | OT 18–05 |
| AS 17–01 | AP 8–09 |
| X 23–01 | B1 9–03 |
| XA 24–01 | T 20–01 |
| SP 14–01 | C 18–01 |
| T1 25–03 | | and the pad relays.

The multivibrator is now running freely, and is in a .450 second spacing period. At the termination of this .450 second spacing period, tube 12–02 conducts, operating MV relay 7–03, which in turn operates MV1 relay 7–04 and MV2 relay 25–01. Operation of MV1 relay 7–04, engaging its lower contacts 1 and 2, causes operation of Z and ZA relays 23–05 and 24–03. Relays XA, YA and ZA 24–01, 24–02 and 24–03, respectively, disengage their respective pairs of contacts upper 9 and 10, lower 1 and 2, and lower 5 and 6, disconnecting ground from the retardation coil 12–17, transmitting an "on-hook" signal to the Near-Terminal of the connected test trunk line. The multivibrator is still running freely, and is in a marking period of three-tenths second.

At the end of this marking period, tube 12–02 becomes non-conducting causing the release of MV relay 7–03, which in turn releases MV1 relay 7–04 and MV2 relay 25–01. Release of the MV1 relay 7–04 breaks connection between its lower contacts 1 and 2 to ground, causing the release of X, XA, and C relays 23–01, 24–01, and 18–01, respectively, which in turn cause the release of OT relay 18–05.

Release of the XA relay 24–01 closing its upper contacts 9 and 10 reconnects ground to the retardation coil 12–17, thereby reestablishing a steady "off-hook" signal. This momentary "on-hook" signal indicates to the Automatic Test Circuit at the Near-Terminal that the level of the last test tone transmission will be ten decibels above what it should be.

The multivibrator is now running freely and is in a two-tenths second spacing period, at the termination of which tube 12–02 again becomes conducting operating the MV relay 7–03, which in turn, operates the MV1 and MV2 relays 7–04 and 25–01. Operation of MV1 relay 7–04, breaking connection to ground between its normally closed lower contacts 1 to 3, causes the release of Y and YA relays 23–03 and 24–02. YA relay 24–02 released, with ZA relay 24–03 operated, provides an operating circuit for TA relay 25–05 and TAA relay 25–07 through a path which includes the upper normally open contacts 5 and 6 of the ZA relay 24–03, and the upper normally closed contacts 9 and 10 of the YA relay 24–02 to ground.

Upon the operation of TA relay 25–05, a circuit is completed to the transmitting arm of Attenuator 3–19, through the normally opened upper contact pairs 11 and 12, and 9 and 10, of the former, whereby the one milliwatt, thousand-cycle test tone source is connected through the transmitting arm of the attenuator and through the 4-decibel attenuation pad 12–18, to the Far-Near channel of the connected test trunk line.

Operation of TAA relay 25–07 breaks connection between its normally closed lower contacts 1 and 3, thereby disconnecting the operating circuit of the MV2 relay 25–01; however, the MV2 relay 25–01 remains operated through a locking circuit which includes its own normally opened contacts 1 and 2, and a path to ground through the upper contacts 5 and 6 of N1 relay 15–03, normally open upper contacts 6 and 7 of T relay 20–01, and the lower contacts 1 and 2 to ground of MV relay 7–03.

The multivibrator is still running freely, and is now in the two-second marking period, during which interval the test circuit at the Near-Terminal is measuring the level of the transmitted tone through the adjustment of a relay controlled attenuator. This is the second attenuator which is adjusted at the Near-Terminal. It is used to measure and record the Near-Far channel transmission loss measured by this circuit in addition to the Far-Near channel transmission loss.

At the end of the marking period tube 12–02 ceases to conduct, releasing MV relay 7–03, which, in turn, releases MV1 relay 7–04 and MV2 relay 25–01. Release of MV2 relay 25–01, breaking connection between its lower contact pairs 4 and 5, and 6 and 7 disconnects the source 25–09 of one milliwatt, thousand-cycle tone from the transmitting arm of the Atttenuator 3–19, and terminates the one milliwatt distributing circuit in the 600 ohm termination 24–10 through the normally closed upper contacts 4 and 5 of the MV2 relay 25–01. The multivibrator is still running freely, and is now in a .450 second spacing period under control of the grid resistors 7–15 and 19–13.

*Condition 14.*—The Near-Far transmission loss less than 10 decibels

Under this condition, OT relay 18–05 will be released following the operations of Y relay 23–03, and YA relay 24–02 at the end of the two-second pulse, indicated in Fig. 47 of the sequence charts. After completion of the first two-second test tone transmission, Z relay 23–05 and ZA relay 24–03 operates, thereby breaking connection between the lower contacts 1 and 2 of ZA relay, and lower contacts 1 and 3 of Z relay, causing the release of X relay 23–01 and XA relay 24–01.

Referring now to Fig. 48, of the sequence charts, the multivibrator is free running, and is in a .45 second spacing condition. The following relays are operated:

| | |
|---|---|
| ON 7–07 | Z 23–05 |
| ON1 7–17 | ZA 24–03 |
| A 8–03 | T 20–01 |
| SR 13–01 | T1 25–03 |
| SP 14–01 | B 23–07 |
| AS 17–01 | B1 9–03 |
| AT 19–03 | C 18–01 |
| Y 23–03 | AP 8–09 |
| YA 24–02 | | and the pad relays.

At the end of the spacing period, tube 12–02 conducts, operating the MV relay 7-03 which, upon operation, causes the operation of MV1 relay 7-04 and MV2 relay 25-01. Upon operation of the MV1 relay 7-04, breaking connection between its lower contacts 1 and 3, to ground, Y and YA relays 23-03 and 24-02 are released. Upon the release of YA relay 24-02, and with ZA relay 24-03 operated, a circuit to ground is provided for the operation of TA relay 25-05 and TAA relay 25-07, which includes the normally open upper contacts 6 and 5 of the ZA relay 24-03, and the normally closed upper contacts 9 and 10 of the YA relay 24-02.

Upon operation of the MV2 relay 25-01, engaging its lower contacts 4 and 5, and its upper contacts 6 and 7, TA relay 25-05 engaging its upper contacts 11 and 12, and 9 and 10, an operating path is provided through leads 25-13 and 25-15 for the one milliwatt, thousand-cycle tone to the transmitting arm of the Attenuator 3-19, and thence through the 4-decibel pad 12-18 to the Far-Near channel of the connected test trunk line. The multivibrator is free running, and in a two-second marking period.

During this transmission period, the automatic test circuit at the Near-Terminal of the test trunk line adjusts a second relay controlled attenuator to measure and record the Near-Far channel transmission measurement made by this circuit in addition to the Far-Near channel transmission loss.

At the end of the marking period, tube 12-02 becomes non-conducting, causing the release of MV relay 7-03 which, in turn, causes the release of MV1 relay 7-04 and MV2 relay 25-01. Upon release of MV2 relay 25-01, disconnecting its lower contacts 4 and 5, and its upper contacts 6 and 7, and connecting its normally closed upper contacts 4 and 5, the one milliwatt thousand-cycle tone source is disconnected from the transmitting arm of the Attenuator 3-19, and terminated in the 600 ohm termination 24-10. The multivibrator is still running freely, and is now in a .450 second spacing period.

Figure 50:
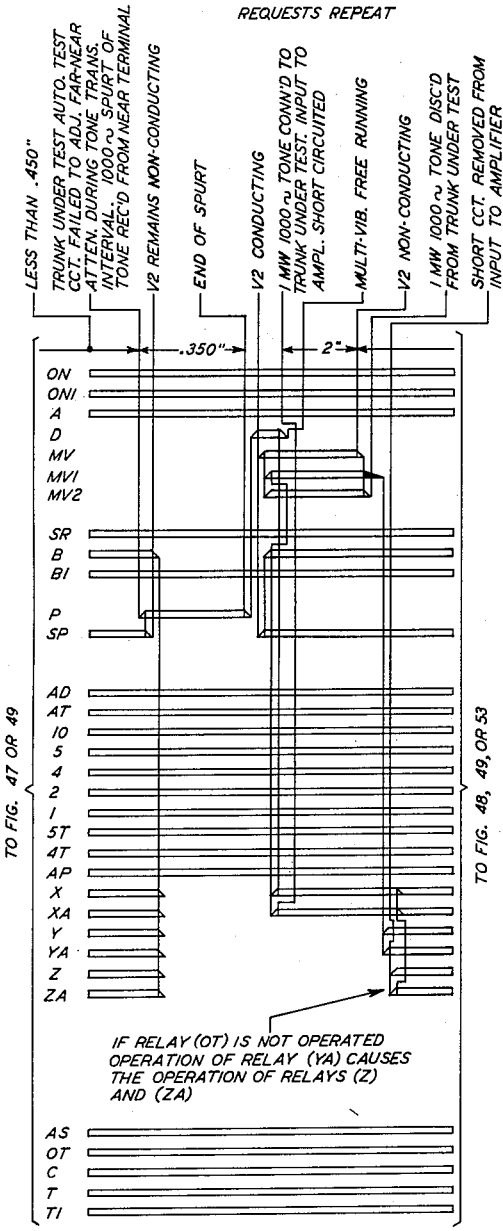
Figure 51A:
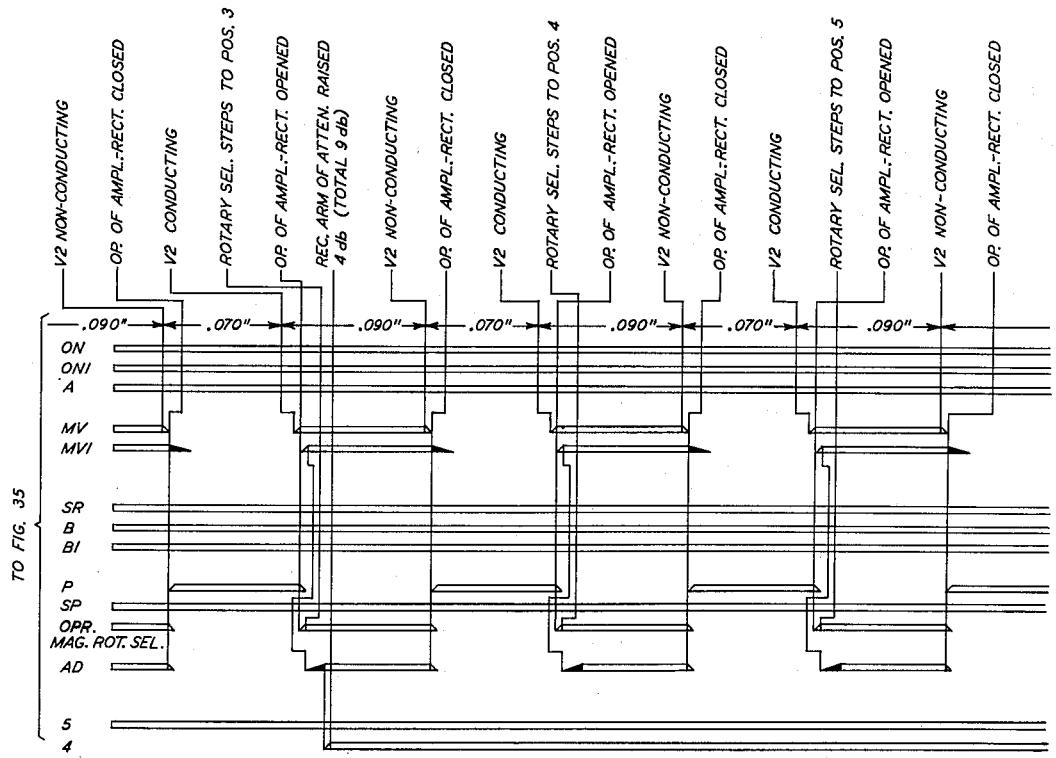
Figure 51B:
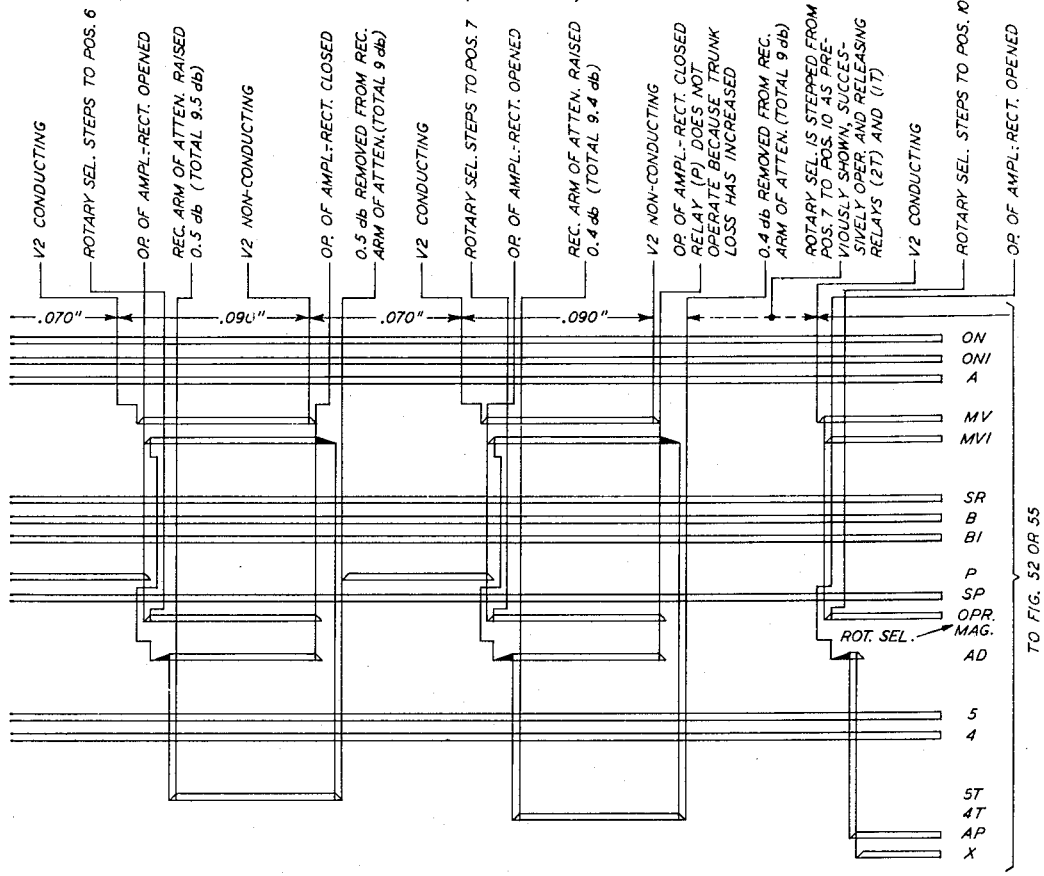

*Condition 15.*—The Near-Terminal signals for repetition—transmission of one milliwatt thousand-cycle test tone This condition is indicated in Fig. 50 of the sequence charts.

In this case, the multivibrator is operating in a .45 second spacing period and is running freely. During this period the automatic test circuit at the Near-Terminal transmits a .350 millisecond pulse of thousand-cycle test tone, indicating that a repetition of both the first and second tone transmission is required. It is essential that both transmissions be made in succession, since the accuracy of the second transmission is dependent on the Far-Near channel having the same transmission loss which it attained when the first transmission measurement was made. Hence, when a request for repetition is received following the second transmission, both the first and second transmissions are repeated.

As soon as the test tone is received from the Near-Terminal, the P relay 26-35 operates, engaging its contacts 2 and 5, and thereby short circuiting the winding of SP relay 14-01 over a circuit which includes upper contacts 4 and 5 of SR relay 13-01, upper contacts 1 and 2 of MV1 relay 7-04, upper normally open contacts 6 and 7 of T1 relay 25-03, upper normally open contacts 4 and 5 of AT relay 19-03, and lower normally open contacts 11 and 12 of SP relay 14-01. Upon the release of the SP relay 14-01, the negative potential source 7-24 is connected to the grid of the tube 12-02, biasing the same negatively and maintaining the multivibrator in a spacing condition. Release of the SP relay 14-01 also breaks connection to ground between its lower contacts 6 and 7, causing the release of B relay 23-07. Release of B relay 23-07 disengages its lower normally open lower contacts 9 and 10, disconnecting the energizing circuit to the TA and TAA relays 25-05 and 25-07. Release of B relay 23-07 also opens the energizing circuits of relays Y 23-03, YA 29-02, Z 23-05, and ZA 24-03, as previously described.

Since the signal indicating that the second transmitted tone should have its level raised by 10 decibels has already been transmitted, assuming it was required, it is unnecessary to repeat this signal. Therefore, the two test tone transmissions will be made in succession with no provision for an intermediate signal.

At the end of the pulse of tone from the Near-Terminal, P relay 26-35 releases, engaging its normally closed contacts 3 and 5, closing the energizing circuit previously described to the D relay 13-05. Operation of the D relay 13-05 disengages its normally closed upper contacts 3 and 4, and closes its normally open upper contacts 5 and 6 causing the negative potential source 7-24 to be disconnected from the grid of tube 12-02, and to be connected to the grid of tube 12-01, in turn, causing tube 12-02 to conduct. Moreover, operation of the D relay 13-05 closes the energizing path previously described through its normally open lower contacts 5 and 6 to the SP relay 14-01, causing the same to operate. Conduction in tube 12-02 causes the operation of MV relay 7-03, which in turn, causes the operations of MV1 relay 7-04 and MV2 relay 25-01.

Upon operation, the SP relay 14-01 locks itself operated through a path which includes its normally open lower contacts 1 and 2, the normally closed upper contacts 1 and 2 of the AS relay 17-01 and the normally opened lower contacts 7 and 8 of the ON relay 7-07. Moreover, operation of SP relay 14-01 closes its normally opened contacts 6 and 7 to ground, reenergizing B relay 23-07.

Upon the operation of MV1 relay 7-04 closing its lower contacts 1 and 2, and of B relay 23-07 closing its upper normally opened contacts 1 and 2, relays X 23-01 and XA 24-01 are operated, the latter closing its upper contact pairs 1 and 2, and 12 and 13, whereby the path from the one milliwatt, thousand-cycle tone source 25-09 is closed through the normally open lower contact pairs 4 and 5, and 6 and 7 of the MV2 relay 25-01 and through the four-decibel pad 12-18 to the Far-Near channel of the connected test trunk circuit. From this point on the functioning of the circuit is similar to that described in the previous sections relating to Conditions 9 and 11.

OBSERVATION OF THE NOISE LEVEL ON THE NEAR-FAR CHANNEL

*Condition 16.*—Satisfactory noise observation

Figure 45:
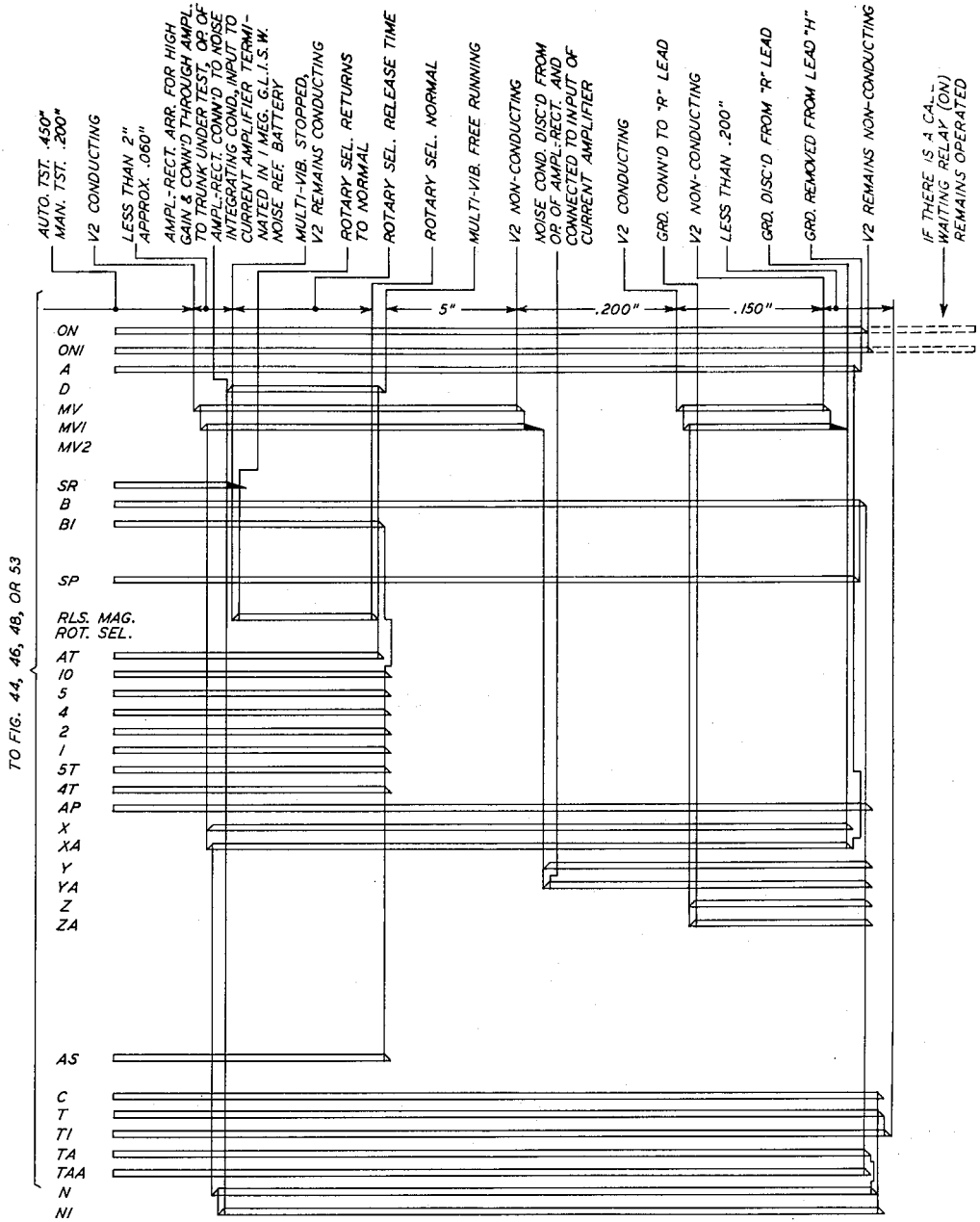

The sequence of the various operations in the performance of the noise test are outlined in Fig. 45 of the sequence charts.

At the beginning of this test, the multivibrator is free running and in a spacing condition. The following relays are operated:

| | |
|---|---|
| ON 7-07 | T1 25-03 |
| ON1 7-17 | TA 25-05 |
| A 8-03 | TAA 25-07 |
| SR 13-01 | B 23-07 |
| SP 14-01 | B1 9-03 |
| AS 17-01 | C 18-01 |
| T 20-01 | AP 8-09 | and the pad relays. AT relay 19-03 may or may not be operated.

At the end of the spacing period, tube 12-02 becomes conducting, operating MV relay 7-03, which in turn causes the operation of MV1 relay 7-04. The latter closes its lower contacts 1 and 2 to ground causing the operation of X relay 23-01, XA relay 24-01, N relay 15-01 and N1 relay 15-03 in sequence. Upon operation of the N1 relay 15-03, D relay 13-05 is operated through a path which includes lower contacts 7 and 8 of the former, and the off-normal contacts 3 and 4 to ground of the rotary selector release magnet 14-05.

Operation of N1 relay 15-03, breaking connection between its upper normally closed contacts 1 and 2 causes the release of SR relay 13–01. In addition, operation of D relay 13–05 connects the negative potential source 7–24 to the grid of tube 12–01 through a path which includes its upper normally opened contacts 5 and 6. This biases tube 12–01 negatively, maintaining conduction in tube 12–02; hence, the multivibrator ceases to run freely, and is held in the marking condition.

The release of the rotary selector magnet 14–09 is under control of the D relay 13–05. This restores the rotary selector 14–09 to normal, upon which occurrence its off-normal selector springs 4 and 3 release, releasing or breaking the energizing path to ground of B1 relay 9–03, AT relay 19–03 and D relay 13–05.

Release of D relay 13–05 breaks connection between its upper contacts 5 and 6, removing the negative potential source 7–24 from the grid of tube 12–01, thereby permitting the multivibrator to run freely in marking condition. Release of B1 relay 9–03 disconnects the energizing circuits causing the release of the pad relays and of AS relay 17–01.

With N1 and N2 and N3 relays 15–03 and 15–01 and 26–16 operated, the Near-Far channel of the connected test trunk line is connected through the Amplifier 3–17 and the Amplifier-Rectifier Circuit 3–21 terminating in the 2½ megohm resistance 26–43 in series through lead 26–47 with the 8 microfarad condenser 26–45 both of which are in the Amplifier-Rectifier Circuit 3–17. The circuit remains in this condition for the duration of the 5-second marking period, during which a potential is built up in the noise condenser 26–45 which will be proportional to the integrated values of voltage on the Near-Far channel during the observation period.

At the time that N1, N2, and N3 relays 15–01 and 15–03 and 26–16 operated, the gain of the fixed gain Amplifier-Rectifier Circuit 3–21 was increased by reducing the amount of negative feedback. This was accomplished upon operation of relay N3 26–16 by disengagement of upper contact pairs 6 and 7, 3 and 4, and 1 and 2, disconnecting the tuned circuit including condenser 26–07 and inductor 26–05, and also the 9,100 ohm resistor 26–10, and connecting in their stead in the circuit resistors 26–08 and 26–14, 200,000 and 100,000 ohms, respectively, and also breaking a short circuit through upper contacts 1 and 2 around the 160,000 ohm resistor 26–29 in the feedback path.

At the end of the marking period tube 12–02 becomes non-conducting, releasing the MV relay 7–03, which, in turn, causes the release of MV1 relay 7–04. Upon release of the latter, engaging its normally closed lower contacts 1 and 3 to ground, Y relay 23–03 and YA relay 24–02 are operated. Upon operation of YA relay 24–02 the noise condenser 26–45 is disconnected from the output of the Amplifier-Rectifier through disengagement of contacts 10 and 11 of the latter and is connected by engagement of contacts 9 and 10 through lead 24–50 to the input of the tube elements 26–33 associated with the receiving P relay 26–01.

The multivibrator is now running freely and is in a 0.2 second spacing period. If the stored potential difference in the noise condenser 26–45 is sufficiently high, when connected through the ungrounded battery 26–36 to the grid of the tube 26–33 which controls P relay 26–35 in Amplifier-Rectifier Circuit 3–21, to cause operation of the sensitive P relay 26–35, the noise level is too high. In the condition under description, we are assuming that the noise level is satisfactory, and that therefore the receiving P relay 26–35 does not operate at this time.

*Condition 17.*—Unsatisfactory noise condition

Figure 58:
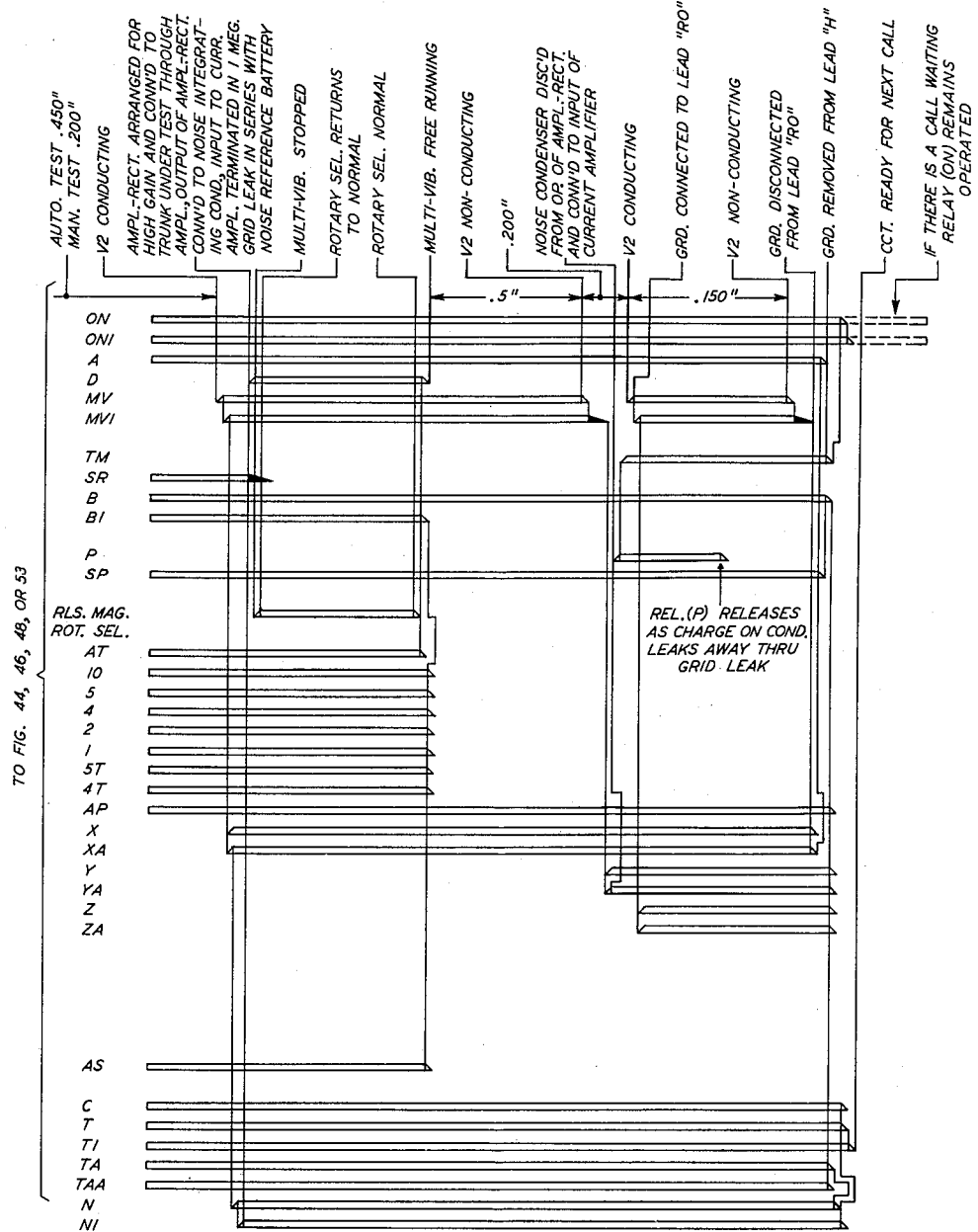

Under this condition, which is indicated in Fig. 58 of the sequence charts, the circuit operation is the same as that described in the previous section up to the operation of the Y relay 23–03, and YA relay 24–02. At this time, the noise condenser 26–45 is connected to the input of tube 26–33 associated with the sensitive P receiving relay 26–01 in the Amplifier-Rectifier Circuit through a path which includes lower contacts 9 and 10 of YA relay 24–02, lead 24–50, and lower contacts 7 and 8 of N3 relay 26–16.

Because of the fact that the stored potential difference is higher than the satisfactory limits, P relay 26–35 operates, causing the operation of the TM relay 8–05 through a path which includes the contacts 2 and 5 of the P relay 26–01 and the lower normally open contacts 6 and 7 of N2 relay 15–01. Operation of the TM relay 8–05 causes this relay to lock operated through a path which includes its own normally opened upper contacts 10 and 11, the normally closed upper contacts 8 and 9 of the AHL relay 18–03, and the normally open lower contacts 4 and 5 of the SP relay 14–01.

DISCONNECTION

*Condition 18.*—Disconnection after satisfactory noise observation

This condition is also indicated in Fig. 45 of the sequence charts.

At the end of the spacing period, tube 12–02 again becomes conducting, operating the MV relay 7–03, and in sequence, MV1 relay 7–04, Z relay 23–05 and ZA relay 24–03. The multivibrator is still running freely and is now in a 150 millisecond marking period. Ground is connected to the Release lead 7–01 through a path which includes normally open lower contacts 1 and 2 of MV1 relay 7–04, normally open lower contacts 3 and 4 of A relay 8–03, normally open upper contacts 8 and 9 of SP relay 14–01, normally open lower contacts 1 and 2 of C relay 18–01, normally open upper contacts 1 and 2 of ZA relay 24–03, normally open upper contacts 7 and 8 of N1 relay 15–03, and normally closed upper contacts 8 and 9 of TM relay 8–05 to the last test line of the "Parking" circuit.

This causes the operation of a release relay in the connected Transmission Test Line Circuit, signaling the Transmission Test Line Circuit to send an "on-hook" signal to the Near-Terminal of the connected test trunk line, and to disconnect itself from the Transmission Measuring and Noise Checking Circuit.

At the end of the marking period, tube 12–02 again becomes non-conducting, releasing MV relay 7–03 and MV1 relay 7–04 in sequence and, in turn releasing X relay 23–01 and XA relay 24–01. Release of XA relay 24–01 short circuits the winding of the SP relay 14–01 through a path which extends through lower contacts 11 and 12 of the latter, through normally open lower contacts 5 and 6 of TA relay 25–05, through normally open upper contacts 1 and 2 of YA relay 24–02, and through the normally open lower contacts 11 and 12 of SP relay 24–01 to ground. This causes the release of XA relay 14–01. Release of XA relay 24–01 also causes the release of A relay 8–03 by disengagement of the lower contacts 10 and 11 of the former.

If a call is waiting, ON relay 7–07 and ON1 relay 7–17 remain operated. SP relay 14–01 released breaks connection between its lower contacts 6 and 7, releasing B relay 23–07 and also B1 relay 9–03. The B relay 9–03, in turn, causes the release of the AP relay 8–09 by disconnection of the upper normally open contacts 7 and 8 of the former. Release of B relay 23–07 causes release of TA and TAA relays 25–05 and 25–07, respectively, by disconnection of its normally open lower contacts 9 and 10. Release of B relay 23–07 also causes the release of Z and ZA relays by disconnection of its upper contacts 5 and 6, and of the Y and YA relays by disconnection of its upper contacts 3 and 4. Upon the release of TA relay 25–05, disengaging its lower contacts 11 and 12, ground is disconnected from the energizing circuit of N2 relay 15–01, which, in turn, breaks connection between its upper contacts 7 and 8 to ground, deenergizing the N1 relay 15–03. N2 relay 15–01 released, breaks connection between its lower contacts 4 and 5, releasing T relay 20–01, and C relay 18–01. Release of T relay 20–01, breaking connection between its lower contacts 8 and 9 to ground, releases T1 relay 25–03.

The circuit is now in its released condition.

*Condition 19.*—Disconnection after unsatisfactory noise observation. Sequence Chart Fig. 58

At the end of the 0.2-second spacing period, tube 12–02 becomes conducting, causing the operation of MV relay 7–03 which, in turn, causes the operation of MV1 relay 7–04 to engage its normally open lower contacts 1 and 2, which in turn causes the operation of Z and ZA relay 24–03 and 33–05 respectively. Inasmuch as TM relay 8–05 is operated, ground is now connected to the "reorder" lead 7–05, which is connected to the Transmission Test Line Circuit through either of two alternative paths, first of which passes through lower contacts 6 and 7 of TM relay 8–05 and lower contacts 1 and 2 of MV relay 7–03, and the second of which passes through upper contacts 7 and 8 of TM relay 8–05, and lead 7–01, which terminates under control of lower contacts 1 and 2 of MV1 relay 7–04.

The multivibrator is continuing to run freely and is in a 150 millisecond marking period. Connection of ground to the "reorder" lead 7–05 causes the operation of the reorder signal and release relays RO and TR in the connected Transmission Test Line Circuit.

Operation of the reorder and release relays disconnects the Transmission Test Line from the Transmission Measuring and Noise Checking Circuit 3–11, and causes transmission of a reorder flash to the Near-Terminal through the connected trunk circuit under test as an indication that the Near-Terminal should disconnect; and it also indicates that the noise level on the Near-Far channel of the connected test trunk line is unsatisfactory.

At the end of the 150 millisecond marking period, tube 12–02 becomes non-conducting, releasing MV relay 7–03, and subsequently, MV1 relay 7–04, X relay 23–01 and XA relay 24–01 in sequence in the manner previously described.

Release of the XA relay 24–01 short-circuits the windings of the SP relay 14–01 through a path which includes the normally open lower contacts 11 and 12 of the SP relay 14–01, the normally open lower contacts 5 and 6 of the TA relay 25–05, the normally open upper contacts 1 and 2 of the YA relay 24–01, and the normally closed lower contacts 11 and 12 to ground of the XA relay 24–01. Release of the XA relay 24–01 also releases the A relay 8–03 by the same operation, breaking the connection between its lower contacts 10 and 11 to ground.

SP relay 14–01 released, releases B relay 23–07 by breaking a circuit previously described, and breaks the locking circuit of TM relay 8–05 by disengaging its lower contacts 4 and 5. Release of the B relay 23–07 performs the following operations:

(*a*) It breaks connection between its normally open upper contacts 7 and 8 to the energizing circuit of the AP relay 8–09 releasing the same;

(*b*) It breaks connection between its normally open lower contacts 9 and 10 breaking the energizing circuits of the TA relay 25–05, and of the TAA relay 25–07 causing the release of these relays; and (*c*) It breaks the energizing circuits to the Z relay 23–05, the ZA relay 24–03, the Y relay 23–03, and the YA relay 24–02 by disengaging the contact combinations upper 5 and 6, and upper 3 and 4, respectively, releasing these relays.

Upon the release of TM relay 8–05, a locking circuit is opened to ON relay 7–07 by disconnection of the lower grounded contacts 9 and 10 of the former relay. In case there is no other call waiting, ON relays 7–07 and ON1 relay 7–17 release in sequence at this time.

Upon the release of TA relay 25–05, N2 relay 15–01 is released by disconnection of the grounded lower contacts 11 and 12 of the former to the energizing circuit of the latter. Release of the N2 relay 15–01 performs the following operations:

(*a*) It releases the C relay 18–01 by breaking connection between its normally open lower contacts 4 and 5, breaking the energizing circuit of the C relay 18–01;

(*b*) It causes the release of the T relay 20–01 by the same operation; and (*c*) It causes the release of N1 relay 15–03 by breaking connection between its upper contacts 7 and 8 to ground.

Upon the release of T relay 20–01, T1 relay 25–03 is released by disconnection of the lower normally open contacts 8 and 9 of the former. The circuit is now in its normal condition. If the ON relay 7–07 is still operated indicating that there is another call waiting, the operation of the circuit will be the same as that described in the Section on Call Waiting and Seizure.

*Call abandoned*

Figure 59:
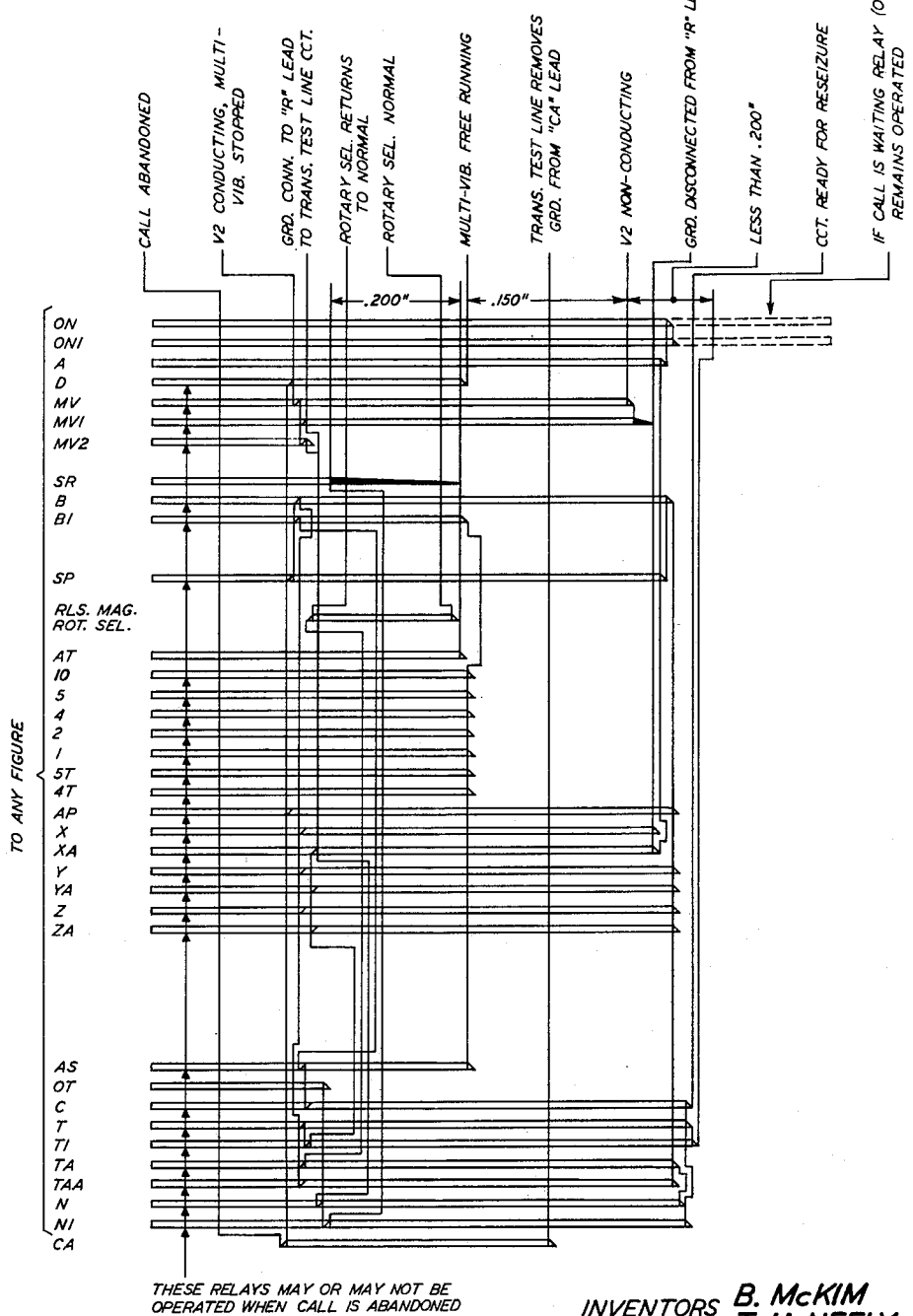

This condition is indicated in Fig. 59 of the sequence charts.

A test call may be abandoned at any time after seizure. When a call is abandoned, the following relays will be operated:

| | |
|---|---|
| ON relay 7–07 | A relay 8–03 |
| ON1 relay 7–17 | SR relay 13–01 |
| B relay 23–07 | |

All the other relays in the circuit may or may not be operated.

The connected transmission test line connects ground to the "call abandoned" lead 4–34, operating CA relay 16–01, upon the operation of which the following functions are performed:

(*a*) The SP relay 14–01 is operated through a circuit which includes upper contacts 9 and 10 of CA relay 16–01, upper contacts 8 and 9 of SR relay 13–01, and lower contacts 1 and 2 to ground of ON relay 7–07; and (*b*) The D relay 13–05 is operated through a circuit which includes lower contacts 6 and 7 of SR relay 13–01, and lower contacts 5 and 6 of CA relay 16–01.

With SP relay 14–01 operated, circuits are closed for the operation of relays B 23–07 and B1 9–03, if not already operated, in circuits which include lower contacts 6 and 7 of SP relay 14–01.

Relays CA 16–01, B 23–07, and B1 9–03, operated provide an energizing circuit for each of the following:

(*a*) For relay AP 8–09 which includes upper contacts 7 and 8 of B relay 23–07 and left contacts 7 and 8 of CA relay 16–01;

(*b*) For X relay 23–01 which includes upper 1 and 2 contacts of B relay 23–07 and right contacts 3 and 4 of CA relay 16–01;

(*c*) For Y relay 23–03 which includes upper 3 and 4 contacts of B relay 23–07 and right contacts 5 and 6 of CA relay 16–01;

(*d*) For Z relay 23–05 which includes upper 5 and 6 contacts of B relay 23–07 and right contacts 7 and 8 of CA relay 16–01;

(*e*) For relays TA and TAA 25–05 and 25–07 which include lower 9 and 10 contacts of B relay 23–07 and left contacts 1 and 2 and 9 and 10 of CA relay 16–01;

(*f*) For AS relay 17–01 which includes lower contacts 5 and 6 of B1 relay 9–03, and right contacts 1 and 2 of CA relay 16–01; and (*g*) For T relay 20–01 which includes left contacts 3 and 4 of CA relay 16–01 and lower contacts 1 and 2 of B relay 23–07.

These operations occur, of course, assuming that the relays mentioned are not already operated.

The operation of T relay 20–01 causes the operation of T1 relay 25–03 which, in turn, causes the operation of relays XA 24–01, YA 24–02, and ZA 24–03 through circuit paths which have been previously described.

SP relay 14–01 locks itself operated in the manner previously explained. Operation of the D relay 13–05 closes its normally open contacts 5 and 6, connecting a negative potential from the source 7–24 to the grid of tube 12–01, biasing the latter negatively, and accordingly rendering tube 12–02 conducting if it is not already in that condition, resulting in the operation of MV relay 7–03, MV1 relay 7–04, and MV2 relay 25–01 in sequence as previously described.

Operation of the XA relay 24–01 engaging its upper normally open contacts 6 and 7 energizes the N2 relay 15–01, which in turn connects its grounded upper contacts 7 and 8, energizing the N1 relay 15–03.

Upon operation, the N2 relay 15–01 locks operated over a path which includes the lower grounded contacts 11 and 12 of the TA relay 25–05 and its own upper normally open contacts 9 and 10. N1 relay 15–03 operated, opens the operating path for the MV2 relay 25–01 by breaking connection between its normally closed upper contacts 5 and 6. By opening its upper contacts 1 and 2, N1 relay 15–03 also breaks the energizing circuit of SR relay 13–01.

The operation of the TA relay 25–05 closes a circuit to the release magnet 14–05, of the rotary selector, through a path which includes lower contacts 3 and 4 to ground of D relay 13–05 lower contacts 7 and 8 of TA relay 24–05 and off-normal contacts 1 and 2 of the selector release magnet 14–05. This operation restores rotary selector 14–09 to normal.

After rotary selector 14–09 returns to normal, and after SR relay 13–01 releases, relays B 19–03, D 13–05, and AT 19–03, if it is operated, release by the disengagement of contacts 3 and 4 of the rotary selector "off-normal" release magnet 14–05, and by the opening of lower contacts 6 and 7 of SR relay 13–01.

B1 relay 9–03 released, releases all operated pad relays and AS relay 17–01, by breaking energizing circuits which have been previously described.

The release of D relay 13–05, breaking connection between its upper contacts 5 and 6, removes the negative potential source 7–24 from the grid of tube 12–01, thereby permitting the multivibrator to run freely in a marking period of 15-hundredths of a second. At the end of the marking period, tube 12–02 ceases to conduct, releasing MV relay 7–03. From this point on the operation of the circuit is the same as that described in the section relating to disconnection after satisfactory noise observation.

It should be understood that the present invention is not specifically limited to the details of the disclosed system, which is described herein by way of illustration, but may take other forms, within the scope of the appended claims, which will be apparent to those skilled in the art.

What is claimed is:

1. A system for measuring loss in a two-way electrical transmission channel interconnecting two terminal stations which comprises at a first one of said stations: a first source of test tone of a predetermined fixed strength, a first current measuring device for measuring the strength of an incoming test tone, and switching means for connecting said first source or said measuring device to said channel alternatively; at the second one of said stations: a circuit connected to said transmission channel for receiving tone from said first source, said circuit including a variable receiving attenuator system, a second current measuring device connected to the output of said attenuator system, a switching mechanism, means comprising a relay system differently responsive to current measured by said second current measuring device above or below a predetermined reference value to actuate said switching mechanism to control said variable receiving attenuator system to add or subtract attenuation in said tone receiving circuit until the current in said second current measuring device falls within a given reference range embracing said reference value, a tone transmitting circuit connected to said transmission channel comprising a second source of test tone of predetermined fixed strength, a variable transmitting attenuator system connected to said second source, and relay means connected between corresponding units of said variable receiving attenuator system and said variable transmitting attenuator system for introducing an attenuation in said tone transmitting circuit through said transmitting attenuator system which is correlated with the attenuation introduced into said tone receiving circuit through said receiving attenuator system.

2. A system in accordance with claim 1 wherein said relay means connected between corresponding units of said variable receiving attenuator system and said variable transmitting attenuator system varies the attenuation of said transmitting attenuator in accordance with the attenuation of said receiving attenuator to maintain the sum of said attenuations constant.

3. A system in accordance with claim 1 in which said attenuator comprises a series of pads in ordered denominational steps corresponding to certain operational steps of said switching mechanism, said second current measuring means comprises an amplifier-detector unit, and said switching mechanism comprises a multivibrator connected through relay means for alternately operating and releasing said amplifier detector unit, for controlling the connection and release of the pads of said attenuator systems.

4. A system in accordance with claim 3 comprising a plurality of different biasing circuits connectable to said multivibrator at respectively different steps of said switching system, wherein the period of operation of said multivibrator is controlled by operation of said relay means under control of said multivibrator to alternatively connect different ones of said biasing circuits, thereby changing the period of said multivibrator at different steps of said switching mechanism.

5. A system in accordance with claim 4 which includes means for checking the accuracy of the setting for said receiving attenuator system against the received level of test tone from said first source at said first station, said means comprising an auxiliary attenuator pad of a given fixed value, means for connecting said auxiliary pad in series with said receiving attenuator system to the input of said amplifier-rectifier, and relay means differently responsive to output currents from said amplifier-rectifier above or below a certain fixed level to perform respectively different operations.

6. A system in accordance with claim 5 including a fixed gain amplifier, wherein the sum of the attenuations through said transmitting and receiving attenuators is substantially equal to the gain of said fixed gain amplifier and means for checking the accuracy of the setting of said attenuator includes relay means for connecting said variable transmitting and receiving attenuator systems in "horseshoe connection" in series with said tone-transmitting circuit, said fixed gain amplifier, and said second current measuring device at said second terminal, and means for checking the output of said current measuring device against a fixed reference value in said "horseshoe" connection.

7. In combination with a system for electrical signal transmission comprising in combination, a pair of terminal stations, and message transmitting and receiving equipment at each said terminal station separated from the other of said terminal stations by oppositely directed channels of different electrical characteristics, a testing circuit for performing a series of tests requiring respectively different time intervals in said system, said testing circuit comprising at each said terminal station a source of tone connectable to said respective channels; at the first said terminal station: means for receiving and measuring tone from the second said terminal station; at said second terminal station: a circuit for receiving and measuring the tone from the first said terminal station comprising a multivibrator control circuit, a stepping selector connected in driven relation to said multivibrator circuit, an adjustable receiving attenuator, a detector responsive to the strength of tone received at said second terminal station from said first terminal station to initiate operation of said multivibrator and said stepping selector to adjust the attenuation in said receiving attenuator until response in said detector falls within a given reference range of values, and means for regulating the strength of the transmitted tone from the second said terminal station in accordance with the strength of the tone received from the first said terminal station comprising a transmitting attenuator connectable in the path of said source of tone at said second terminal station and means for varying the attenuation in said transmitting attenuator to correlate with the attenuation of said receiving attenuator.

8. A testing circuit in accordance with claim 7 which includes circuit means under control of said multivibrator for changing the operational bias on said multivibrator at different successive operations of said multivibrator.

9. A testing circuit in accordance with claim 8 in which said last named circuit means comprises at least three relays each having a single-winding energizing circuit under control of a different one of the others of said relays, said circuit constructed and arranged in response to each of three successive operations of said multivibrator to energize each of said relays in successive rotation, and in response to each of three additional operations of said multivibrator, to deenergize each of said relays in successive rotation.

10. In combination with a system for electrical signal transmission comprising a pair of terminal stations, and message transmitting and receiving equipment at each said terminal station separated from the other said terminal station by oppositely directed channels of different electrical characteristics, a testing circuit for performing a series of tests requiring respectively different time intervals, said test circuit comprising at each said terminal station a tone transmitting circuit connectable to said respective channels; at the first said terminal station a circuit for receiving and measuring tone from the second said terminal station, at the second said terminal station a circuit for receiving and measuring the tone from the first said station and for regulating the strength of the tone from the second said terminal station in accordance with the strength of the tone received from the first said terminal station, said circuit comprising in combination a fixed gain amplifier for receiving said tone, a multivibrator circuit connected to operate under control of the output from said amplifier, a stepping selector connected in driven relation to said multivibrator circuit, receiving and transmitting attenuators each comprising a plurality of denominational pads of corresponding values and each attenuator having a maximum value of attenuation including all of said pads which approximates the gain of said amplifier, the receiving attenuator normally disconnected from the tone receiving circuit and the transmitting attenuator normally connected in the tone transmitting circuit, associated relays under control of said multivibrator and said stepping selector for inserting a given pad in the receiving circuit at said second terminal station and for removing a pad of corresponding denomination from the transmitting circuit of said terminal, and a detector responsive to the strength of the tone received at said second terminal station to initiate operation of said multivibrator and said stepping selector for adjusting said attenuator circuits until the response in said detector falls at least as low as a fixed reference value.

11. In combination with a system for electrical signal transmission comprising in combination a pair of terminal stations, and transmitting and receiving equipment at each said terminal station separated from the other of said terminal stations by oppositely directed channels of different electrical characteristics, a testing circuit for performing line loss tests including at each said terminal station, a source of tone, at the first said terminal station a circuit for receiving and measuring tone from the second said terminal station, at the second said terminal station a circuit for receiving and measuring the tone from the first said station and for regulating the strength of the tone from the second said terminal station in accordance with the strength of the tone received from the first said terminal station, said circuit comprising in combination a fixed gain amplifier for receiving said tone, a multivibrator circuit connected to operate under control of the output of said amplifier, a stepping selector connected in driven relation to said multivibrator circuit, transmitting and receiving attenuators comprising a plurality of denominational pads of corresponding values and each having a maximum value of attenuation which approximates the gain of said amplifier, the receiving attenuator normally disconnected from the tone receiving circuit and the transmitting attenuator normally connected into the tone transmitting circuit, associated relays all under control of said multivibrator and said stepping selector for inserting a given pad in the receiving circuit at said second terminal station and for removing a pad of corresponding denomination from the transmitting circuit of said terminal, at least one auxiliary attenuation pad having a denomination which is small in comparison to the summation of said transmitting and receiving attenuation pads, and relay means associated with said pad under control of said multivibrator for inserting and removing said auxiliary pad in circuit connection with said receiving pads for checking circuits including such pads and a detector responsive to the strength of the tone received at said second terminal station to initiate operation of said multivibrator and said stepping selector for adjusting said attenuator circuits until the response in said detector falls at least as low as a fixed reference value.

12. A timing circuit for controlling a series of operations of respectively different lengths, said circuit comprising a multivibrator including a pair of electron discharge devices each having an anode, a cathode, and a control electrode, a charge-storing circuit, the anode of one said device being connected to the control electrode of the other of said devices through said charge-storing circuit, a sequence switch operative through a plurality of steps in response to current derived over a path which includes one of said discharge devices, a system of relays operative under control of said sequence switch and said multivibrator and including a plurality of biasing circuits differently connected through the relays of said system to said charge-storing circuit at different steps of said multivibrator for changing the time-constant of said charge-storing circuit for free-running operation of said multivibrator, whereby said multivibrator operates to sequentially change the length of its period of operation under its own control.

13. A timing circuit in accordance with claim 12 in which said system comprising an interacting group of relays, each having a single energizing winding under control of the said multivibrator circuit and the other relays of said group such that a first series of operations of said multivibrator circuit energizes each of the relays of said group in succession and a second series of operations of said multivibrator circuit deenergizes each of the relays of said group in succession.

14. In combination with a system for electrical signal transmission comprising in combination a pair of terminal stations and message transmitting and receiving equipment at each said terminal station separated from the other of said terminal stations by oppositely directed channels of different electrical characteristics, a testing circuit for performing a series of tests of respectively different durations, said testing circuit including at each said terminal station a source of tone, at the first said terminal station a circuit for receiving and measuring tone from the second said terminal station, at the second said terminal station a circuit for receiving and measuring the tone from the first said terminal station, and inserting loss in the path of said tone at said second terminal, said means comprising in combination a current detecting circuit connected to receive said tone, a multivibrator circuit connected to have its operation initiated by the received tone, a stepping selector connected to operate under control of output pulses from said multivibrator circuit, transmitting and receiving attenuators comprising a plurality of denominational pads of corresponding values and associated relays all under control of said multivibrator and said stepping selector for actuating said pads to remove attenuation from the transmitting circuit at said second terminal station and for inserting attenuation in the receiving circuit at said terminal whenever the current in said detecting circuit exceeds a reference value, a sequence timing circuit for controlling the timing of the operations under control of said multivibrator, said timing circuit comprising a group of at least three relays each having its energizing winding under control of the other relays of said group and the operation of said multivibrator, such that a first series of operations of said multivibrator energizes each of the relays of said group in succession and a second series of operations of said multivibrator deenergizes each of the relays of said group in succession, and a plurality of biasing circuits arranged for connection to said multivibrator under control of the relays of said group for changing the period of operation of said multivibrator through a succession of operations thereof.

15. In a system of the kind described including a source of tone, tone receiving means, an adjustable attenuator comprising a plurality of pads, a pad switching mechanism, a detector circuit connectable to said tone receiving means in series with said attenuator, wherein said pad switching mechanism comprises relays constructed and arranged to operate after a given interval for the adjustment of the said attenuator to a desired combination of pads until the output energy from said detector circuit is within a fixed range of reference values, and a circuit operative at the termination of said attenuator adjustment for rechecking said adjustment, said circuit comprising relay means responsive to the output current in said detector circuit if said output is below said reference range to add a fixed value of attenuation in series with said adjusted attenuator, and relay means responsive to the output current in said detector circuit if said output is above said reference value to subtract a fixed value of attenuation in series with said adjusted attenuator, and means constructed and arranged to give a trouble indication if said output current is still below said reference range upon addition of said fixed attenuation or if said output current is still above said reference range upon subtraction of said fixed attenuation.

16. In a system of the kind described including a source of tone, tone receiving means, an adjustable attenuator comprising a plurality of pads, a pad switching mechanism, a detector circuit connectable to said tone receiving means in series with said attenuator, said pad switching mechanism comprising in combination a multivibrator connected for free-running operation, a stepping selector connected to operate under control of output pulses from said multivibrator, circuit means at each step of said stepping selector to add or to remove a respective one of the pads of said attenuator under control of said multivibrator, means responsive in accordance with the magnitude and polarity of the difference between the output energy in said detector and a fixed reference value after a given pad has been added to determine whether said pads should be retained in the circuit, and means responsive when the output energy in said detector substantially reaches said reference value for terminating the addition or subtraction of said pads and maintaining the setting of said attenuator.

17. A system in accordance with claim 16 which includes means for controlling a series of tests on the setting of said attenuator, said means comprising a plurality of biasing circuits arranged for connection to said multivibrator, a plurality of relays operative in different combinations at successive steps of said multivibrator for connecting said biasing circuits to said multivibrator, thereby changing the period of said multivibrator under its own control.

18. A system in accordance with claim 17 in which said means for controlling a series of tests includes circuit means operative at successive steps of said multivibrator following the adjustment of said attenuator for adding or for subtracting a fixed value of attenuation from said attenuator setting depending on whether said output energy is below or above said fixed reference value, and means operative after said addition or subtraction for indicating whether said output energy is still above or below said fixed value.

19. A timing circuit comprising in combination a multivibrator including a pair of electron discharge devices each having an anode, a cathode, and a control electrode, a charge-storing circuit, the anode of one said device being connected to the control electrode of the other of said devices through said charge-storing circuit, a plurality of different biasing circuits, relay means operative in response to current derived over a path which includes one of said discharge devices to connect different ones of said biasing circuits at different steps in the cycle of said multivibrator.

20. A system for measuring loss in a two-way electrical transmission channel interconnecting two terminal stations which comprises at a first one of said stations: a first source of test tone of a predetermined fixed strength, a first current measuring device for measuring the strength of an incoming test tone, and switching means for connecting said first source or said measuring device to said channel alternatively; at the second one of said stations: a circuit connected to said transmission channel for receiving tone from said first source, said circuit including a multi-pad receiving attenuator, a first attenuator pad-switching means responsive to the output current of said attenuator to adjust said output current to a predetermined reference value, a tone transmitting circuit connected to said transmission channel comprising a second source of test tone of predetermined fixed strength and a multi-pad transmitting attenuator interposed between said second source and said transmission channel, and a second attenuator pad-switching means controlled by said first pad-switching means to adjust the attenuation of said transmitting attenuator oppositely to the attenuation adjustment of said receiver attenuator.

21. A system in accordance with claim 20 in which said second pad-switching means comprises means to adjust the attenuation of said transmitting attenuator equally and oppositely to the attenuation adjustment of said receiver attenuator whereby the sum of the attenuations of said receiving and transmitting attenuators is maintained substantially constant.

22. A system in accordance with claim 21 in which said tone receiving circuit includes amplifying means and in which the difference between the levels of said first-mentioned test tone at said first station and said reference value is equal to the difference between the gain of said amplifying means and said sum of attenuations.

23. A system in accordance with claim 20 including comparison means in said tone receiving circuit differently responsive as the output current level is above or below said reference level, a multivibrator, means controlled by said multivibrator and including said first attenuator pad-switching means for inserting or removing pads of progressively smaller attenuation values selectively according to the response of said comparison means, and means controlled by said multivibrator for enabling said comparison means and said pad inserting-or-removing means alternatively during respective different steps in the cycle of said multivibrator.

24. A system in accordance with claim 23 in which said means for inserting or removing pads comprises a stepping selector controlled by said multivibrator.

References Cited in the file of this patent

UNITED STATES PATENTS

| | | |
|---|---|---|
| 2,277,579 | Burger et al. | Mar. 24, 1942 |
| 2,304,813 | Gibbs et al. | Dec. 15, 1942 |
| 2,375,413 | Guenther | May 8, 1945 |
| 2,414,609 | Rheubottam | Jan. 21, 1947 |
| 2,444,041 | Andrews | June 3, 1948 |
| 2,461,266 | Gay | Feb. 8, 1949 |
| 2,514,023 | Bergfors | July 4, 1950 |
| 2,579,163 | Wald et al. | Dec. 18, 1951 |